US010735801B2

(12) United States Patent
Yoshizawa et al.

(10) Patent No.: US 10,735,801 B2
(45) Date of Patent: Aug. 4, 2020

(54) BROADCAST RECEIVING APPARATUS FOR RECEIVING PROGRAM CONTENTS BASED ON LOCATION INFORMATION

(71) Applicant: MAXELL, LTD., Kyoto (JP)

(72) Inventors: Kazuhiko Yoshizawa, Kyoto (JP); Takuya Shimizu, Kyoto (JP); Yasunobu Hashimoto, Kyoto (JP); Mitsunobu Watanabe, Kyoto (JP); Nobuo Masuoka, Kyoto (JP); Masayuki Hirabayashi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/379,424

(22) Filed: Apr. 9, 2019

(65) Prior Publication Data

US 2019/0238929 A1 Aug. 1, 2019

Related U.S. Application Data

(63) Continuation of application No. 15/746,670, filed as application No. PCT/JP2016/064605 on May 17, 2016, now Pat. No. 10,306,295.

(30) Foreign Application Priority Data

Jul. 24, 2015 (JP) .................................. 2015-146853
Jul. 27, 2015 (JP) .................................. 2015-147974
(Continued)

(51) Int. Cl.
*H04N 21/433* (2011.01)
*H04N 5/91* (2006.01)
(Continued)

(52) U.S. Cl.
CPC ......... *H04N 21/4334* (2013.01); *H04N 5/775* (2013.01); *H04N 5/91* (2013.01);
(Continued)

(58) Field of Classification Search
CPC ......... H04N 21/4334; H04N 21/23614; H04N 21/4122; H04N 21/433; H04N 21/4348;
(Continued)

(56) References Cited

U.S. PATENT DOCUMENTS 9,736,513 B2 8/2017 Minemura et al.
2001/0005236 A1 6/2001 Nakada et al.
(Continued)

FOREIGN PATENT DOCUMENTS

JP 2001-186486 A 7/2001
JP 2003-101529 A 4/2003
(Continued)

OTHER PUBLICATIONS

STD-B60, ARIB, Dec. 2014, Ver.1.1, pp. 4-8, 44-48, 59-62, 70-71, 75, 155-156, 165-170, with English Translation.
(Continued)

*Primary Examiner* — Pankaj Kumar
*Assistant Examiner* — Alexander Boyd
(74) *Attorney, Agent, or Firm* — McDermott Will & Emery LLP

(57) ABSTRACT

A digital broadcast receiving apparatus executing a function with a higher added value can include: a broadcast receiving unit configured to receive broadcasting data of broadcasting program contents and location information from a broadcast transmission path, a reference destination for obtaining data related to the broadcasting data being described in the location information; a communication unit configured to receive communication data of the program contents from the reference destination described in the location information via a communication line; a recording/reproducing unit configured to record and reproduce the broadcasting data of the broadcasting program contents received by the broadcast receiving unit; an outputting unit configured to output the
(Continued)

broadcasting data of the broadcasting program contents reproduced from the recording/reproducing unit to external equipment; and a server function unit for external equipment. The outputting unit can include a state where the location information is outputted together with reproduced broadcasting data.

12 Claims, 46 Drawing Sheets

(30) Foreign Application Priority Data

Jul. 28, 2015 (JP) ................................. 2015-148399
Jul. 29, 2015 (JP) ................................. 2015-149626

(51) Int. Cl.
| | |
|---|---|
| H04N 21/462 | (2011.01) |
| H04N 5/775 | (2006.01) |
| H04N 21/236 | (2011.01) |
| H04N 21/41 | (2011.01) |
| H04N 21/434 | (2011.01) |
| H04N 21/482 | (2011.01) |
| H04N 21/643 | (2011.01) |
| H04N 21/6543 | (2011.01) |

(52) U.S. Cl.
CPC ... *H04N 21/23614* (2013.01); *H04N 21/4122* (2013.01); *H04N 21/433* (2013.01); *H04N 21/4348* (2013.01); *H04N 21/462* (2013.01); *H04N 21/4821* (2013.01); *H04N 21/64322* (2013.01); *H04N 21/6543* (2013.01)

(58) Field of Classification Search
CPC ............. H04N 21/462; H04N 21/4622; H04N 21/4821; H04N 21/64322; H04N 21/6543; H04N 5/775; H04N 5/91
See application file for complete search history.

(56) References Cited

U.S. PATENT DOCUMENTS

| | | | |
|---|---|---|---|
| 2005/0105528 A1 | 5/2005 | Kobayashi | |
| 2008/0295135 A1 | 11/2008 | Son | |
| 2010/0313235 A1 | 12/2010 | Straub | |
| 2010/0322591 A1 | 12/2010 | Takao et al. | |
| 2012/0169935 A1 | 7/2012 | Kim et al. | |
| 2014/0075472 A1* | 3/2014 | Mitsuya | H04N 21/4433 725/32 |
| 2014/0079368 A1 | 3/2014 | Sasaki et al. | |
| 2014/0111687 A1 | 4/2014 | Difrancesco et al. | |
| 2015/0256581 A1 | 9/2015 | Kolhi et al. | |
| 2018/0035158 A1* | 2/2018 | Yoshizawa | H04N 21/431 |
| 2018/0041795 A1* | 2/2018 | Yoshizawa | H04N 21/435 |
| 2018/0041808 A1* | 2/2018 | Kitazato | H04N 21/8545 |

FOREIGN PATENT DOCUMENTS

| | | |
|---|---|---|
| JP | 2007-104561 A | 4/2007 |
| JP | 2008-199337 A | 8/2008 |
| JP | 2010-141530 A | 6/2010 |
| JP | 2012-023482 A | 2/2012 |
| JP | 2013-078145 A | 4/2013 |
| JP | 2014-007702 A | 1/2014 |
| JP | 2014-138394 A | 7/2014 |
| JP | 2015-026920 A | 2/2015 |
| WO | 2014/155621 A1 | 10/2014 |

OTHER PUBLICATIONS

STD-B10, ARIB, Jul. 2014, Ver.5.4, pp. 148-150, 186-187, with English Translation.
TR-B14, ARIB, Dec. 2014, Ver.5.7, pp. 4-119-4-120, 8-18, 8-22, with English Translation.
Japanese Notice of Reasons for Refusal issued in corresponding Japanese Patent Application No. 2015-146853, dated Jun. 4, 2019, with English Translation.
Japanese Notice of Reasons for Refusal issued in corresponding Japanese Patent Application No. 2015-147974, dated Jun. 11, 2019, with English Translation.
Japanese Notice of Reasons for Refusal issued in corresponding Japanese Patent Application No. 2015-148399, dated Jun. 11, 2019, with English Translation.
Notification of Reasons for Refusal dated Sep. 18, 2018 in corresponding Japanese Patent Application 2015-149626, with English translation.
Association of Radio Industries and Businesses, ARIB STD-B10, Service Information for Digital Broadcasting System, Mar. 18, 2014, Ver. 53, pp. 187-188, and its English translation.
Association of Radio Industries and Businesses, ARIB STD-B60, MMT-Based Media Transport Scheme in Digital Broadcasting Systems, Dec. 16, 2014, Ver. 1.1, pp. 4-5, p . 170, and its English Translation.
Association of Radio Industries and Businesses, ARIB TR-514, Operational Guidelines for Digital Terrestrial Television Broadcasting, Mar. 18, 2014, Ver. 5.7, pp. 4-119-4-120, and its English translation.
Search Report issued in corresponding International Patent Application No. PCT/JP2016/064605, dated Aug. 9, 2016, with English Translation.
Japanese Office Action issued in corresponding Japanese Patent Application No. 2015-149626, dated Mar. 12, 2019, with English Translation.
Non-Final Office Action issued in related parent U.S. Appl. No. 15/746,670, dated Jul. 30, 2018.
Notice of Allowance issued in related parent U.S. Appl. No. 15/746,670, dated Jan. 15, 2019.

* cited by examiner

FIG. 3
(A)
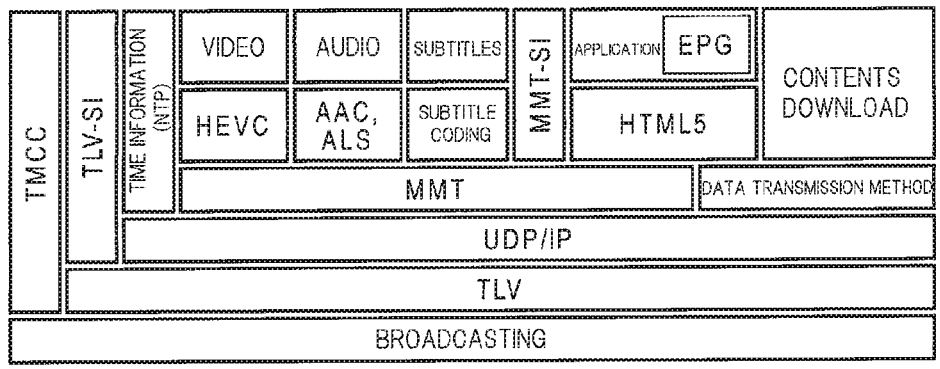
(*TMCC: Transmission and Multiplexing Configuration Control)
(B)
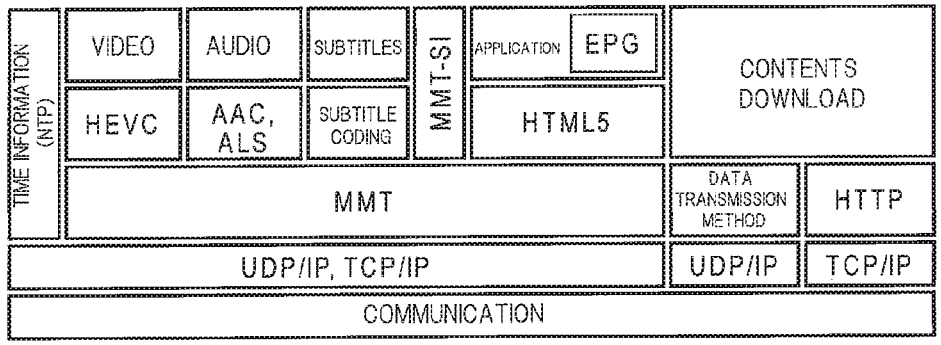
FIG. 4
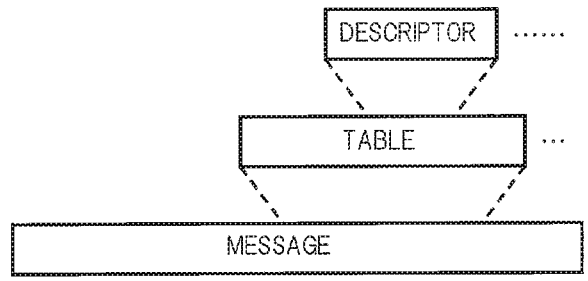

FIG. 5A

| Table Name | Outline of Function |
|---|---|
| Network Information Table for TLV (TLV-NIT) | Transmitting information that correlates information of a transmission path such as a modulation frequency with a broadcasting program in TLV packet transmission |
| Address Map Table (AMT) | Transmitting information that correlates a service identifier for identifying a broadcasting program number with an IP packet |
| Table Set by Provider | |

FIG. 5B

| Descriptor Name | Outline of Function |
|---|---|
| Service List Descriptor | Describing a list of sub-channels and types of the sub-channels |
| Satellite Delivery System Descriptor | Describing physical conditions for a satellite transmission path |
| System Management Descriptor | Distinguishing broadcasting and non-broadcasting |
| Network Name Descriptor | Describing a network name |
| Descriptor Set by Provider | |

FIG. 6A

| Message Name | Outline of Function |
|---|---|
| Package Access (PA) Message | Serving as an entry point for MMT-SI and transmitting MMT-SI table |
| M2 Section Message | Transmitting section extension format of MPEG-2 Systems |
| CA Message | Transmitting information related to conditional access method |
| M2 Short Section Message | Transmitting section short format of MPEG-2 Systems |
| Data Transmission Message | Transmitting a table related to data transmission |
| Message Set by Provider | |

FIG. 6B

| Table Name | Outline of Function |
|---|---|
| MMT Package Table (MPT) | Providing package configuration information such as a list of assets and locations thereof |
| Package List Table (PLT) | Presenting a list of IP data flows for transmitting PA messages of MMT packages provided as a broadcasting service, packet IDs, and IP data flows for transmitting IP services |
| Layout Configuration Table (LCT) | Correlating layout information for presentation with layout numbers |
| Entitlement Control Message (ECM) | Transmitting common information made up of program information (program data, a descrambling key, etc.) and control information |
| Entitlement Management Message (EMM) | Transmitting personal information including contract information of individual subscribers and a work key for decoding encoded common information |
| CA Table (MH) (Conditional Access Table) | Transmitting a descriptor related to conditional access method |
| Download Control Message (DCM) | Transmitting key-related information including a key for decoding a transmission path code for downloading |
| Download Management Message (DMM) | Transmitting key-related information including a download key for decoding encoded DCM |
| MH-Event Information Table (MH-EIT) | Transmitting program-related information such as program name, broadcasting date, and details of program |
| MH-Application Information Table (MH-AIT) | Transmitting dynamic control information related to application and additional information necessary for execution of the application |
| MH-Broadcaster Information Table (MH-BIT) | Providing information of broadcasters present on the network |
| MH-Software Download Trigger Table (MH-SDTT) | Transmitting download announcement information such as a service ID, schedule information, and the type of a receiver to be updated |
| MH-Service Description Table (MH-SDT) | Transmitting information related to a sub-channel such as the name of the sub-channel and the name of a broadcaster |
| MH-Time Offset Table (MH-TOT) | Transmitting current date/time and offset time between the actual time and display time to human system |
| MH-Common Data Table (MH-CDT) | Transmitting data such as logo mark of provider that is necessary for receivers in common and is assumed to be stored in a non-volatile memory |
| Data Directory Management (DDM) Table | Providing directory configuration of files making up an application |
| Data Asset Management (DAM) Table | Providing the configuration of MPU in an asset and version information of each MPU |
| Data Content Configuration (DCC) Table | Providing configuration information of files as data contents |
| Event Message Table (EMT) | Transmitting information related to event message |
| Table Set by Provider | |

FIG. 6C

| Descriptor Name | Outline of Function |
|---|---|
| Asset Group Descriptor | Providing a relation of an asset group and priority in the group |
| Event Package Descriptor | Providing the corresponding relation between an event representing a program and a package |
| Background Color Specifying Descriptor | Specifying the background color of the rearmost plane in layout specification |
| MPU Presentation Region Specifying Descriptor | Providing the location of presentation of MPU |
| MPU Timestamp Descriptor | Providing the time of presentation of MPU |
| Dependency Relation Descriptor | Providing asset IDs for assets dependent on each other |
| Access Control Descriptor | Identifying the conditional access method |
| Scramble Method Descriptor | Identifying a scramble subsystem |
| Message Authentication Method Descriptor | Identifying a message authentication method |
| Emergency Information Descriptor (MH) | Providing description of information and functions necessary as emergency warning signal |
| MH-MPEG-4 Audio Descriptor | Describing basic information for specifying coding parameters of an MPEG-4 audio stream |
| MH-MPEG-4 Audio Extension Descriptor | Describing a profile, level, and specific setting of coding method of an MPEG-4 audio stream |
| MH-HEVC Video Descriptor | Describing basic coding parameters for a video stream (HEVC stream) defined in ITU-T Recommendation H.265 and ISO/IEC 23008-2 |
| MH-Link Descriptor | Describing link with another sub-channel |
| MH-Event Group Descriptor | Describing information on grouping of a plurality of events |
| MH-Service List Descriptor | Describing a list of sub-channels and their types |
| MH-Short Format Event Descriptor | Describing a program name and a brief description of the program |
| MH-Extension Format Event Descriptor | Describing detailed information of a program |
| Video Component Descriptor | Describing parameters and descriptions for a video signal among program element signals |
| MH-Stream Identifying Descriptor | Identifying individual program element signals |
| MH-Content Descriptor | Describing the genre of a program |
| MH-Parental Rate Descriptor | Describing an age-based viewing restriction |
| MH-Audio Component Descriptor | Describing parameters for an audio signal among program element signals |
| MH-Target Area Descriptor | Describing a target area |
| MH-Series Descriptor | Describing series information across a plurality of events |
| MH-SI Transmission Parameter Descriptor | Describing SI transmission parameters (cycle group, retransmission cycle, etc.) |
| MH-Broadcaster Name Descriptor | Describing the name of a broadcaster |
| MH-Service Descriptor | Describing the name of a sub-channel and the name of a provider thereof |
| IP Data Flow Descriptor | Describing information of an IP data flow included in a service |

FIG. 6D

| Descriptor Name | Outline of Function |
|---|---|
| MH-CA Startup Descriptor | Describing information related to start of a CAS program having a conditional access function |
| MH-Type Descriptor | Indicating the type of a file transmitted by an application transmission method |
| MH-Info Descriptor | Describing information related to MPU or an item |
| MH-Expire Descriptor | Describing the expiration date of an item |
| MH-Compression Type Descriptor | Indicating a compression algorithm for an item to be transmitted in a compressed form and the number of bytes of the item before compression |
| MH-Data Coding Method Descriptor | Identifying a data coding method |
| UTC-NPT Reference Descriptor | Transmitting information of the relation between NPT and UTC |
| Event Message Descriptor | Transmitting general information related to event messages |
| MH-Local Time Offset Descriptor | Describing an offset time between the actual time (e.g., UTC + 9 hours) and display time to human system when a daylight saving time system is implemented |
| MH-Component Group Descriptor | Describing information on grouping of a plurality of components |
| MH-Logo Transmission Descriptor | Describing pointing to a character string for a simplified logo and a logo in a CDT format |
| MPU Extension Timestamp Descriptor | Providing a time to decode an access unit in MPU |
| MPU Download Contents Descriptor | Describing property information of contents downloaded using MPU |
| MH-Network Download Contents Descriptor | Describing property information of contents downloaded through network |
| MH-Application Descriptor | Describing information of an application |
| MH-Transmission Protocol Descriptor | Specifying a transmission protocol and describing location information of an application depending on the transmission protocol |
| MH-Simplified Application Location Descriptor | Describing the details of an acquisition destination of an application |
| MH-Application Boundary Authority Setting Descriptor | Describing setting of an application boundary and setting of an authority for access to broadcasting resources for each region (URL) |
| MH-Startup Priority Information Descriptor | Describing the startup priority of an application |
| MH-Cache Information Descriptor | Describing information of cache control for saving resources making up an application in a cache |
| MH-Probability-Applied Delay Descriptor | Describing setting of a delay time by which the time of execution of application control is probabilistically delayed |
| Link Destination PU Descriptor | Describing information of a presentation unit to be link destination |
| Lock Cache Specifying Descriptor | Describing specification of a file to be cached and locked |
| Unlock Cache Specifying Descriptor | Describing specification of a file to be unlocked |
| Descriptor Set by Provider | |

FIG. 11A

| DATA STRUCTURE OF MH-TOT | NUMBER OF BITS | DATA NOTATION |
|---|---|---|
| MH-Time_Offset_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     JST_time | 40 | bslbf |
|     reserved | 4 | bslbf |
|     descriptors_loop_length | 12 | uimsbf |
|     for(i=0; i<N; i++){ | | |
|         descriptor() | | |
|     } | | |
|     CRC_32 | 32 | rpchof |
| } | | |

FIG. 11B

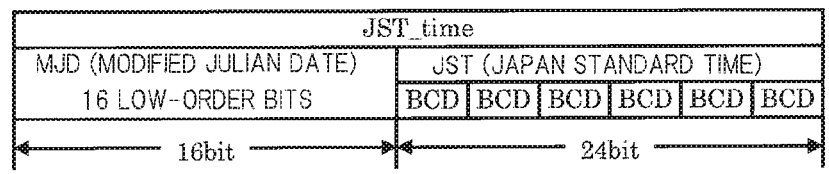

FIG. 12

FIRST CALCULATION METHOD (MJD IS EQUAL TO OR LARGER THAN 32768)

$Y' = \text{int}[(MJD - 15078.2) / 365.25]$
$M' = \text{int}\{[MJD - 14956.1 - \text{int}(Y' \times 365.25)] / 30.6001\}$
$D = MJD - 14956 - \text{int}(Y' \times 365.25) - \text{int}(M' \times 30.6001)$

BUT, WHEN M'=14 OR 15, K=1
       WHEN M'≠14 AND 15, K=0

$Y = Y' + K$
$M = M' - 1 - K \times 12$

Y: NUMBER OF YEARS COUNTED FROM YEAR OF 1900
M: MONTH
D: DAY

SECOND CALCULATION METHOD (MJD IS SMALLER THAN 32768)

$Y' = \text{int}[((MJD + 65536) - 15078.2) / 365.25]$
$M' = \text{int}\{[(MJD + 65536) - 14956.1 - \text{int}(Y' \times 365.25)] / 30.6001\}$
$D = (MJD + 65536) - 14956 - \text{int}(Y' \times 365.25) - \text{int}(M' \times 30.6001)$

BUT, WHEN M'=14 OR 15, K=1
       WHEN M'≠14 AND 15, K=0

$Y = Y' + K$
$M = M' - 1 - K \times 12$

Y: NUMBER OF YEARS COUNTED FROM YEAR OF 1900
M: MONTH
D: DAY

FIG. 13A

| CONFIGURATION OF NTP FORMAT | NUMBER OF BITS | DATA NOTATION |
|---|---|---|
| Network_Time_Protocol_Data(){ | | |
|     leap_indicator | 2 | uimsbf |
|     version | 3 | uimsbf |
|     mode | 3 | uimsbf |
|     stratum | 8 | uimsbf |
|     poll | 8 | uimsbf |
|     precision | 8 | uimsbf |
|     root_delay | 32 | uimsbf |
|     root_dispersion | 32 | uimsbf |
|     reference_identification | 32 | uimsbf |
|     reference_timestamp | 64 | uimsbf |
|     origin_timestamp | 64 | uimsbf |
|     receive_timestamp | 64 | uimsbf |
|     transmit_timestamp | 64 | uimsbf |
| } | | |

FIG. 13B

| DATA STRUCTURE OF MPU TIMESTAMP DESCRIPTOR | NUMBER OF BITS | DATA NOTATION |
|---|---|---|
| MPU_Timestamp_Descriptor(){ | | |
|     descriptor_tag | 16 | uimsbf |
|     descriptor_length | 8 | uimsbf |
|     for(i=0; i<N; i++){ | | |
|         mpu_sequence_number | 32 | uimsbf |
|         mpu_presentation_time | 64 | uimsbf |
|     } | | |
| } | | |

FIG. 13C

| DATA STRUCTURE OF TIME INFORMATION IN TMCC EXTENSION INFORMATION REGION | NUMBER OF BITS | DATA NOTATION |
|---|---|---|
| TMCC_Time_Information (){ | | |
|     reserved | 6 | bslbf |
|     common_time_indicator | 1 | bslbf |
|     extended_payload_indicator | 1 | bslbf |
|     if(common_time_indicator==0){ | | |
|         time_flag | 16 | bslbf |
|         for(i=0; i<16; i++){ | | |
|             delta | 32 | simsbf |
|             transmit_timestamp | 64 | uimsbf |
|         } | | |
|     } | | |
|     if(common_time_indicator==1){ | | |
|         reserved | 16 | bslbf |
|         delta | 32 | simsbf |
|         transmit_timestamp | 64 | uimsbf |
|     } | | |
|     next_extended_payload_indicator | 16 | uimsbf |
| } | | |

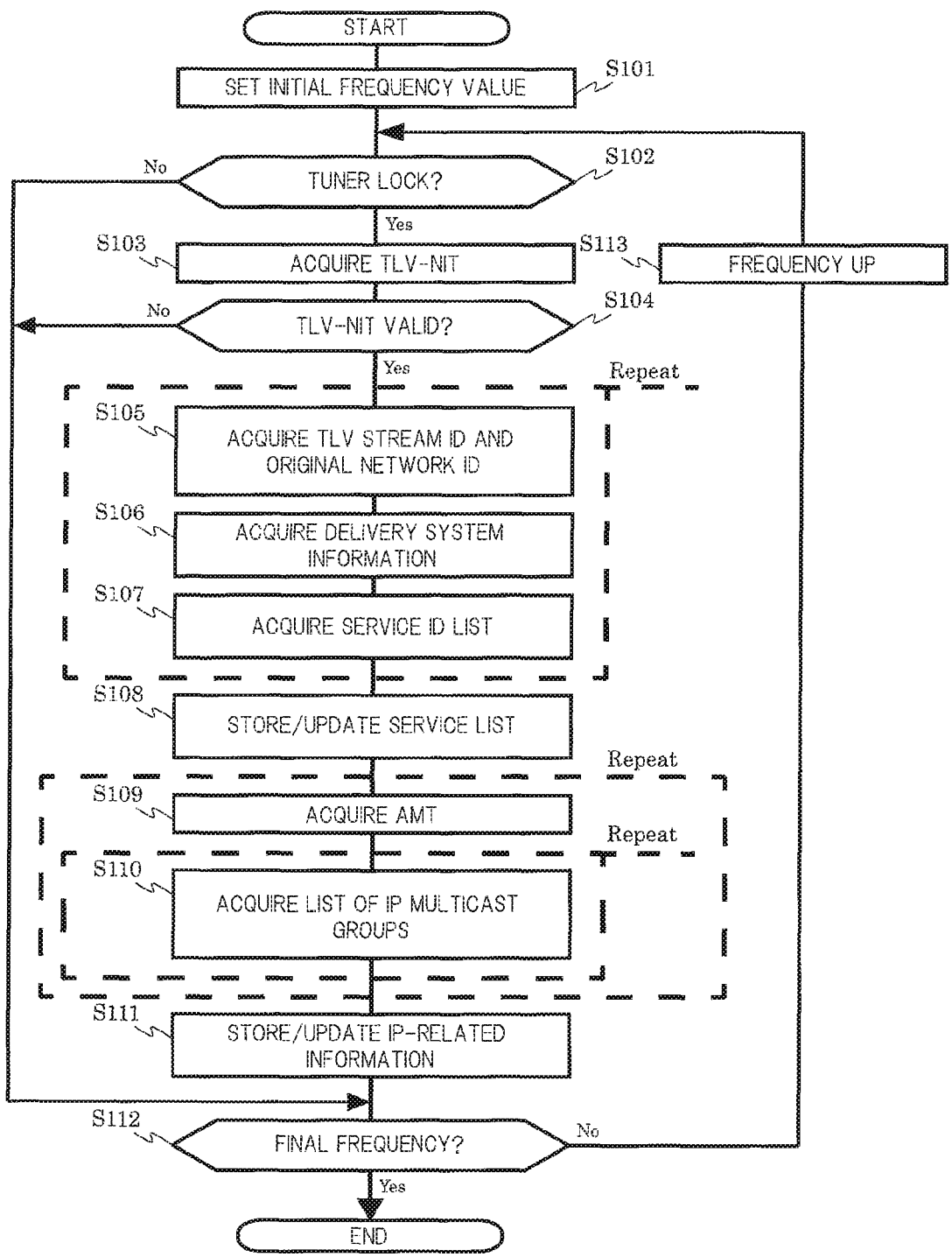

FIG. 15A

| DATA STRUCTURE OF TLV-NIT | NUMBER OF BITS | DATA NOTATION |
|---|---|---|
| TLV_Network_Information_Table(){ | | |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     network_id | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
| | | |
|     reserved_future_use | 4 | bslbf |
|     network_descriptors_length | 12 | bslbf |
|     for(i=0; i<N; i++){ | | |
|         descriptor() | | |
|     } | | |
|     reserved_future_use | 4 | bslbf |
|     TLV_stream_loop_length | 12 | uimsbf |
| | | |
|     for(i=0; i<N; i++){ | | |
|         tlv_stream_id | 16 | uimsbf |
|         original_network_id | 16 | uimsbf |
|         reserved_future_use | 4 | bslbf |
|         tlv_stream_descriptors_length | 12 | uimsbf |
|         for(j=0; j<M; j++){ | | |
|             descriptor() | | |
|         } | | |
|     } | | |
|     CRC_32 | 32 | rpchof |
| } | | |

FIG. 15B

| DATA STRUCTURE OF SATELLITE DELIVERY SYSTEM DESCRIPTOR | NUMBER OF BITS | DATA NOTATION |
|---|---|---|
| Satellite_Delivery_System_Descriptor(){ | | |
|     descriptor_tag | 8 | uimsbf |
|     descriptor_length | 8 | uimsbf |
|     frequency | 32 | bslbf |
|     orbital_position | 16 | bslbf |
|     west_east_flag | 1 | bslbf |
|     polarisation | 2 | bslbf |
|     modulation | 5 | bslbf |
|     symbol_rate | 28 | bslbf |
|     FEC_inner | 4 | bslbf |
| } | | |

*FIG. 15C*

| DATA STRUCTURE OF SERVICE LIST DESCRIPTOR | NUMBER OF BITS | DATA NOTATION |
|---|---|---|
| Service_List_Descriptor(){<br>    descriptor_tag<br>    descriptor_length<br>    for(i=0; i<N; i++){<br>        service_id<br>        service_type<br>    }<br>} | <br>8<br>8<br><br>16<br>8 | <br>uimsbf<br>uimsbf<br><br>uimsbf<br>uimsbf |

*FIG. 15D*

| DATA STRUCTURE OF AMT | NUMBER OF BITS | DATA NOTATION |
|---|---|---|
| Address_Map_Table(){ | | |
|   table_id | 8 | uimsbf |
|   section_syntax_indicator | 1 | bslbf |
|   '1' | 1 | bslbf |
|   '11' | 2 | bslbf |
|   section_length | 12 | uimsbf |
|   table_id_extension | 16 | uimsbf |
|   '11' | 2 | bslbf |
|   version_number | 5 | uimsbf |
|   current_next_indicator | 1 | bslbf |
|   section_number | 8 | uimsbf |
|   last_section_number | 8 | uimsbf |
|   num_of_service_id | 10 | uimsbf |
|   reserved_future_use | 6 | bslbf |
|   for(i=0; i<num_of_service_id; i++){ | | |
|     service_id | 16 | uimsbf |
|     ip_version | 1 | bslbf |
|     reserved_future_use | 5 | bslbf |
|     service_loop_length | 10 | uimsbf |
|     if(ip_version=='0'){ | | |
|       src_address_32 | 32 | bslbf |
|       src_address_mask_32 | 8 | uimsbf |
|       dst_address_32 | 32 | bslbf |
|       dst_address_mask_32 | 8 | uimsbf |
|     } | | |
|     else if(ip_version=='1'){ | | |
|       src_address_128 | 128 | bslbf |
|       src_address_mask_128 | 8 | uimsbf |
|       dst_address_128 | 128 | bslbf |
|       dst_address_mask_128 | 8 | uimsbf |
|     } | | |
|     for(j=0; j<M; j++){ | | |
|       private_data_byte | 8 | bslbf |
|     } | | |
|   } | | |
|   CRC_32 | 32 | rpchof |
| } | | |

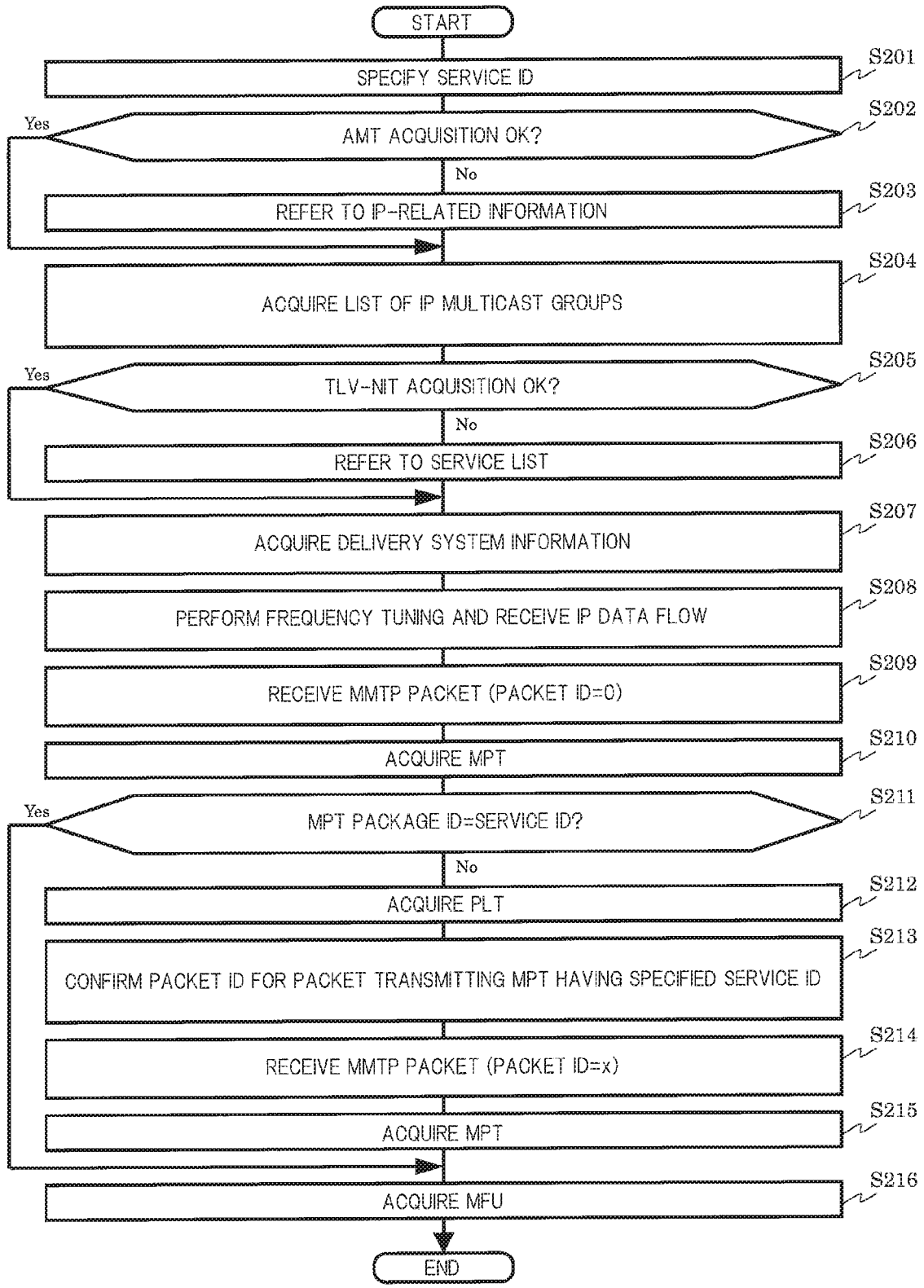

FIG. 17

| DATA STRUCTURE OF MPT | NUMBER OF BITS | DATA NOTATION |
|---|---|---|
| MMT_Package_Table(){ | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for(i=0; i<N; i++){ | | |
|         MMT_package_id_byte | 8 | bslbf |
|     } | | |
|     MPT_descriptors_length | 16 | uimsbf |
|     for(i=0; i<N; i++){ | | |
|         MPT_descriptors_byte | 8 | bslbf |
|     } | | |
|     number_of_assets | 8 | uimsbf |
|     for(i=0; i<N; i++){ | | |
|         identifier_type | 8 | uimsbf |
|         asset_id_scheme | 32 | uimsbf |
|         asset_id_length | 8 | uimsbf |
|         for(j=0; j<M; j++){ | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for(j=0; j<M; j++){ | | |
|             MMT_general_location_info() | | |
|         } | | |
|         asset_descriptors_length | 16 | uimsbf |
|         for(j=0; j<M; j++){ | | |
|             asset_descriptors_byte | 8 | bslbf |
|         } | | |
|     } | | |
| } | | |

FIG. 18

| DATA STRUCTURE OF LCT | NUMBER OF BITS | DATA NOTATION |
|---|---|---|
| Layout_Configuration_Table(){ | | |
|     table_id | 8 | uimsbf |
|     version | 8 | uimsbf |
|     length | 16 | uimsbf |
|     number_of_loop | 8 | uimsbf |
|     for(i=0; i<N; i++){ | | |
|         layout_number | 8 | uimsbf |
|         device_id | 8 | uimsbf |
|         number_of_region | 8 | uimsbf |
|         for(j=0; j<M; j++){ | | |
|             region_number | 8 | uimsbf |
|             left_top_pos_x | 8 | uimsbf |
|             left_top_pos_y | 8 | uimsbf |
|             right_down_pos_x | 8 | uimsbf |
|             right_down_pos_y | 8 | uimsbf |
|             layer_order | 8 | uimsbf |
|         } | | |
|     } | | |
|     descriptor() | | |
| } | | |

FIG. 19A

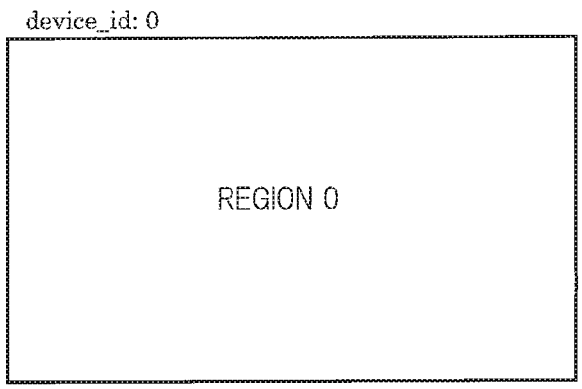

| number_of_loop | | 1 |
|---|---|---|
| | layout_number | 0 |
| | device_id | 0 |
| | number_of_region | 1 |
| | region_number | 0 |
| | left_top_pos_x | 0 |
| | left_top_pos_y | 0 |
| | right_down_pos_x | 100 |
| | right_down_pos_y | 100 |
| | layer_order | 0 |

FIG. 19B

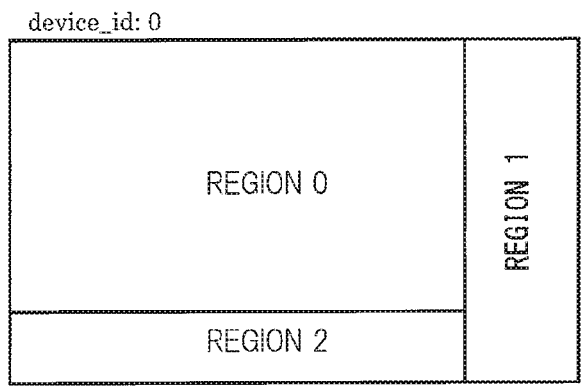

| number_of_loop | | 1 |
|---|---|---|
| | layout_number | 1 |
| | device_id | 0 |
| | number_of_region | 3 |
| | region_number | 0 |
| | left_top_pos_x | 0 |
| | left_top_pos_y | 0 |
| | right_down_pos_x | 80 |
| | right_down_pos_y | 80 |
| | layer_order | 0 |
| | region_number | 1 |
| | left_top_pos_x | 80 |
| | left_top_pos_y | 0 |
| | right_down_pos_x | 100 |
| | right_down_pos_y | 100 |
| | layer_order | 0 |
| | region_number | 2 |
| | left_top_pos_x | 0 |
| | left_top_pos_y | 80 |
| | right_down_pos_x | 80 |
| | right_down_pos_y | 100 |
| | layer_order | 0 |

FIG. 19C

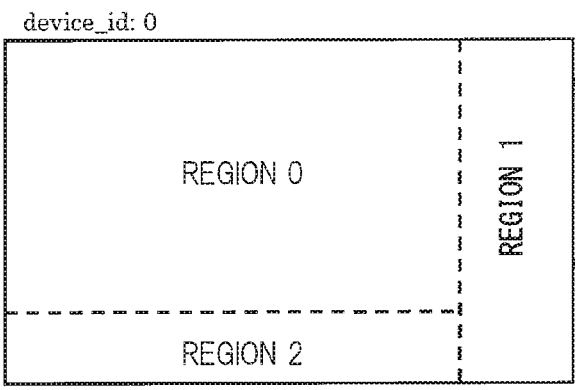

device_id: 0

LAYOUT NUMBER: 2
(REGION 1 AND REGION 2 ARE IN
FRONT OF REGION 0)

| | | |
|---|---|---|
| number_of_loop | | 1 |
| | layout_number | 2 |
| | device_id | 0 |
| | number_of_region | 3 |
| | region_number | 0 |
| | left_top_pos_x | 0 |
| | left_top_pos_y | 0 |
| | right_down_pos_x | 100 |
| | right_down_pos_y | 100 |
| | layer_order | 0 |
| | region_number | 1 |
| | left_top_pos_x | 80 |
| | left_top_pos_y | 0 |
| | right_down_pos_x | 100 |
| | right_down_pos_y | 100 |
| | layer_order | 1 |
| | region_number | 2 |
| | left_top_pos_x | 0 |
| | left_top_pos_y | 80 |
| | right_down_pos_x | 80 |
| | right_down_pos_y | 100 |
| | layer_order | 1 |

FIG. 19D

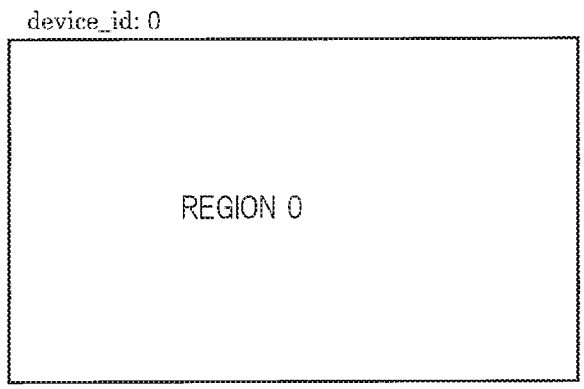

device_id: 0

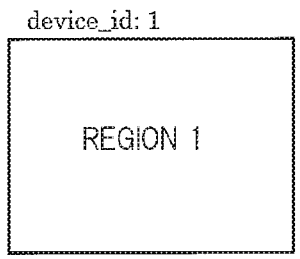

device_id: 1

LAYOUT NUMBER: 3

| | | |
|---|---|---|
| number_of_loop | | 2 |
| | layout_number | 3 |
| | device_id | 0 |
| | number_of_region | 1 |
| | region_number | 0 |
| | left_top_pos_x | 0 |
| | left_top_pos_y | 0 |
| | right_down_pos_x | 100 |
| | right_down_pos_y | 100 |
| | layer_order | 0 |
| | layout_number | 3 |
| | device_id | 1 |
| | number_of_region | 1 |
| | region_number | 1 |
| | left_top_pos_x | 0 |
| | left_top_pos_y | 0 |
| | right_down_pos_x | 100 |
| | right_down_pos_y | 100 |
| | layer_order | 0 |

FIG. 21

| DATA STRUCTURE OF MH-EIT | NUMBER OF BITS | DATA NOTATION |
|---|---|---|
| MH-Event_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     tlv_stream_id | 16 | uimsbf |
|     original_network_id | 16 | uimsbf |
|     segment_last_section_number | 8 | uimsbf |
|     last_table_id | 8 | uimsbf |
|     for(i=0; i<N; i++){ | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descritors_loop_length | 12 | uimsbf |
|         for(j=0; j<M; j++){ | | |
|             descriptor() | | |
|         } | | |
|     } | | |
|     CRC_32 | 32 | rpchof |
| } | | |

FIG. 22C
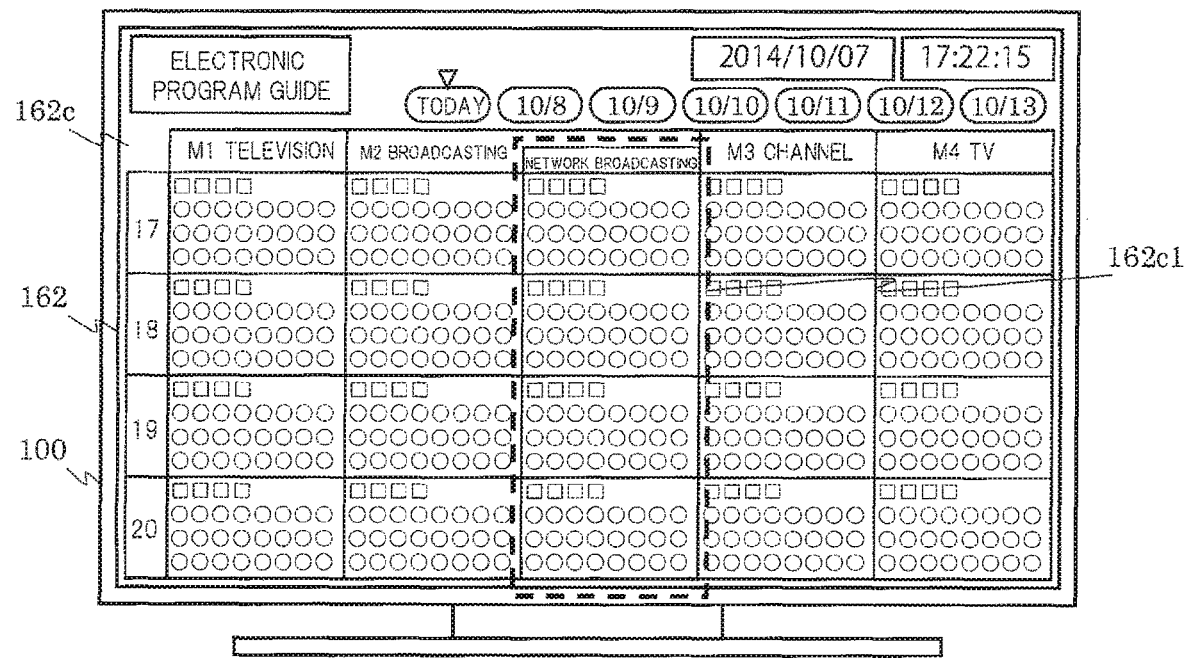
(A) WITH NETWORK CONNECTION
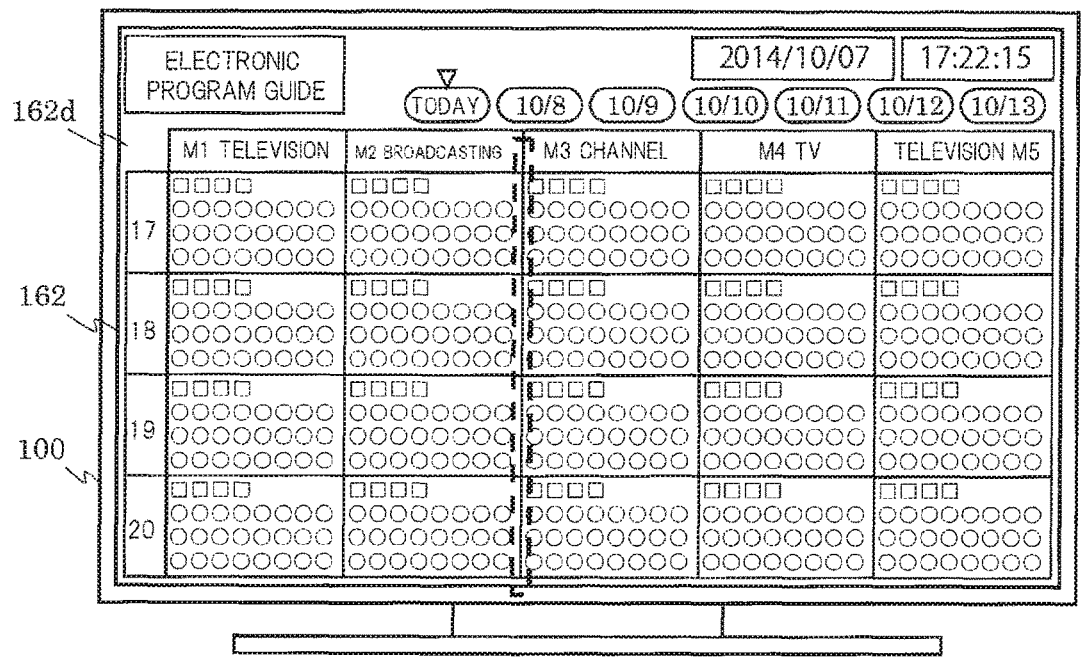
(B) WITHOUT NETWORK CONNECTION FIG. 23
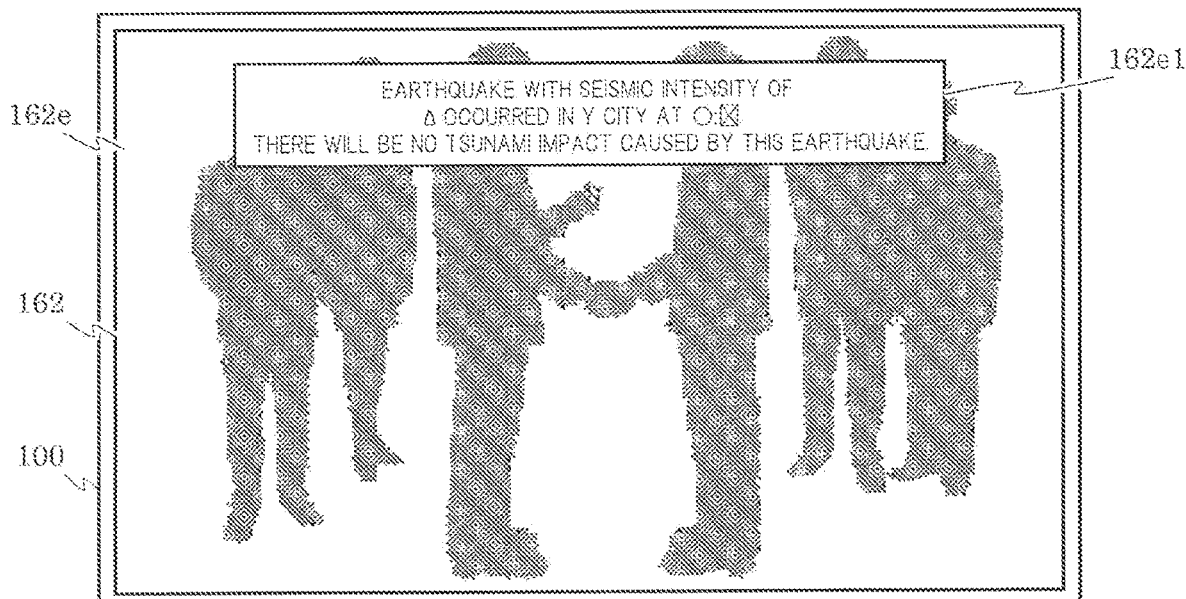
(A) EMERGENCY BROADCASTING MESSAGE DISPLAYED ON BROADCASTING PROGRAM SCREEN
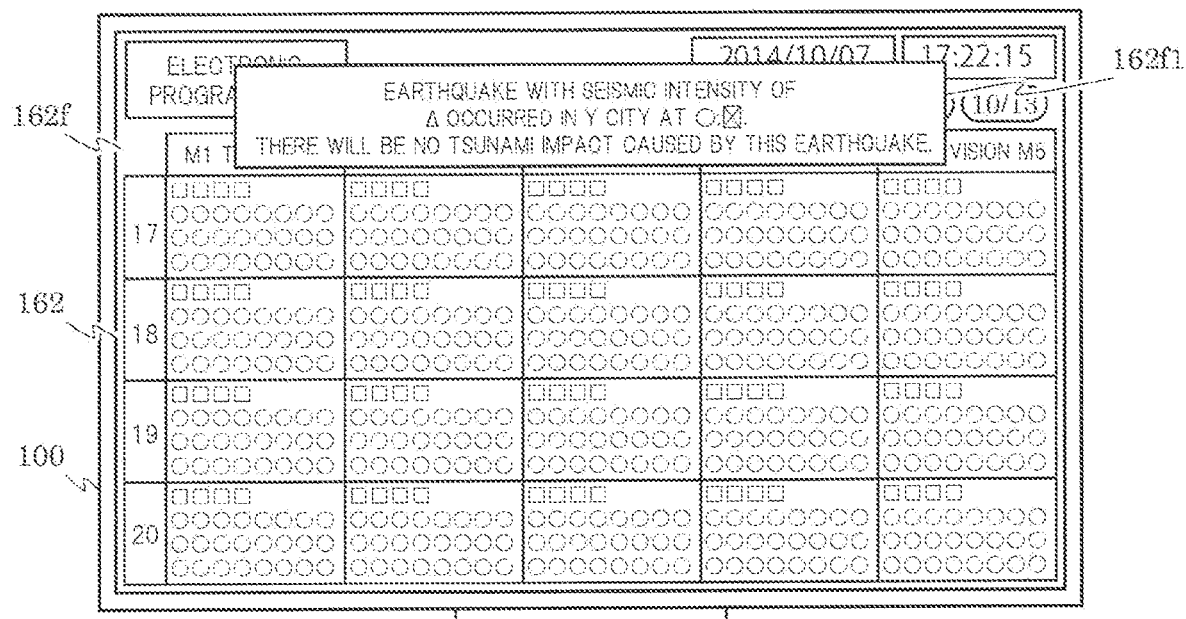
(B) EMERGENCY BROADCASTING MESSAGE DISPLAYED ON EPG SCREEN FIG. 25
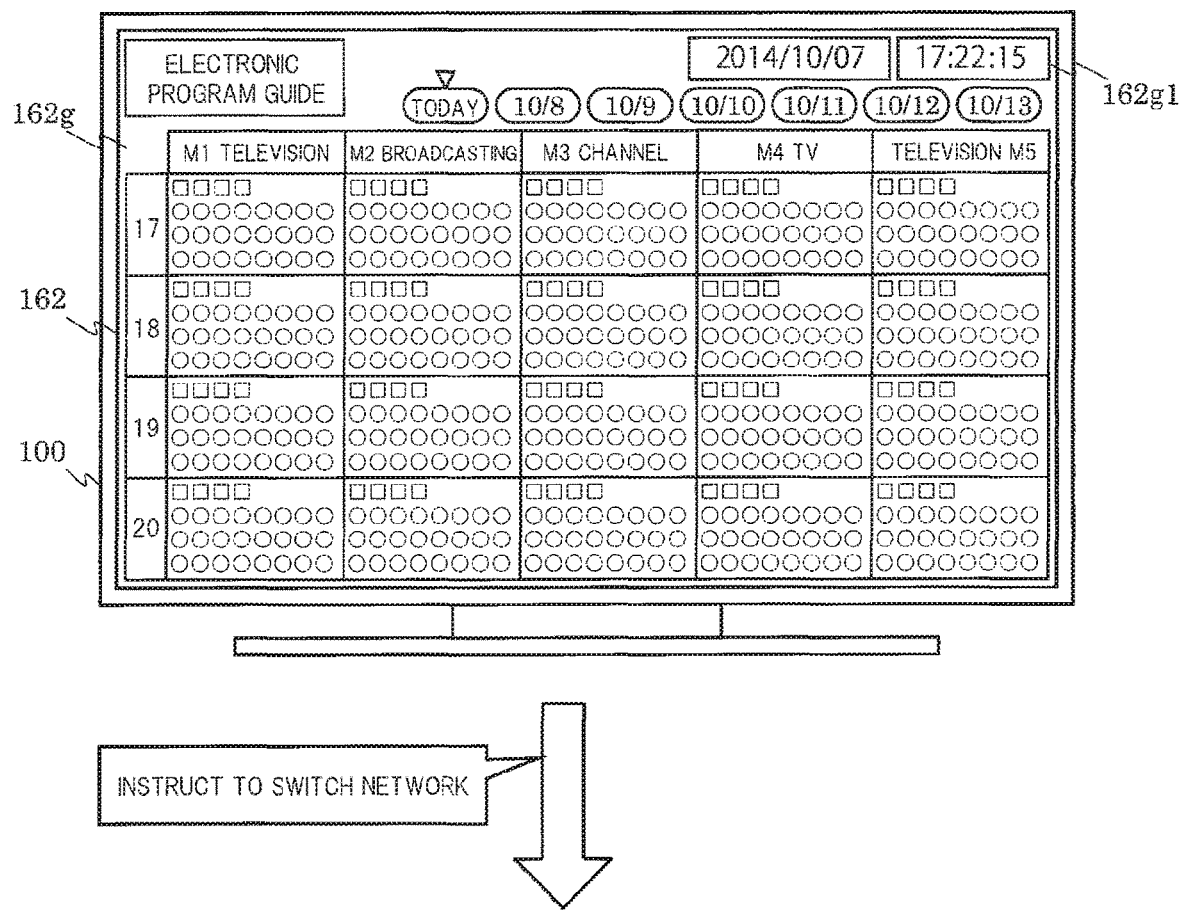
INSTRUCT TO SWITCH NETWORK
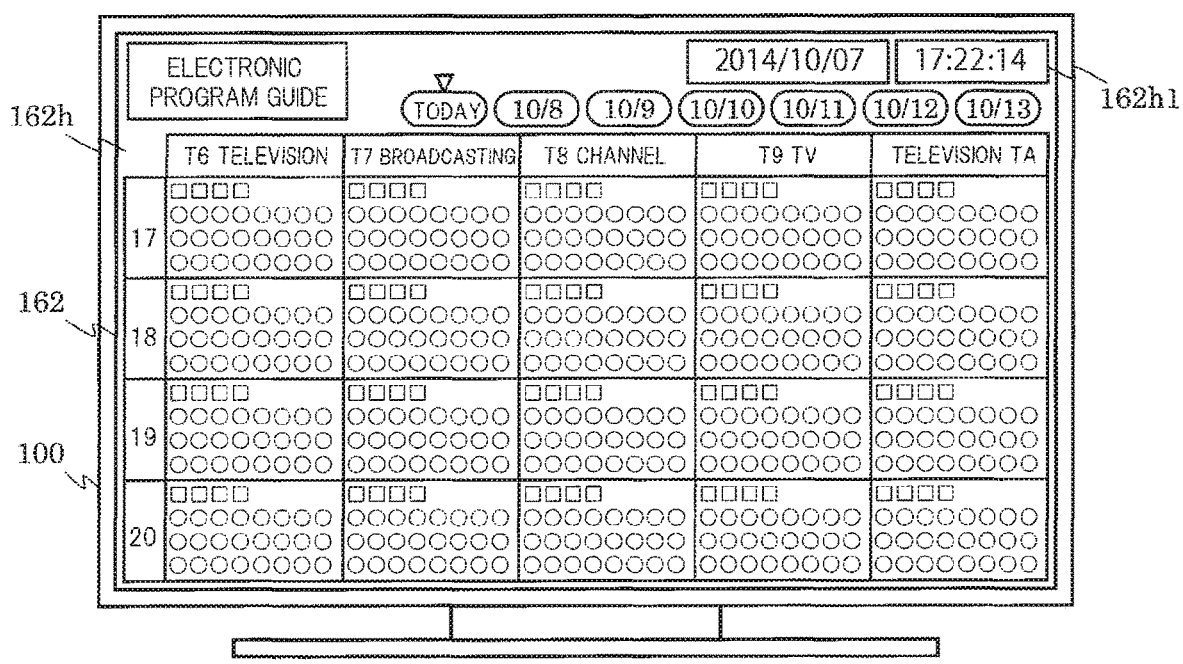

| | RECEPTION STATE OF BROADCASTING SERVICE | | | |
|---|---|---|---|---|
| MMT BROADCASTING SERVICE | NOT RECEIVABLE | RECEIVABLE | NOT RECEIVABLE | RECEIVABLE |
| MPEG2-TS BROADCASTING SERVICE | NOT RECEIVABLE | NOT RECEIVABLE | RECEIVABLE | RECEIVABLE |
| REFERENCE SOURCE OF CURRENT TIME INFORMATION | — | MH-TOT | TOT | TOT |

*FIG. 27A*

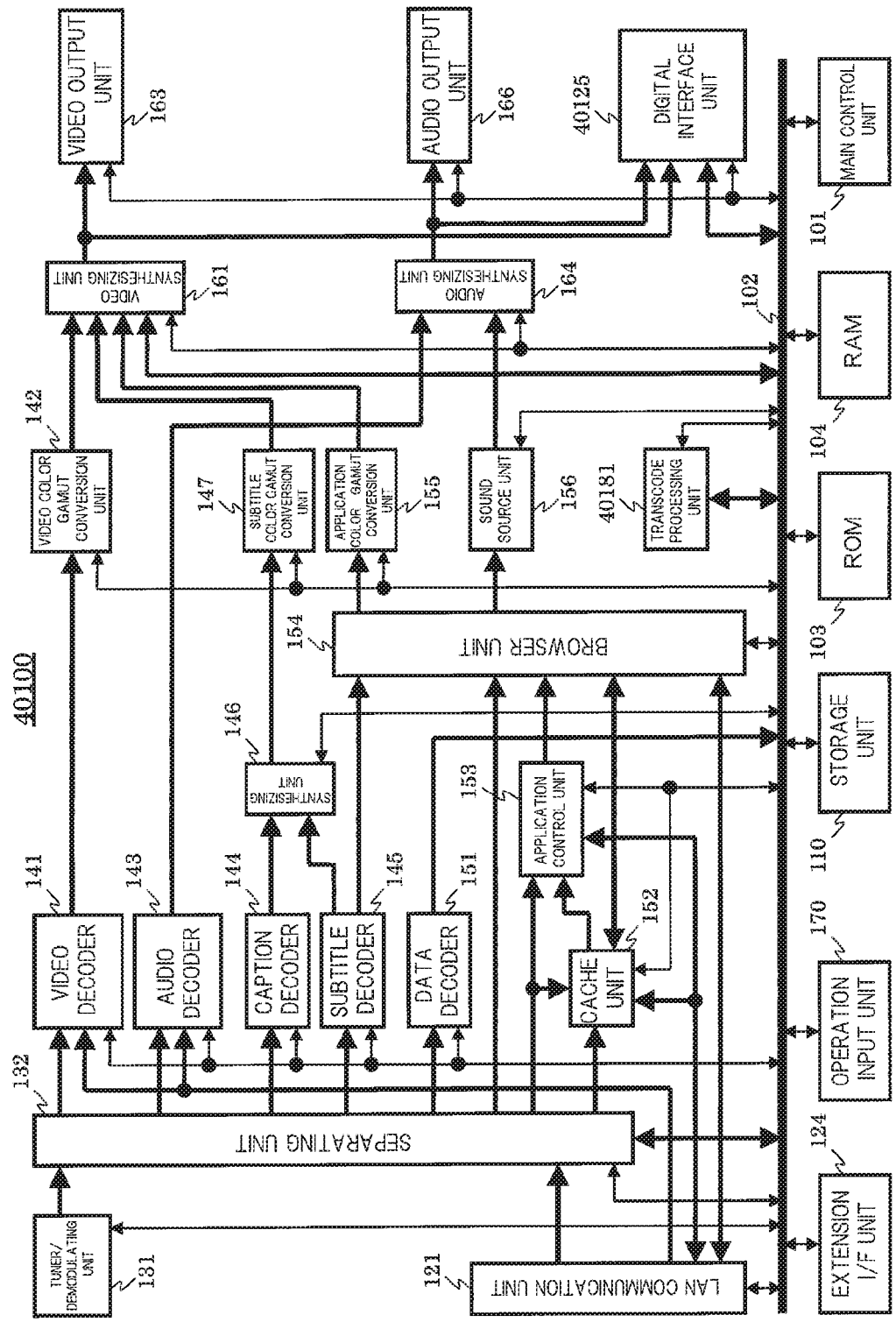

*FIG. 33A*

| DATA STRUCTURE OF MH-AIT | NUMBER OF BITS | DATA NOTATION |
|---|---|---|
| MH-Application_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     application_type | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptor_length | 12 | uimsbf |
|     for(i=0; i<N; i++){ | | |
|         descriptor() | | |
|     } | | |
|     reser_future_use | 4 | bslbf |
|     application_loop_length | 12 | uimsbf |
|     for(j=0; i<N; i++){ | | |
|         application_identifier() | | |
|         application_control_code | 8 | uimsbf |
|         reserved_future_use | 4 | bslbf |
|         application_descriptor_loop_length | 12 | uimsbf |
|         for(j=0; j<M; j++){ | | |
|             descriptor() | | |
|         } | | |
|     } | | |
|     CRC_32 | 32 | rpchof |
| } | | |

FIG. 33B

| PARAMETERS/DESCRIPTORS OF APPLICATION CONTROL INFORMATION | CONTENT |
|---|---|
| application_type | Format of application as control target. |
| application_identifier() | Value for uniquely identifying application as control target, which is defined for each application model. |
| application_control_code | Control code for controlling application state. One of four as follows is described. (1) Automatic startup (2) Operable (3) End (4) PREFETCH |
| MH-APPLICATION DESCRIPTOR | Profile of receiving apparatus, which can execute application. If this profile is implemented, it indicates that the receiving apparatus can execute the application. |
| MH-SIMPLIFIED APPLICATION LOCATION DESCRIPTOR | Information for specifying the details of an acquisition destination of an application. |
| MH-APPLICATION BOUNDARY AUTHORITY SETTING DESCRIPTOR | Setting of application boundary. Setting of authority for access to broadcasting resource for each region (URL). |
| MH-STARTUP PRIORITY INFORMATION DESCRIPTOR | Information of startup priority order in data broadcasting and all applications cooperated with currently receiving service. |
| MH-CACHE INFORMATION DESCRIPTOR | Information used for cache control when application resource is saved for reuse. |
| MH-PROBABILITY-APPLIED DELAY DESCRIPTOR | Setting of timing control with expectation that server access loads for obtaining application are to be dispersed. |
| MH-APPLICATION EXPIRATION DATE DESCRIPTOR | Information of time limit when application can be obtained from server. Information of time limit when the obtained application can be started. |
| OTHER INFORMATION | |

BROADCAST RECEIVING APPARATUS FOR RECEIVING PROGRAM CONTENTS BASED ON LOCATION INFORMATION

CROSS REFERENCE

This application is a Continuation of U.S. patent application Ser. No. 15/746,670, filed on Jan. 22, 2018, which is the U.S. National Phase under 35 U.S.C. § 371 of International Application No. PCT/JP2016/064605, filed on May 17, 2016, which claims the benefit of Japanese Application No. 2015-146853, filed on Jul. 24, 2015, Japanese Application No. 2015-147974, filed on Jul. 27, 2015, Japanese Application No. 2015-148399, filed on Jul. 28, 2015, and Japanese Application No. 2015-149626, filed on Jul. 29, 2015, the entire contents of each are hereby incorporated by reference.

TECHNICAL FIELD

The present invention relates to a broadcast receiving apparatus.

BACKGROUND ART

One of extended functions of the digital broadcasting service is data broadcasting in which digital data is transmitted by broadcast waves to display various types of information such as weather forecasts, news, and recommended TV programs. Many types of television receivers capable of receiving data broadcasting have already been on the market, and a lot of techniques for receiving data broadcasting including the technique disclosed in Patent Document 1 listed below have been released to the public.

RELATED ART DOCUMENTS

Patent Documents

Patent document 1: Japanese Unexamined Patent Application Publication No. 2001-186486

SUMMARY OF THE INVENTION

Problems to be Solved by the Invention

In association with the recent changes in the contents distribution environment, various functional extensions have been demanded for the television receivers. In particular, there are a lot of demands for the distribution of contents and cooperated applications using a broadband network environment such as the Internet and demands for the video contents with higher resolution and higher definition. However, no matter how the data broadcasting receiving function that the current television receiver has is utilized or extended, it is difficult to provide a high-value added television receiver capable of satisfying the above-mentioned demands.

It is an object of the present invention to provide a broadcast receiving apparatus capable of executing a function with a higher added value.

Means for Solving the Problem

Techniques described in claims are used as means for solving the problem described above.

One example is a broadcast receiving apparatus including: a broadcast receiving unit configured to receive broadcasting data of broadcasting program contents and location information from a broadcast transmission path, a reference destination for obtaining data related to the broadcasting data being described in the location information; a communication unit configured to receive communication data of the program contents from the reference destination described in the location information via a communication line; a recording/reproducing unit configured to record and reproduce the broadcasting data of the broadcasting program contents received by the broadcast receiving unit; an outputting unit configured to output the broadcasting data of the broadcasting program contents reproduced from the recording/reproducing unit to external equipment; and a server function unit having a server function for the external equipment, wherein as an output state of the outputting unit, there is a state where the location information in which description of the reference destination is rewritten into description indicating the server function unit is outputted together with the broadcasting data reproduced from the recording/reproducing unit.

Effects of the Invention

It is possible to provide a broadcast receiving apparatus capable of executing a function with a higher added value by using the technique of the present invention.

BRIEF DESCRIPTIONS OF THE DRAWINGS

FIG. 3 is a conceptual diagram of a protocol stack for a broadcasting system using the MMT;

FIG. 4 is a layered configuration diagram of control information used in a broadcasting system;

FIG. 5A is a list of tables used for TLV-SI of the broadcasting system;

FIG. 5B is a list of descriptors used for TLV-SI of the broadcasting system;

FIG. 6A is a list of messages used for MMT-SI of the broadcasting system;

FIG. 6B is a list of tables used for MMT-SI of the broadcasting system;

FIG. 6C is a list (1) of descriptors used for MMT-SI of the broadcasting system;

FIG. 6D is a list (2) of descriptors used for MMT-SI of the broadcasting system;

FIG. 102 is a software configuration diagram of the portable information terminal according to the first embodiment;

FIG. 11A is a diagram showing a data structure of an MH-TOT of the broadcasting system;

FIG. 112 is a diagram showing a format of a JST_time parameter of the broadcasting system;

FIG. 12 is a diagram showing a method of calculating the current date from MJD of the broadcast receiving apparatus according to the first embodiment;

FIG. 13A is a diagram showing a configuration of an NTP format of the broadcasting system;

FIG. 13B is a diagram showing a data structure of an MPU timestamp descriptor of the broadcasting system;

FIG. 13C is a diagram showing a data structure of time information in a TMCC extension information region of the broadcasting system;

FIG. 14 is an operation sequence diagram at the time of channel scanning of the broadcast receiving apparatus according to the first embodiment;

FIG. 15A is a diagram showing a data structure of a TLV-NIT of the broadcasting system;

FIG. 15B is a diagram showing a data structure of a satellite delivery system descriptor of the broadcasting system;

FIG. 15C is a diagram showing a data structure of a service list descriptor of the broadcasting system;

FIG. 15D is a diagram showing a data structure of an AMT of the broadcasting system;

FIG. 16 is an operation sequence diagram at the time of channel selection of the broadcast receiving apparatus according to the first embodiment;

FIG. 17 is a diagram showing a data structure of an MPT of the broadcasting system;

FIG. 18 is a diagram showing a data structure of an LCT of the broadcasting system;

FIG. 19A is a diagram showing an example of layout assignment to a layout number based on the LCT;

FIG. 192 is a diagram showing another example of layout assignment to a layout number based on the LCT;

FIG. 19C is a diagram showing still another example of layout assignment to a layout number based on the LCT;

FIG. 19D is a diagram showing still another example of layout assignment to a layout number based on the LCT;

FIG. 21 is a diagram showing a data structure of an MH-EIT of the broadcasting system;

FIG. 22C is a screen display diagram of an EPG screen of the broadcast receiving apparatus according to the first embodiment;

FIG. 23 is a screen display diagram at the time of displaying an emergency warning broadcasting message of the broadcast receiving apparatus according to the first embodiment;

FIG. 25 is an explanatory diagram of inconsistent display of current time at the time of switching broadcasting services;

FIG. 27A is a screen display diagram of an EPG screen of the broadcast receiving apparatus according to the second embodiment;

FIG. 29A is a block diagram of the broadcast receiving apparatus according to the third embodiment;

FIG. 33A is a diagram showing a data structure of an MH-AIT of a broadcasting system;

FIG. 33B is a list of parameters and descriptors in the MH-AIT of the broadcasting system.

DETAILED DESCRIPTION OF PREFERRED EMBODIMENTS

Hereinafter, embodiments of the present, invention will be described with reference to the drawings.

First Embodiment

[System Configuration]

Figure 1:
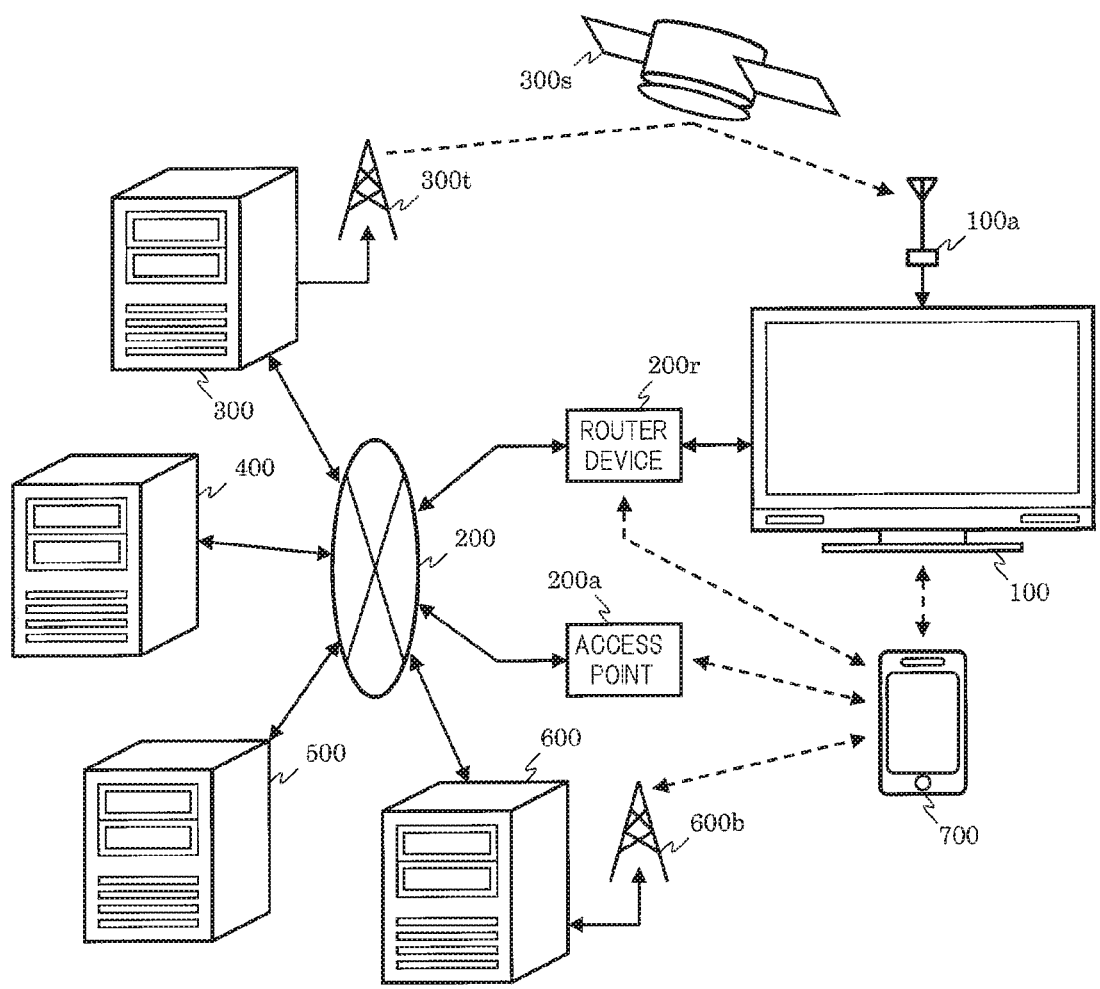
FIG. 1 is a system configuration diagram showing an example of a broadcast communication system including a broadcast receiving apparatus according to a first embodiment.

FIG. 1 is a system configuration diagram showing an example of a broadcast communication system including a broadcast receiving apparatus according to the present embodiment. The broadcast communication system of the present embodiment includes a broadcast receiving apparatus 100, an antenna 100a, a broadband network such as the Internet 200, a router device 200r, an access point 200a, a radio tower 300t and a broadcast satellite (or communication satellite) 300s of a broadcast station, a broadcast station server 300, a service provider server 400, an other application server 500, a mobile phone communication server 600, a base station 600b of a mobile phone communication network, and a portable information terminal 700.

The broadcast receiving apparatus 100 receives broadcast waves transmitted from the radio tower 300t via the broadcast satellite (or communication satellite) 300s and the antenna 100a. Alternatively, the broadcast receiving apparatus 100 may receive broadcast waves transmitted from the radio tower 300t directly from the antenna 100a without passing through the broadcast satellite (or communication satellite) 300s. In addition, the broadcast receiving apparatus 100 can be connected to the Internet 200 via the router device 200r, and thus can perform data transmission and reception through the communication with server devices and other communication equipment on the Internet 200.

The router device 200r is connected to the Internet 200 through wired communication, to the broadcast receiving apparatus 100 through wired or wireless communication, and to the portable information terminal 700 through wireless communication. The wireless communication may be established by Wi-Fi (registered trademark) or the like. This allows the server devices and other communication equipment on the Internet 200, the broadcast receiving apparatus 100, and the portable information terminal 700 to perform data transmission and reception between one another via the router device 200r. Note that the communication between the broadcast receiving apparatus 100 and the portable information terminal 700 may be performed as direct communication by BlueTooth (registered trademark), NFC (Near Field Communication) or the like without passing through the rooter 200r.

The radio tower 300t is a broadcasting facility of the broadcast station and transmits broadcast waves including coded data of broadcasting programs, subtitle information, other applications, general-purpose data, and the like. The broadcast satellite (or communication satellite) 300s is a relay device that receives broadcast waves transmitted from the radio tower 300t of the broadcast station, performs frequency conversion and the like as appropriate, and then transmits the radio waves to the antenna 100a connected to the broadcast receiving apparatus 100. In addition, the broadcast station has the broadcast station server 300. The broadcast station server 300 can store metadata such as broadcasting programs (video contents, etc.) and the titles, IDs, summaries, casts, broadcasting dates and the like of the broadcasting programs, and provide the video contents and metadata to a service provider based on a contract. Note that the video contents and metadata may be provided to the service provider through an API (Application Programming Interface) in the broadcast station server 300.

The service provider server 400 is a server device prepared by the service provider, and can provide various services cooperated with broadcasting programs distributed from the broadcast station. In addition, the service provider server 400 stores, manages, and distributes video contents and metadata delivered from the broadcast station server 300 and various contents, applications and the like cooperated with the broadcasting programs. In addition, the service provider server 400 further has a function of searching for deliverable contents, applications and the like and presenting a list of them in response to an inquiry from the television receiver and the like. Note that the storage, management, and distribution of the contents and metadata and those of the applications may be performed by different server devices. The broadcast station and the service provider may be the same or different from each other. A plurality of service provider servers 400 may be prepared for different services. In addition, the broadcast station server 300 may be provided with the functions of the service provider server 400.

The other application server 500 is a publicly known server device that stores, manages, and distributes other general applications, operating programs, contents, data, and the like. A plurality of other application servers 500 may be provided on the Internet 200.

The mobile phone communication server 600 is connected to the Internet 200 and is further connected to the portable information terminal 700 via the base station 600b. The mobile phone communication server 600 manages telephone communication (telephone call) and data transmission and reception performed by the portable information terminal 700 through the mobile phone communication network, and allows the portable information terminal 700 to perform data transmission and reception through the communication with server devices and other communication equipment on the Internet 200. The communication between the base station 600b and the portable information terminal 700 may be performed by W-CDMA (Wideband Code Division Multiple Access: registered trademark), GSM (Global System for Mobile Communications: registered trademark), LTE (Long Term Evolution), or other communication methods.

The portable information terminal 700 has a function of telephone communication (telephone call) and data transmission and reception through the mobile phone communication network and a function of wireless communication through Wi-Fi (registered trademark) or the like. The portable information terminal 700 can be connected to the Internet 200 via the router device 200r or the access point 200a or via the base station 600b and the mobile phone communication server 600 on the mobile phone communication network, and thus can perform data transmission and reception through the communication with server devices and other communication equipment on the Internet 200. The access point 200a is connected to the Internet 200 through wired communication and is further connected to the portable information terminal 700 through wireless communication. The wireless communication may be established by Wi-Fi (registered trademark) or the like. Note that the communication between the portable information terminal 700 and the broadcast receiving apparatus 100 may be performed via the access point 200a, the Internet 200, and the router device 200r or via the base station 600b, the mobile phone communication server 600, the Internet 200, and the router device 200r.

[Outline of MMT Method]

The broadcast receiving apparatus 100 shown in FIG. 1 is a television receiver that supports MMT (MPEG Media Transport) as a media transport method for transmitting video and audio data, in place of TS (Transport Stream) defined in the MPEG (Moving Picture Experts Group)-2 system (hereinafter, "MPEG2-TS") mainly adopted by conventional digital broadcasting systems. The broadcast receiving apparatus 100 may be a television receiver supporting both MPEG2-TS and MMT.

MPEG2-TS has a characteristic of multiplexing video and audio components and the like making up a program, in a single stream together with control signals and clocks. Since the components are treated as single stream with the inclusion of clocks, MPEG2-TS is suitable for the transmission of single contents through a single transmission path with an ensured transmission quality, and thus has been adopted by many conventional digital broadcasting systems. On the other hand, because of the functional limitations of MPEG2-TS for the recent changes in the contents distribution environment including the diversification of contents, diversification of equipment using contents, diversification of transmission paths through which contents are distributed, and diversification of contents accumulation environment, MMT has been established as a new media transport method.

Figure 2A:
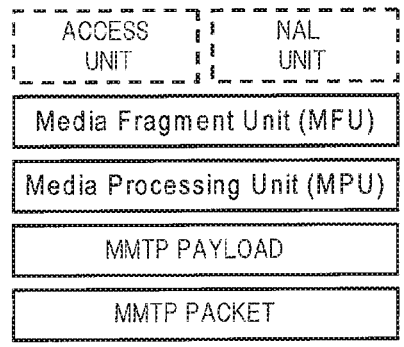
FIG. 2A is an explanatory diagram of an outline of a coded signal in an MMT.
Figure 2B:
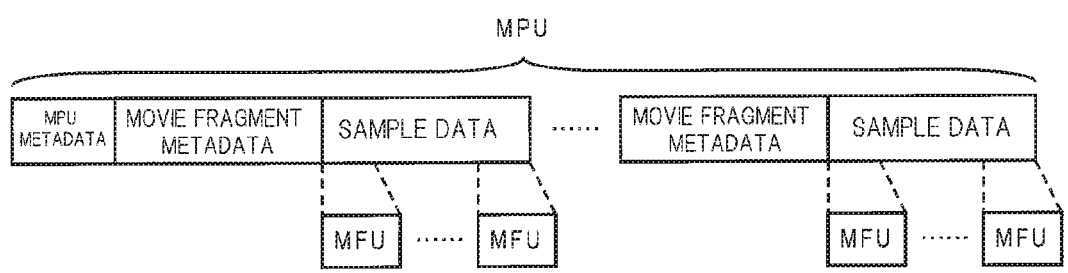
FIG. 2B is a configuration diagram of an MPU in MMT.

FIG. 2A shows an example of an outline of a coded signal in MMT of the present embodiment. As shown in FIG. 2A, MMT of the present embodiment has an MFU (Media Fragment Unit), an MPU (Media Processing Unit), an MMTP (MMT Protocol) payload, and an MMTP packet as elements making up the coded signal. The MFU is a format at the time of transmitting video, audio, and the like, and may be configured in units of NAL (Network Abstraction Layer) unit or access unit. The MPU may be configured of MPU metadata including information related to the overall configuration of the MPU, movie fragment metadata including information of coded media data, and sample data that is coded media data. Further, MFU can be extracted from the sample data. Further, in the case of media such as video components and audio components, presentation time and decoding time may be specified in units of MPU or access unit. FIG. 2B shows an example of a configuration of the MPU.

Figure 2C:
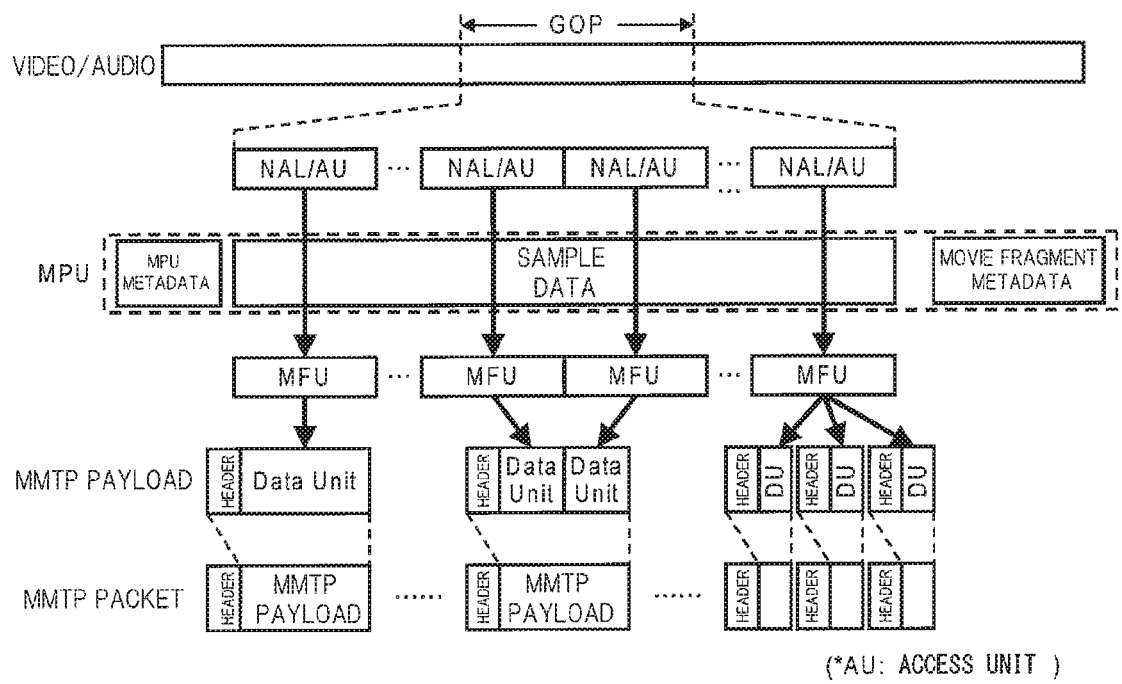
FIG. 2C is a configuration diagram of an MMTP packet in the MMT.

The MMTP packet is configured of a header and an MMTP payload, and transmits control information of the MFU and MMT. The MMTP payload has a payload header corresponding to contents (data unit) stored in a payload section. FIG. 2C shows an example of an outline of a process of making the MFU from video and audio signals, storing the MFU in the MMTP payload, and then creating the MMTP packet. In the case of a video signal that is coded using inter-frame prediction, the MPU is desirably configured in units of GOP (Group of Pictures). In addition, when the size of MFU to be transmitted is small, a single MFU may be stored in a single payload section, or a plurality of MFUs may be stored in a single payload section. In addition, when the size of MFU to be transmitted is large, a single MFU may be divided and then stored in a plurality of payload sections. In order to recover a packet loss on a transmission path, the MMTP packet may be protected by such techniques as AL-FEC (Application Layer Forward Error Correction) and ARQ (Automatic Repeat Request).

The broadcasting system of the present embodiment uses MPEG-H HEVC (High Efficiency Video Coding) as a video coding method, and uses MPEG-4 AAC (Advanced Audio Coding) or MPEG-4 ALS (Audio Lossless Coding) as an audio coding method. Coded data of video, audio, and the like of broadcasting programs that are coded by the methods described above is formatted into MFU or MPU, stored in an MMTP payload, encapsulated in an MMTP packet, and then transmitted in the form of an IP (Internet Protocol) packet. In addition, data contents related to broadcasting programs may also be formatted into MFU or MPU, stored in an MMTP payload, encapsulated in an MMTP packet, and then transmitted in the form of an IP packet. Four types of data contents transmission methods are prepared, which include a subtitle/caption transmission method used for data steaming synchronous with broadcasting, an application transmission method used for data transmission asynchronous with broadcasting, an event message transmission method used for synchronous/asynchronous message notification to applications operating on the television receiver, and a general-purpose data transmission method for synchronous/asynchronous transmission of other general-purpose data.

In the transmission of MMTP packets, UDP/IP (User Datagram Protocol/Internet Protocol) is used for the broadcast transmission path, and UDP/IP or TCP/IP (Transmission Control Protocol/Internet Protocol) is used for the communication line. Further, TLV (Type Length Value) multiplexing is used in the broadcast transmission path for efficient transmission of IP packets. Examples of protocol stack for the broadcasting system of the present embodiment are shown in FIG. 3. In FIG. 3, (A) shows an example of a protocol stack for the broadcast transmission path, and (B) shows an example of a protocol stack for the communication line.

The broadcasting system of the present embodiment provides a scheme for transmitting two types of control information, that is, MMT-SI (MMT-Signaling Information) and TLV-SI (TLV-Signaling Information). MMT-SI is control information indicating the configuration of a broadcasting program and the like. This control information is formatted into an MMT control message, stored in an MMTP payload, encapsulated in an MMTP packet, and then transmitted in the form of an IP packet. TLV-SI is control information related to IP packet multiplexing, and provides information for channel selection and correspondence information of IP addresses and services.

Further, even the broadcasting system using the MMT transmits time information in order to provide an absolute time. Note that component presentation time is indicated for each TS based on different clocks in the MPEG2-TS, while component presentation time is indicated based on the coordinated universal time (UTC) in the MMT. This scheme allows a terminal device to display components transmitted from different transmission points through different transmission paths in synchronization. IP packets conforming to an NTP (Network Time Protocol) are used for providing the UTC.

[Control Information of Broadcasting System Using MMT]

As described above, in the broadcasting system compatible with the broadcast receiving apparatus 100 of the present embodiment, TLV-SI related to a TLV multiplexing method for multiplexing IP packets and MMT-SI related to MMT which is a media transport method are prepared as the control information. TLV-SI provides information with which the broadcast receiving apparatus 100 demultiplexes IP packets multiplexed in the broadcast transmission path. TLV-SI is composed of a "table" and a "descriptor". The "table" is transmitted in a section format, and the "descriptor" is placed in the "table". MMT-SI is transmission control information indicating the information related to configuration of an MMT package and broadcasting services. MMT-SI has a three-layer structure composed of a "message" layer storing "table" and "descriptor", a "table" layer having an element and property that indicate specific information, and a "descriptor" layer indicating more detailed information.

An example of the layer structure of the control information used in the broadcasting system of the present embodiment is shown in FIG. 4.

<Tables Used for TLV-SI>

FIG. 5A shows a list of "tables" used for TLV-SI of the broadcasting system compatible with the broadcast receiving apparatus 100 of the present embodiment. In the present embodiment, the following tables are used as "tables" of TLV-SI.

(1) TLV-NIT

A network information table for TLV (TLV-NIT) provides information related to the physical configuration of a TLV stream transmitted through a network and indicates the characteristics of the network.

(2) AMT

An address map table (AMT) provides a list of multicast groups of IP packets making up respective services transmitted through the network.

(3) Table Set by Provider

Other tables set uniquely by the service provider and the like may be prepared.

<Descriptors Used for TLV-SI>

FIG. 5B shows a list of "descriptors" included in TLV-SI of the broadcasting system compatible with the broadcast receiving apparatus 100 of the present embodiment. In the present embodiment, the following descriptors are used as "descriptors" of TLV-SI.

(1) Service List Descriptor

A service list descriptor provides a list of services classified by service identifications and service types.

(2) Satellite Delivery System Descriptor

A satellite delivery system descriptor indicates physical conditions for a satellite transmission path.

(3) System Management Descriptor

A system management descriptor is used to distinguish broadcasting from non-broadcasting.

(4) Network Name Descriptor

A network name descriptor describes a network name with character codes.

(5) Descriptor Set by Provider

Other descriptors set uniquely by the service provider and the like may be prepared.

<Messages Used for MMT-SI>

FIG. 6A shows a list of "messages" used for MMT-SI of the broadcasting system compatible with the broadcast receiving apparatus 100 of the present embodiment. In the present embodiment, the following messages are used as "messages" of MMT-SI.

(1) PA Message

A package access (PA) message is used to transmit various tables.

(2) M2 Section Message

An M2 section message is used to transmit section extension format of the MPEG-2 Systems.

(3) CA Message

A CA message is used to transmit a table for identifying a conditional access method.

(4) M2 Short Section Message

An M2 short section message is used to transmit section short format of the MPEG-2 Systems.

(5) Data Transmission Message

A data transmission message is a message storing a table related to data transmission.

(6) Message Set by Provider

Other messages set uniquely by the service provider and the like may be prepared.

<Tables Used for MMT-SI>

FIG. 6B shows a list of "tables" used for MMT-SI of the broadcasting system compatible with the broadcast receiving apparatus 100 of the present embodiment. A table is control information having an element and property that indicate specific information. A table is stored in a message and is encapsulated in an MMTP packet to be transmitted. Note that a message that stores a table may be determined in accordance with the type of the table. In the present embodiment, the following tables are used as "tables" of MMT-SI.

(1) MPT

An MMT package table (MPT) provides package configuration information such as a list of assets and locations of assets on the network. An MPT may be stored in a PA message.

(2) PLT

A package list table (PLT) presents a list of IP data flows for transmitting PA messages of MMT packages provided as a broadcasting service, packet IDs, and IP data flows for transmitting IP services. A PLT may be stored in a PA message.

(3) LCT

A layout configuration table (LCT) is used to correlate layout information for presentation with layout numbers. An LCT may be stored in a PA message.

(4) ECM

An entertainment control message (ECM) is common information made up of program information and control information, and delivers key information for descrambling and others. An ECM may be stored in an M2 section message.

(5) EMM

An entitlement management message (EMM) is used to transmit personal information including contract information for individual subscribers and key information for decoding ECM (common information). An EMM may be stored in an M2 section message.

(6) CAT (MH)

A conditional access table (CA table (CAT)) (MH) is used to store a descriptor for identifying a conditional access method. A CAT (MH) may be stored in a CA message.

(7) DCM

A download control message (DCM) transmits key-related information including a key for decoding a transmission path code for downloading. A DCM may be stored in an M2 section message.

(8) DMM

A download management message (DMM) transmits key-related information including a download key for decoding an encoded DCM. A DMM may be stored in an M2 section message.

(9) MH-EIT

An MH-event information table (MH-EIT) is time-series information related to events included in each service. An MH-EIT may be stored in an M2 section message.

(10) MH-AIT

An MH-application information table (MH-AIT) stores all the information related to applications and startup conditions required for applications. An MH-AIT may be stored in an M2 section message.

(11) MH-BIT

An MH-broadcaster information table (MH-BIT) is used to provide information of broadcasters present on the network. An MH-BIT may be stored in an M2 section message.

(12) MH-SDTT

An MH-software download trigger table (MH-SDTT) is used to provide download announcement information. An MH-SDTT may be stored in an M2 section message.

(13) MH-SDT

An MH-service description table (MH-SDT) has a sub-table indicating a service included in a specific TLV stream and transmits information related to a sub-channel such as a name of sub-channel and a name of a broadcaster. An MH-SDT may be stored in an M2 section message.

(14) MH-TOT

An MH-time offset table (MH-TOT) transmits JST time and date (Modified Julian Date) information. An MH-TOT may be stored in an M2 short section message.

(15) MH-CDT

An MH-common data table (MH-CDT) is used to transmit common data, which should be stored in a non-volatile memory, in a section format to all receivers that receive the MH-CDT. An MH-CDT may be stored in an M2 section message.

(16) DDM table

A data directory management (DDM) table provides a directory configuration of files making up an application in order to separate a file configuration of the application from a configuration for file transmission. A DDM table may be stored in a data transmission message.

(17) DAM table

A data asset management (DAM) table provides a configuration of MPU in an asset and version information of each MPU. A DAM table may be stored in a data transmission message.

(18) DCC Table

A data content configuration (DCC) table provides configuration information of files as data contents in order to achieve flexible and effective cache control. A DCC table may be stored in a data transmission message.

(19) EMT

An event message table (EMT) is used to transmit information related to an event message. An EMT may be stored in an M2 section message.

(20) Table Set by Provider

Other tables set uniquely by the service provider and the like may be provided.

<Descriptors Used for MMT-SI>

FIGS. 6C and 6D show lists of "descriptors" included in MMT-SI of the broadcasting system compatible with the broadcast receiving apparatus 100 of the present embodiment. A descriptor is control information that provides more detailed information, and is included in a table. Note that a table in which a descriptor is included may be determined in accordance with the type of the descriptor. In the present embodiment, the following descriptors are used as "descriptors" of MMT-SI.

(1) Asset Group Descriptor

An asset group descriptor provides a relation of an asset group and a priority in the group. An asset group descriptor may be included in the MPT.

(2) Event Package Descriptor

An event package descriptor provides a correlation between an event, which represents a program, and a package. An event package descriptor may be included in MH-EIT stored in an M2 section message to be transmitted.

(3) Background Color Specifying Descriptor

A background color specifying descriptor provides a background color of a rearmost plane in layout specification. A background color specifying descriptor may be included in LCT.

(4) MPU Presentation Region Specifying Descriptor

An MPU presentation region specifying descriptor provides a location of presentation of MPU. An MPU presentation region specifying descriptor may be included in the MPT.

(5) MPU Timestamp Descriptor

An MPU timestamp descriptor indicates the time of presentation of the first access unit in the presentation order in the MPU. An MPU timestamp descriptor may be included in the MPT.

(6) Dependency Relation Descriptor

A dependency relation descriptor provides asset IDs for assets dependent on each other. A dependency relation descriptor may be included in the MPT.

(7) Access Control Descriptor

An access control descriptor provides information for identifying the conditional access method. An access control descriptor may be included in the MPT or CAT (MH).

(8) Scramble Method Descriptor

A scramble method descriptor provides information for identifying a target to be encoded at the time of scrambling and a type of an encoding algorithm. A scramble method descriptor may be included in the MPT or CAT (MH).

(9) Message Authentication Method Descriptor

A message authentication method descriptor provides information for identifying a message authentication method when message authentication is performed. A message authentication method descriptor may be included in the MPT or CAT (MH).

(10) Emergency Information Descriptor (MH)

An emergency information descriptor (MH) is used when emergency warning broadcasting is performed. An emergency information descriptor (MH) may be included in the MPT.

(11) MH-MPEG-4 Audio Descriptor

An MH-MPEG-4 audio descriptor is used to describe basic information for specifying coding parameters of an audio stream defined in ISO/IEC 14496-3 (MPEG-4 audio). An MH-MPEG-4 audio descriptor may be included in the MPT.

(12) MH-MPEG-4 Audio Extension Descriptor

An MH-MPEG-4 audio extension descriptor is used to describe a profile, level, and specific setting to a coding method of an MPEG-4 audio stream. An MH-MPEG-4 audio extension descriptor may be included in the MPT.

(13) MH-HEVC Video Descriptor

An MH-HEVC video descriptor is used to describe basic coding parameters for a video stream (HEVC stream) defined in ITU-T Recommendation H.265 and ISO/IEC 23008-2. An MH-HEVC video descriptor may be included in the MPT.

(14) MH-Link Descriptor

An MH-link descriptor identifies a service that is provided when a viewer demands additional information related to a specific matter described in a program arrangement information system. An MH-link descriptor may be included in the MPT, MH-EIT, MH-SDT, and the like.

(15) MH-Event Group Descriptor

An MH-event group descriptor is used to indicate that a plurality of events form a group when these events are related to one another. An MH-event group descriptor may be included in MH-EIT.

(16) MH-Service List Descriptor

An MH-service list descriptor provides a list of services classified by service identifications and service types. An MH-service list descriptor may be included in MH-BIT.

(17) MH-Short Format Event Descriptor

An MH-short format event descriptor represents an event name and a short description of the event in a text format. An MH-short format event descriptor may be included in MH-EIT.

(18) MH-Extension Format Event Descriptor

An MH-extension format event descriptor is added to an MH-short format event descriptor, and provides a detailed description of an event. An MH-extension format event descriptor may be included in MH-EIT.

(19) Video Component Descriptor

A video component descriptor provides parameters and description for a video component, and is used also for expressing an elementary stream in a text format. A video component descriptor may be included in the MPT or MH-EIT.

(20) MH-Stream Identifying Descriptor

An MH-stream identifying descriptor is used to attach a label to a component stream for a service so that descriptive contents indicated by a video component descriptor in MH-EIT can be referred to with the label. An MH-stream identifying descriptor may be included in the MPT.

(21) MH-Content Descriptor

An MH-content descriptor indicates the genre of an event. An MH-content descriptor may be included in MH-EIT.

(22) MH-Parental Rate Descriptor

An MH-parental rate descriptor indicates age-based viewing restriction, and is used to extend the range of restriction based on other restriction conditions. An MH-parental rate descriptor may be included in the MPT or MH-EIT.

(23) MH-Audio Component Descriptor

An MH-audio component descriptor provides parameters for an audio elementary stream, and is used also for expressing the elementary stream in a text format. An MH-audio component descriptor may be included in the MPT or MH-EIT.

(24) MH-Target Area Descriptor

An MH-target area descriptor is used to describe a target area of a program or some streams making up the program. An MH-target area descriptor may be included in the MPT.

(25) MH-Series Descriptor

An MH-series descriptor is used to identify a series program. An MH-series descriptor may be included in MH-EIT.

(26) MH-SI Transmission Parameter Descriptor

An MH-SI transmission parameter descriptor is used to indicate SI transmission parameters. An MH-SI transmission parameter descriptor may be included in MH-BIT.

(27) MH-Broadcaster Name Descriptor

An MH-broadcaster name descriptor describes a name of a broadcaster. An MH-broadcaster name descriptor may be included in MH-BIT.

(28) MH-Service Descriptor

An MH-service descriptor expresses a name of a sub-channel and a name of a provider of the sub-channel in character code together with a service type. An MH-service descriptor may be included in MH-SDT.

(29) IP Data Flow Descriptor

An IP data flow descriptor provides information of IP data flow making up a service. An IP data flow descriptor may be included in MH-SDT.

(30) MH-CA Startup Descriptor

An MH-CA startup descriptor describes startup information for starting a CAS program on a CAS board. An MH-CA startup descriptor may be included in the MPT or CAT (CA).

(31) MH-Type Descriptor

An MH-Type descriptor indicates a type of a file transmitted by an application transmission method. An MH-Type descriptor may be included in a DAM table.

(32) MH-Info Descriptor

An MH-Info descriptor describes information related to MPU or an item. An MH-Info descriptor may be included in a DAM table.

(33) MH-Expire Descriptor

An MH-Expire descriptor describes an expiration date of an item. An MH-Expire descriptor may be included in a DAM table.

(34) MH-Compression Type Descriptor

An MH-Compression Type descriptor states that an item to be transmitted is compressed, and indicates a compression algorithm for the compression and the number of bytes of the item before the compression. An MH-Compression Type descriptor may be included in a DAM table.

(35) MH-Data Coding Method Descriptor

An MH-data coding method descriptor is used to identify a data coding method. An MH-data coding method descriptor may be included in the MPT.

(36) UTC-NPT Reference Descriptor

A UTC-NPT reference descriptor is used to transmit a relation between NPT (Normal Play Time) and UTC. A UTC-NPT reference descriptor may be included in EMT.

(37) Event Message Descriptor

An event message descriptor transmits information generally related to event messages. An event message descriptor may be included in EMT.

(38) MH-Local Time Offset Descriptor

An MH-local time offset descriptor is used to provide a given offset value to actual time (e.g., UTC+9 hours) and display time to a human system when a daylight saving time system is implemented. An NH-local time offset descriptor may be included in MH-TOT.

(39) MH-Component Group Descriptor

An MH-component group descriptor defines and identifies a combination of components in an event. An NH-component group descriptor may be included in MH-EIT.

(40) MH-Logo Transmission Descriptor

An MH-logo transmission descriptor is used to describe pointing to a character string for a simplified logo and a logo in a CDT format. An MH-logo transmission descriptor may be included in MH-SDT.

(41) MPU Extension Timestamp Descriptor

An MPU extension timestamp descriptor provides a time to decode an access unit in MPU. An MPU extension timestamp descriptor may be included in the MPT.

(42) MPU Download Contents Descriptor

An MPU download contents descriptor is used to describe property information of contents that are downloaded using MPU. An MPU download contents descriptor may be included in MH-SDTT.

(43) MH-Network Download Contents Descriptor

An MH-network download contents descriptor is used to describe property information of contents that are downloaded through the network. An MH-network download contents descriptor may be included in MH-SDTT.

(44) MH-Application Descriptor

An MH-application descriptor describes information of an application. An MH-application descriptor may be included in an MH-AIT.

(45) MH-Transmission Protocol Descriptor

An MH-transmission protocol descriptor is used to specify a transmission protocol for broadcasting, communication, and the like, and to provide location information of an application depending on the transmission protocol. An MH-transmission protocol descriptor may be included in the MH-AIT.

(46) MH-Simplified Application Location Descriptor

An MH-simplified application location descriptor provides the detailed description of an acquisition destination of an application. An MH-simplified application location descriptor may be included in the MH-AIT.

(47) MH-Application Boundary Authority Setting Descriptor

An MH-application boundary authority setting descriptor provides a description for setting an application boundary and setting an authority for access to broadcasting resources for each region (URL). An MH-application boundary authority setting descriptor may be included in the MH-AIT.

(48) MH-Startup Priority Information Descriptor

An MH-startup priority information descriptor provides a description for specifying a startup priority of an application. An NH-startup priority information descriptor may be included in the MH-AIT.

(49) NH-Cache Information Descriptor

An NH-cache information descriptor provides a description used for cache control in a case where resources making up an application are saved in a cache when reuse of the application is assumed. An NH-cache information descriptor may be included in the MH-AIT.

(50) NH-Probability-Applied Delay Descriptor

An NH-probability-applied delay descriptor provides a description for delaying the time of execution of application control by a delay time set probabilistically, with the expectation that server access loads for acquiring the application are to be dispersed. An NH-probability-applied delay descriptor may be included in the MH-AIT.

(51) Link Destination PU Descriptor

A link destination PU descriptor describes another presentation unit (PU) to which a presentation unit may possibly make transition. A link destination PU descriptor may be included in a DCC table.

(52) Lock Cache Specifying Descriptor

A lock cache specifying descriptor describes a description for specifying a file to be cached and locked in a presentation unit. A lock cache specifying descriptor may be included in a DCC table.

(53) Unlock Cache Specifying Descriptor

An unlock cache specifying descriptor provides a description for specifying a file to be unlocked among locked files in a presentation unit. An unlock cache specifying descriptor may be included in a DCC table.

(54) Descriptor Set by Provider

Other descriptors set uniquely by the service provider and the like may be prepared.

<Relation between Data Transmission and Control Information in MMT Method>

Here, the relation between data transmission and typical tables in the broadcasting system compatible with the broadcast receiving apparatus 100 of the present embodiment will be described with reference to FIG. 6E.

The broadcasting system compatible with the broadcast receiving apparatus 100 of the present embodiment can perform data transmission through a plurality of routes such as TLV streams transmitted through the broadcast transmission path and IP data flows transmitted through the communication line. A TLV stream includes TLV-SI such as a TLV-NIT and an AMT and an IP data flow which is a data flow of IP packets. The IP data flow includes a video asset including a series of video MPUs and an audio asset including a series of audio MPUs. Similarly, the IP data flow may include a subtitle asset including a series of subtitle MPUs, a caption asset including a series of caption MPUs, and a data asset including a series of data MPUs. These various assets are associated in units of "package" by the MPT (MMT package table) which is stored in a PA message to be transmitted. Specifically, these assets are associated by describing a package ID (corresponding to "MMT_package_id_byte" parameter which will be shown later in FIG. 17) and asset IDs (corresponding to "asset_id_byte" parameter which will be shown later in FIG. 17) for respective assets included in the package, in the MPT.

Figure 6E:
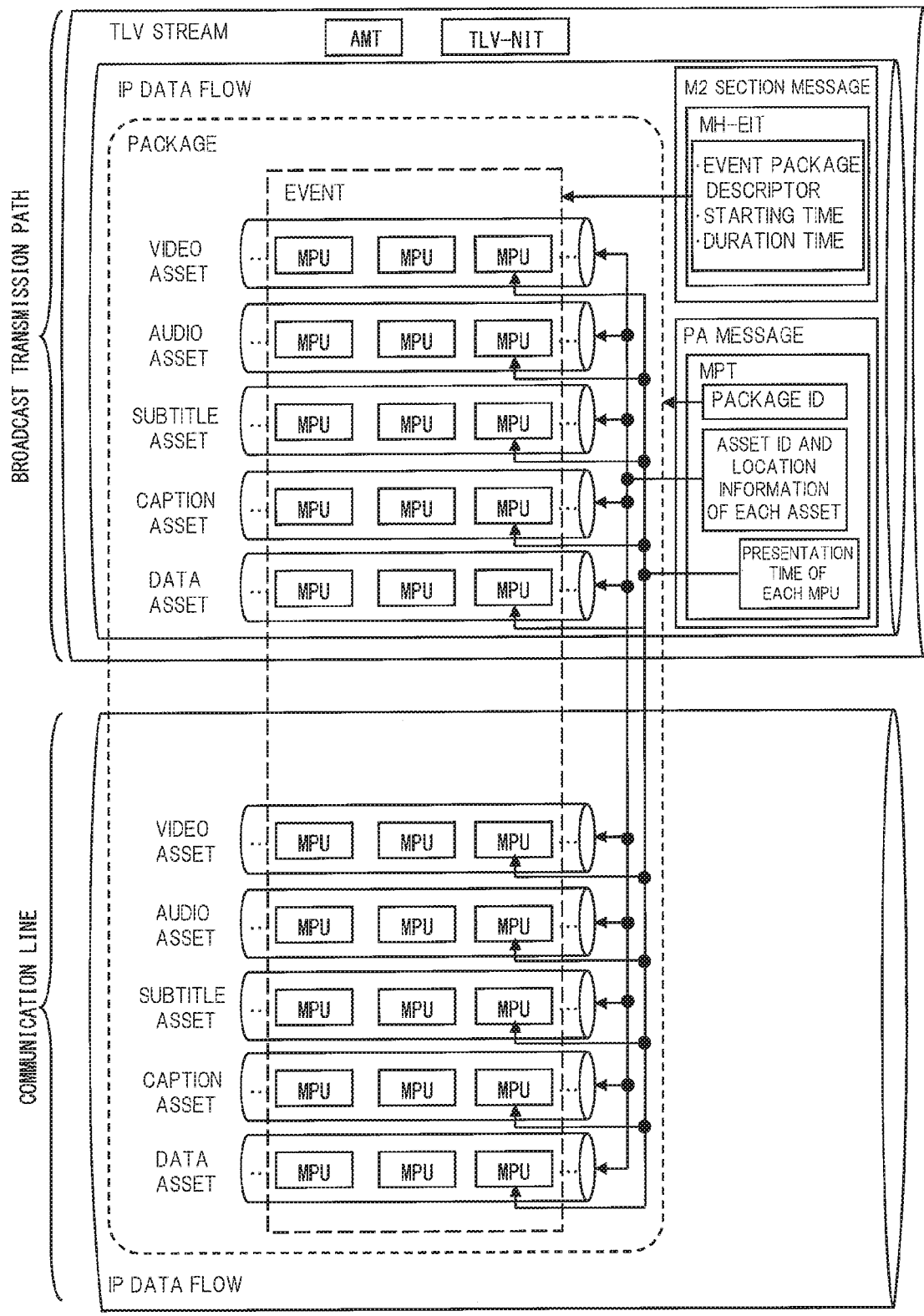
FIG. 6E is a diagram showing the relation between data transmission and each table in the broadcasting system.

The assets making up a package may be limited to assets in a TLV stream, but may include assets transmitted by an IP data flow through the communication line as shown in FIG. 6E. This is made possible by providing location information (corresponding to "MMT_general_location_info( )" which will be shown later in FIG. 17) of the assets included in the package in the MPT so that the broadcast receiving apparatus 100 of the present embodiment can know the reference destination of each asset. Specifically, by changing the value of an "MMT_general_location_infonolocation_type" parameter which is included in the location information, the broadcast receiving apparatus 100 can refer to various pieces of data transmitted through various transmission routes including:

(1) data multiplexed in the same IP data flow as the MPT (location_type=0x00);

(2) data multiplexed in an IPv4 data flow (location_type=0x01);

(3) data multiplexed in an IPv6 data flow (location_type=0x02);

(4) data multiplexed in a broadcasting MPEG2-TS (location_type=0x03);

(5) data multiplexed in an MPEG2-TS format in an IP data flow (location_type=0x04); and (6) data located by a specified URL (location_type=0x05).

Among the above reference destinations, (1) is, for example, an IP data flow that is received in the form of a digital broadcasting signal received by a tuner/demodulating unit 131 of the broadcast receiving apparatus 100 to be described later with reference to FIG. 7A. When the MPT is included also in an IP data flow on the side of a communication line and is transmitted, the reference destination of (1) may be changed to an IP data flow received by a LAN communication unit 121 to be described later through the communication line. Further, (2), (3), (5), and (6) described above are IP data flows received by the LAN communication unit 121 to be described later through the communication line. In addition, (4) described above can be used when to refer to the data multiplexed in MPEG2-TS received by the receiving function of receiving digital broadcasting signals transmitted by the MPEG2-TS method on the basis of location information ("MMT_general_location_info( )") of the MPT included in a digital broadcasting signal transmitted by the MMT method, in the case of the broadcast receiving apparatus having both of a receiving function of receiving digital broadcasting signals transmitted by the MMT method and a receiving function of receiving digital broadcasting signals transmitted by the MPEG2-TS method, like a broadcast receiving apparatus 800 of a second embodiment to be described later with reference to FIG. 24.

Note that the data making up the "package" is specified in the above-described manner, and a series of data grouped in a unit of "package" are treated as a "service" unit for digital broadcasting in the broadcasting system compatible with the broadcast receiving apparatus 100 of the present embodiment.

Moreover, presentation time information of each MPU specified by the MPT (corresponding to "mpu_presentation_time" parameter to be shown later in FIG. 133) is described in the MPT, and a plurality of MPUs specified by the MPT can be presented (displayed or output) in conjunction with each other by using the presentation time information, with reference to a clock based on the NTP which is time information expressed by the UTC notation. Presentation control of various data using the clock based on the NTP will be described later.

The data transmission method of the present embodiment shown in FIG. 6E further includes a concept of "event". "Event" is a concept representing a so-called "program" handled by MH-EIT included in an M2 section message to be transmitted. Specifically, in the "package" indicated by an event package descriptor stored in the MH-EIT, a series of data included in a period between a start time (corresponding to a "start_time" parameter to be described later in FIG. 21) stored in the MH-EIT and the end of a duration time (corresponding to a "duration" parameter to be described later in FIG. 21) are data included in the concept of "event". The MH-EIT can be used for various processes performed in units of "event" (e.g., process of creating a program guide, process of controlling timer recording and viewing reservation, process of protecting copy rights such as temporary data storage, etc.) in the broadcast receiving apparatus 100 of the present embodiment.

[Hardware Configuration of Broadcast Receiving Apparatus]

Figure 7A:
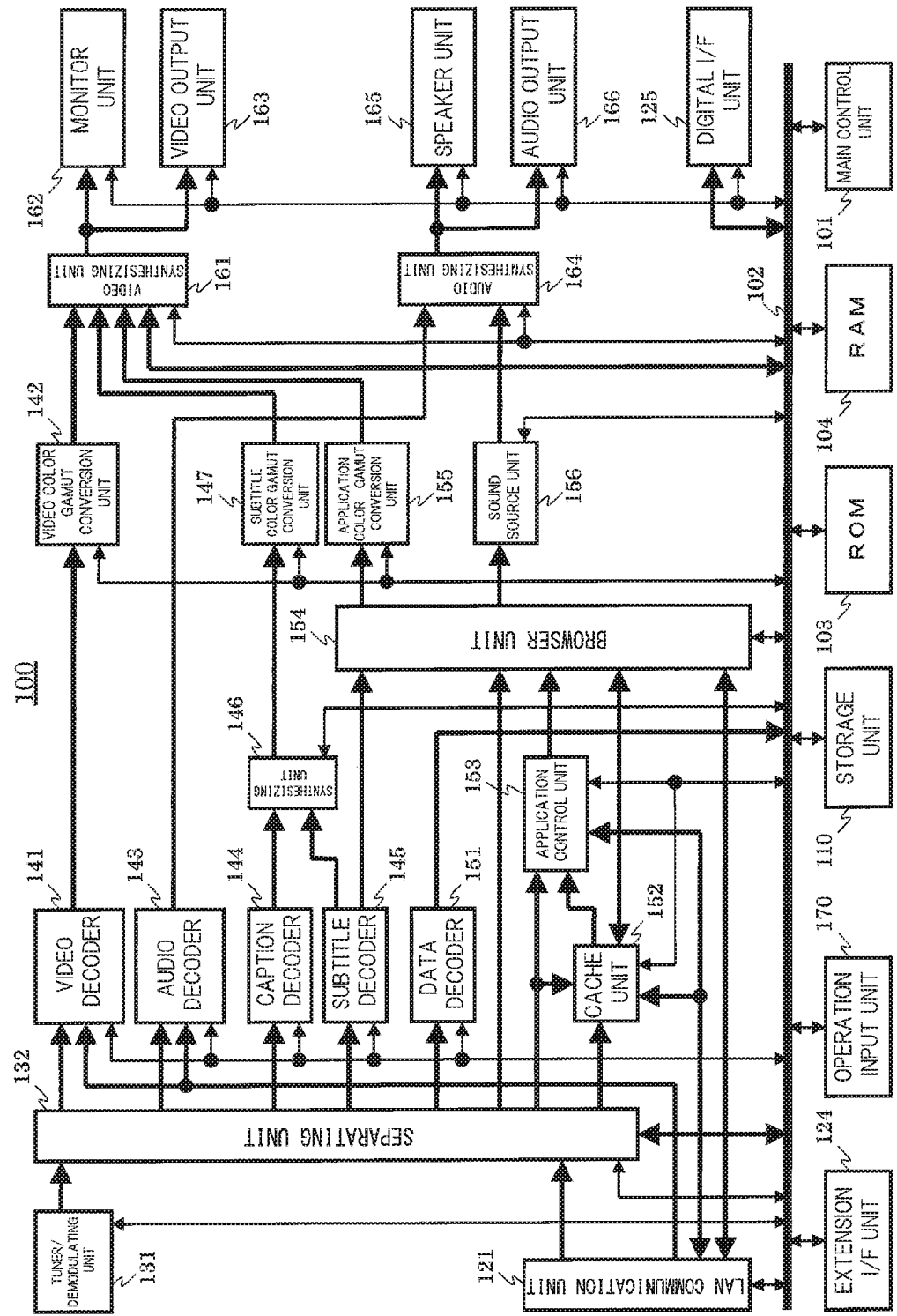
FIG. 7A is a block diagram of the broadcast receiving apparatus according to the first embodiment.

FIG. 7A is a block diagram showing an example of an internal configuration of the broadcast receiving apparatus 100. The broadcast receiving apparatus 100 includes a main control unit 101, a system bus 102, a ROM 103, a RAM 104, a storage (accumulation) unit 110, the LAN communication unit 121, an extension interface unit 124, a digital interface unit 125, the tuner/demodulating unit 131, a separating unit 132, a video decoder 141, a video color gamut conversion unit 142, an audio decoder 143, a caption decoder 144, a subtitle decoder 145, a subtitle synthesizing unit 146, a subtitle color gamut conversion unit 147, a data decoder 151, a cache unit 152, an application control unit 153, a browser unit 154, an application color gamut conversion unit 155, a sound source unit 156, a video synthesizing unit 161, a monitor unit 162, a video output unit 163, an audio synthesizing unit 164, a speaker unit 165, an audio output unit 166, and an operation input unit 170.

The main control unit 101 is a microprocessor unit that controls the whole of the broadcast receiving apparatus 100 in accordance with a predetermined operating program. The system bus 102 is a data communication path through which data is exchanged between the main control unit 101 and each of operating blocks in the broadcast receiving apparatus 100.

The ROM (Read Only Memory) 103 is a non-volatile memory storing a basic operating program such as operating system and other operating programs, and is provided as, for example, a rewritable ROM such as an EEPROM (Electrically Erasable Programmable ROM) and a flash ROM. The ROM 103 may store operation set values necessary for the operation of the broadcast receiving apparatus 100. The RAM (Random Access Memory) 104 serves as a work area used when the basic operating program and other operating programs are executed. The ROM 103 and the RAM 104 may be integrated with the main control unit 101. Further, a part of the memory region of the storage (accumulation) unit 110 may be used as the ROM 103 instead of providing the ROM 103 having the independent configuration shown in FIG. 7A.

The storage (accumulation) unit 110 stores the operating programs and operation set values of the broadcast receiving apparatus 100 and personal information of the user of the broadcast receiving apparatus 100. In addition, the storage (accumulation) unit 110 can store an operating program downloaded through the Internet 200 and various data created by the operating program. Further, the storage (accumulation) unit 110 can store such contents as moving images, still images, and sounds that are acquired from broadcast waves or downloaded through the Internet 200. A part of the memory region of the storage (accumulation) unit 110 may be used to substitute for a part or the whole of the function of the ROM 103. Further, the storage (accumulation) unit 110 needs to retain the stored information even when power is not supplied to the broadcast receiving apparatus 100 from an external power source. Therefore, the storage (accumulation) unit 110 is provided as, for example, a non-volatile semiconductor element memory such as a flash ROM or an SSD (Solid State Driver) or a magnetic disk drive such as an HDD (Hard Disc Drive).

Note that the operating programs stored in the ROM 103 and the storage (accumulation) unit 110 can be added, updated and functionally extended by a downloading process from server devices on the Internet 200.

The LAN (Local Area Network) communication unit 121 is connected to the Internet 200 via the router device 200r, and transmits and receives data to and from server devices and other communication equipment on the Internet 200. Further, the LAN communication unit 121 acquires an MMT data string (or part of it) of a program transmitted through the communication line. The LAN communication unit 121 may be connected to the router device 200r through wired communication or wireless communication such as Wi-Fi (registered trademark). The LAN communication unit 121 has a coding circuit, a decoding circuit, and the like. In addition, the broadcast receiving apparatus 100 may further include other communication units such as a BlueTooth (registered trademark) communication unit, an NFC communication unit, and an infrared communication unit.

The tuner/demodulating unit 131 receives broadcast waves transmitted from the radio tower 300t via the antenna 100a, and tunes to (selects) a channel giving a service that the user wishes to have, under the control by the main control unit 101. Further, the tuner/demodulating unit 131 demodulates a received broadcasting signal to acquire an MMT data string. Although the example of FIG. 7A shows the configuration in which the broadcast receiving apparatus 100 has one tuner/demodulating unit, the broadcast receiving apparatus 100 may be configured to have a plurality of tuner/demodulating units for the purpose of simultaneously displaying a plurality of screens or recording a program on a different channel.

The separating unit 132 is an MMT decoder, and distributes a video data string, an audio data string, a caption data string, a subtitle data string, and the like which are real-time presentation elements to the video decoder 141, the audio decoder 143, the caption decoder 144, the subtitle decoder 145, and the like, respectively, based on a control signal included in an MMT data string inputted to the separating unit 132. Data inputted to the separating unit 132 may be an MMT data string transmitted through the broadcast transmission path to the tuner/demodulating unit 131 and demodulated therein or an MMT data string transmitted through the communication line to the LAN communication unit 121. Further, the separating unit 132 reproduces a multimedia application and filed data which is an element making up the multimedia application, and stores them temporarily in the cache unit 152. In addition, the separating unit 132 extracts and outputs general-purpose data to the data decoder 151 in order to use it for the streaming of data used by a player that presents data other than video, audio, and subtitle or for the streaming of data for an application. Further, the separating unit 132 may perform control such as error correction, access restriction, and the like on the input MMT data string under the control by the main control unit 101.

The video decoder 141 decodes a video data string input from the separating unit 132 and outputs video information. The video color gamut conversion unit 142 performs a color space conversion process on the video information decoded in the video decoder 141 when necessary, in preparation for a video synthesizing process in the video synthesizing unit 161. The audio decoder 143 decodes an audio data string input from the separating unit 132 and outputs audio information. Further, for example, streaming data of an MPEG-DASH (MPEG-Dynamic Adaptive Streaming over HTTP) format or the like acquired from the Internet 200 through the LAN communication unit 121 may be inputted to the video decoder 141 and the audio decoder 143. A plurality of video decoders 141, video color gamut conversion units 142, audio decoders 143, and the like may be provided in order to simultaneously decode a plurality of kinds of video data strings and audio data strings.

The caption decoder 144 decodes a caption data string input from the separating unit 132 and outputs caption information. The subtitle decoder 145 decodes a subtitle data string input from the separating unit 132 and outputs subtitle information. The caption information output from the caption decoder 144 and the subtitle information output from the subtitle decoder 145 are subjected to a synthesizing process in the subtitle synthesizing unit 146 and then subjected to a color space conversion process in the subtitle color gamut conversion unit 147 when necessary, in preparation for the video synthesizing process in the video synthesizing unit 161. In the present embodiment, among services presented simultaneously with the video of a broadcasting program and provided mainly as text information, a service related to the video contents is referred to as subtitle, while a service other than that is referred to as caption. When these services are not distinguished from each other, they are f referred to as subtitle.

The browser unit 154 presents a multimedia application file and filed data making up the multimedia application file, which are acquired from the cache unit 152 or a server device on the Internet 200 through the LAN communication unit 121, in accordance with an instruction of the application control unit 153, which interprets control information included in an MMT data string and control information acquired from a server device on the Internet 200 through the LAN communication unit 121. Note that the multimedia application file may be, for example, an HTML (Hyper Text Markup Language) document or BML (Broadcast Markup Language) document. The application information output from the browser unit 154 is subjected to a color space conversion process in the application color gamut conversion unit 155 when necessary, in preparation for the video synthesizing process in the video synthesizing unit 161. Further, the browser unit 154 causes the sound source unit 156 to reproduce application audio information.

The video synthesizing unit 161 receives video information output from the video color gamut conversion unit 142, subtitle information output from the subtitle color gamut conversion unit 147, application information output from the application color gamut conversion unit 155, and the like, and performs a selection process and/or a superposition process as appropriate. The video synthesizing unit 161 has a video RAM (not shown), and the monitor unit 162 and the like are driven based on video information and the like inputted to the video RAM. Further, the video synthesizing unit 161 performs a scaling process and a superposing process of EPG (Electronic Program Guide) screen information created based on information such as MH-EIT included in MMT-SI when necessary under the control by the main control unit 101. The monitor unit 162 is, for example, a display device such as liquid crystal panel, and offers the video information subjected to the selection process and/or superposition process in the video synthesizing unit 161, to the user of the broadcast receiving apparatus 100. The video output unit 163 is a video output interface that outputs the video information subjected to the selection process and/or superposition process in the video synthesizing unit 161.

Figure 7B:
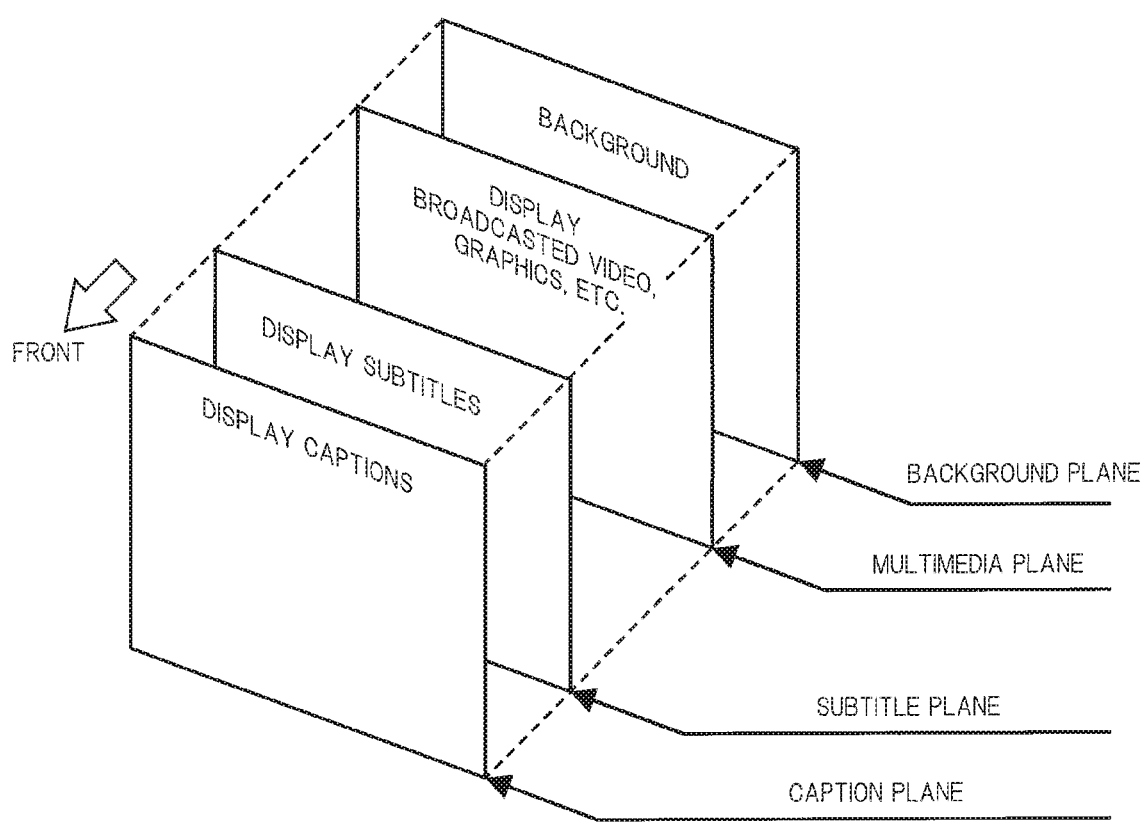
FIG. 7B is a configuration diagram of a logical plane structure of a presentation function of the broadcast receiving apparatus according to the first embodiment.

Note that the presentation function of the broadcast receiving apparatus 100 of the present embodiment has a logical plane structure for displaying a multimedia service in accordance with the intention of the service provider. FIG. 7B shows an example of a configuration of the logical plane structure that the presentation function of the broadcast receiving apparatus 100 of the present embodiment has. In the logical plane structure, a caption plane that displays captions is located on the forefront layer, a subtitle plane that displays subtitles is located on the second layer, a multimedia plane that displays broadcast video, multimedia application or synthesized video thereof is located on the third layer, and a background plane is located on the rearmost layer. The subtitle synthesizing unit 146 and the video synthesizing unit 161 draw the caption information on the caption plane, the subtitle information on the subtitle plane, and the video information, application information, and the like on the multimedia plane. Further, background color is drawn on the background plane based on an LCT included in MMT-SI. Note that it is also possible to provide a plurality of multimedia planes on the third layer in accordance with the number of video decoders 141. However, even when a plurality of multimedia planes is provided, application information and the like output from the application color gamut conversion unit 155 are displayed only on the multimedia plane located on the forefront layer.

The audio synthesizing unit 164 receives audio information output from the audio decoder 143 and application audio information reproduced in the sound source unit 156, and performs a selection process and/or a mixing process as appropriate. The speaker unit 165 offers audio information subjected to the selection process and/or mixing process in the audio synthesizing unit 164 to the user of the broadcast receiving apparatus 100. The audio output unit 166 is an audio output interface that outputs the audio information subjected to the selection process and/or mixing process in the audio synthesizing unit 164.

The extension interface unit 124 is a group of interfaces for extending the function of the broadcast receiving apparatus 100, and is configured of an analog video and audio interface, a USB (Universal Serial Bus) interface, a memory interface, and the like in the present embodiment. The analog video and audio interface receives analog video and audio signals from external video and audio output devices, and outputs analog video and audio signals to external video and audio input devices. The USE interface is connected to a PC and the like and transmits and receives data to and from the PC and the like. An HDD may be connected to the USB interface to record broadcasting programs and contents. A keyboard and other USB devices may also be connected to the USB interface. A memory card and other memory media are connected to the memory interface to transmit and receive data to and from them.

The digital interface unit 125 is an interface that outputs or receives coded digital video data and/or digital audio data. The digital interface unit 125 can output an MMT data string acquired by the demodulation in the tuner/demodulating unit 131, an MMT data string acquired through the LAN communication unit 121, or mixed data of the MMT data strings as it is. Further, the MMT data string input from the digital interface unit 125 may be controlled to be inputted to the separating unit 132. It is also possible to output the digital contents stored in the storage (accumulation) unit 110 via the digital interface unit 125 or store the digital contents to the storage (accumulation) unit 110 via the digital interface unit 125.

The digital interface unit 125 is provided as a DVI terminal, HDMI (registered trademark) terminal, or Displayer Port (registered trademark) terminal, and thus outputs and receives data in the format compliant with DVI specifications, HDMI specifications, or Displayer Port specifications. Alternatively, the digital interface unit 125 may output or receive data in a serial data format conforming to IEEE 1394 specifications and the like. Further, the digital interface unit 125 may be configured as an IP interface that performs the digital interface output via hardware such as Ethernet (registered trademark) and wireless LAN. In such a case, the digital interface unit 125 and the LAN communication unit 121 may share the hardware configuration.

The operation input unit 170 is an instruction input unit on which operation instructions to the broadcast receiving apparatus 100 are input. In the present embodiment, the operation input unit 170 is configured of a remote control receiving unit that receives commands transmitted from a remote controller and operation keys in which button switches are arranged (not shown), or may be configured of either the remote control receiving unit or the operation keys. Alternatively, the operation input unit 170 may be substituted by a touch panel overlaid on the monitor unit 162 or by a keyboard and others connected to the extension interface unit 124. The remote controller (not shown) may be substituted by the portable information terminal 700 having a remote control command transmission function.

Note that, when the broadcast receiving apparatus 100 is a television receiver or the like as mentioned above, the video output unit 163 and the audio output unit 166 are not essential constituent elements of the present invention. Further, the broadcast receiving apparatus 100 is not limited to a television receiver, but may be an optical disc drive recorder such as DVD (Digital Versatile Disc) recorder, a magnetic disk drive recorder such as an HDD recorder, or an STB (Set Top Box). The broadcast receiving apparatus 100 may also be a PC (Personal Computer), a tablet terminal, a navigation device, a game machine, and the like having a digital broadcast receiving function and a broadcasting/communication cooperation function. When the broadcast receiving apparatus 100 is the DVD recorder, the HDD recorder, STB, or the like, the broadcast receiving apparatus 100 does not have to be provided with the monitor unit 162 and the speaker unit 165. In such a case, the operation similar to that of the broadcast receiving apparatus 100 of the present embodiment is possible by connecting an external monitor and an external speaker to the video output unit 163, the audio output unit 166, or the digital interface unit 125.

[System Configuration for Clock Synchronization/Presentation Synchronization in Broadcast Receiving Apparatus]

Figure 7C:
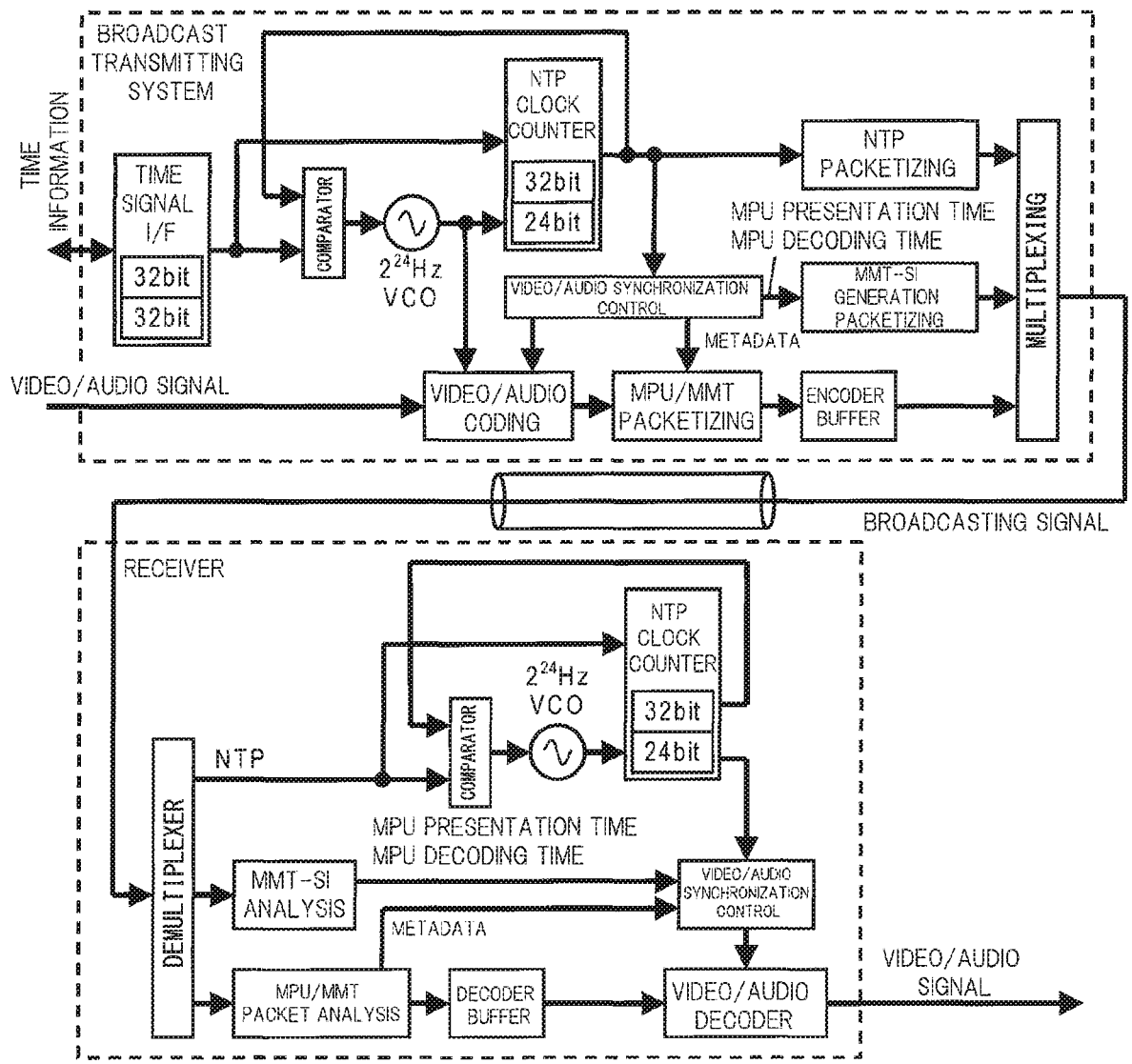
FIG. 7C is a system configuration diagram for clock synchronization/presentation synchronization in the broadcast receiving apparatus according to the first embodiment.

FIG. 7C shows an example of a system configuration for clock synchronization/presentation synchronization in the broadcasting system compatible with the broadcast receiving apparatus 100 of the present embodiment. In the broadcasting system of the present embodiment, UTC expressed in a 64-bit-length NTP timestamp format is transmitted from the broadcast transmitting system to the receiver (broadcast receiving apparatus 100 of the present embodiment). In the NTP timestamp format, "second or more" of UTC is expressed by 32 bits, and "less than second" is also expressed by 32 bits. In practice, however, it is difficult to reproduce one second in 32-bit precision. For this reason, for example, a clock with a frequency of "$24^{th}$ power of 2" Hz (about 16.8 MHz) may be used as a system clock for video system synchronization and a system clock for operating a timepiece conforming to the NTP as shown in FIG. 7C. Considering the fact that the frequency of a system clock adopted in a conventional broadcasting system is 27 MHz and the hardware configuration of the receiver can be simplified, it is desirable that a clock whose frequency is exponentiation of 2 ranging from "$24^{th}$ power of 2" to "$28^{th}$ power of 2" is adopted as the system clock.

When the frequency of the system clock is set to exponentiation of 2 ranging from "$24^{th}$ power of 2" to "$28^{th}$ power of 2" in the broadcast transmitting system and the receiver as described above, 4 to 8 low-order bits in the NTP timestamp format transmitted from the broadcast transmitting system to the receiver, the low-order bits being not referred to by a PLL (Phase Locked Loop) system for reproducing the system clock or the timepiece conforming to the NTP, may be fixed to "0" or "1". Namely, when the frequency of the system cock is "$n^{th}$ power of 2" Hz (n=24 in FIG. 7C), "32−n" low-order bits in the NTP timestamp format may be fixed to "0" or "1". Alternatively, the receiver may perform the process without regard for the "32−n" low-order bits in the NTP timestamp format.

When receiving time information in the NTP format, the broadcast transmitting system builds the PLL system with a 32+n bit counter including VCO (Voltage Controlled Oscillator) with a frequency of "$n^{th}$ power of 2" Hz, thereby providing a transmission system clock that synchronizes with the time information given from outside. Further, the broadcast transmitting system causes the overall signal processing units to operate in synchronization with the system clock of "$n^{th}$ power of 2" Hz. In addition, the broadcast transmitting system periodically transmits the output of the transmission system clock as time information in the NTP-length format to the receiver through the broadcast transmission path.

The receiver receives the time information in the NTP-length format through the broadcast transmission path and reproduces a reception system clock by the PLL system including the VCO with the frequency of "$n^{th}$ power of 2" Hz in the same manner as the broadcast transmitting system. As a result, the reception system clock works in synchronization with the transmission system clock of the broadcast transmitting system. Further, by operating the signal processing system of the receiver in synchronization with system clock of "$n^{th}$ power of 2" Hz, clock synchronization between the broadcast transmitting system and the receiver can be achieved, and thus the stable signal reproduction can be achieved. Further, decoding time and presentation time in units of presentation of video and audio signals are set based on the time information in the NTP format in the broadcast transmitting system. Here, an MPU timestamp descriptor to be described later with reference to FIG. 133 is stored in the MPT which is stored in a PA message transmitted by a broadcasting signal. In the MPU timestamp descriptor shown in FIG. 13B, an "mpu_sequence_number (MPU sequence number)" parameter indicates a sequence number for an MPU that describes a timestamp, and an "mpu_presentation_time (MPU presentation time)" parameter indicates the presentation time of the MPU in the 64-bit NTP timestamp format. Thus, the receiver can control timing of presenting (displaying or outputting) video signals, audio signals, subtitles, captions, and the like for each of MPUs by referring to the MPU timestamp descriptor stored in the MPT.

In the case of paying attention to the above-described control of decoding timing and presentation timing of video and audio signals in units of presentation, synchronization of video and audio signals can be ensured by a clock with a frequency of about "$16^{th}$ power of 2" Hz (about 65.5 KHz). In this case, it is not necessary to refer to 16 low-order bits in an NTP timestamp format described in an MPU timestamp descriptor or the like. Namely, when a clock of "$m^{th}$ power of 2" Hz, which is generated by dividing the frequency of system clock, is used for the control of decoding timing and presentation timing, it is not necessary to refer to "32−m" low-order bits in an NTP timestamp format described in an MPU timestamp descriptor or the like. Thus, the "32'm" low-order bits in the NTP timestamp format described in the MPU timestamp descriptor or the like may be fixed to "0" or "1".

[Software Configuration of Broadcast Receiving Apparatus]

Figure 7D:
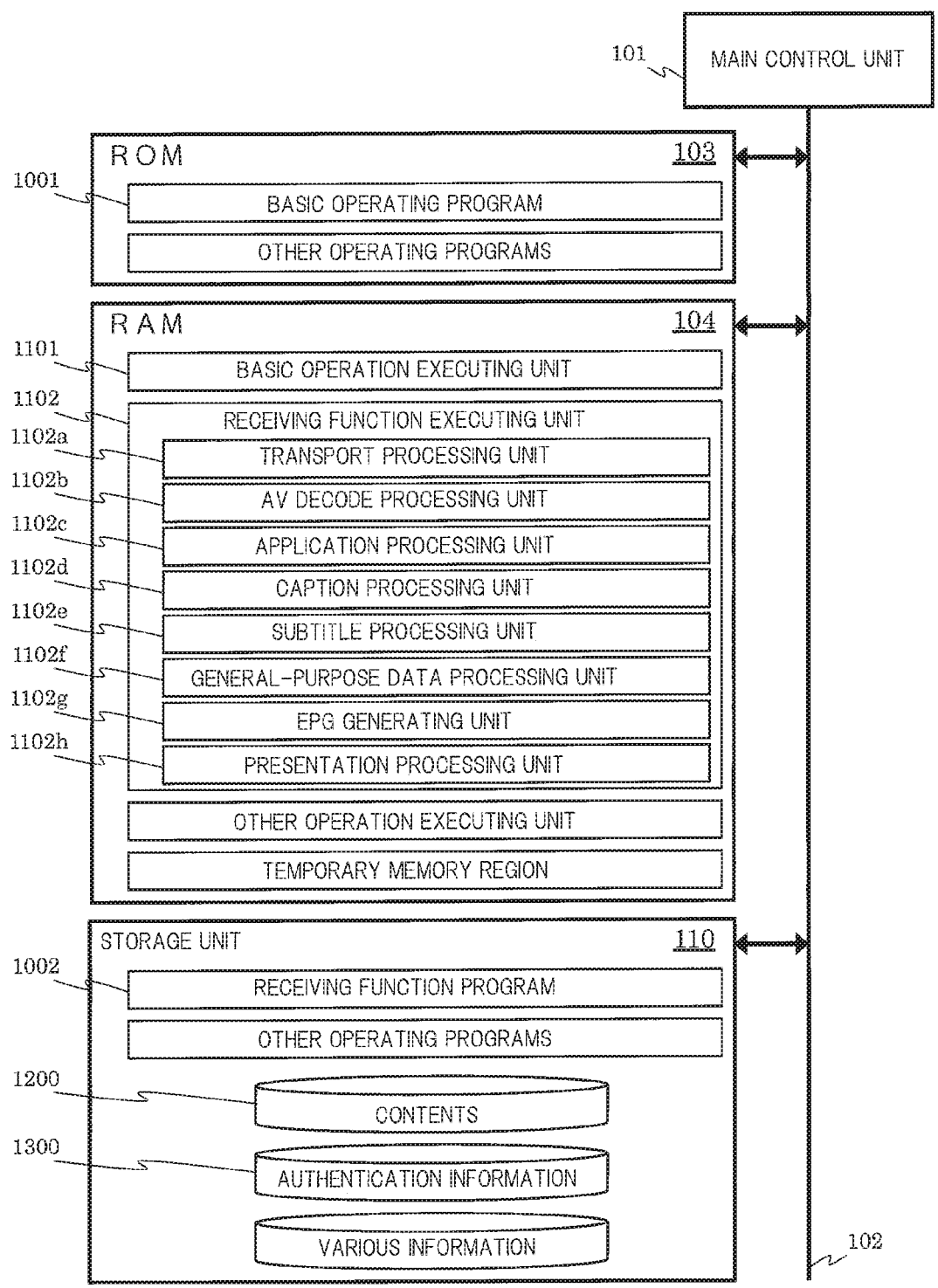
FIG. 7D is a software configuration diagram of the broadcast receiving apparatus according to the first embodiment.

FIG. 7D is a software configuration diagram of the broadcast receiving apparatus 100 of the present embodiment, and shows respective software configurations of the ROM 103, the RAM 104, and the storage (accumulation) unit 110. In the present embodiment, the ROM 103 stores a basic operating program 1001 and other operating programs, and the storage (accumulation) unit 110 stores a receiving function program 1002 and other operating programs. Further, the storage (accumulation) unit 110 includes a contents memory region 1200 storing such contents as moving images, still images, and sounds, an authentication information memory region 1300 storing authentication information and the like needed when access is made to an external portable terminal or server device, and a various information memory region storing other various types of information.

The basic operating program 1001 stored in the ROM 103 is loaded onto the RAM 104, and the loaded basic operating program is executed by the main control unit 101 to configure a basic operation executing unit 1101. Similarly, the receiving function program 1002 stored in the storage (accumulation) unit 110 is loaded onto the RAM 104, and the loaded receiving function program is executed by the main control unit 101 to configure a receiving function executing unit 1102. Further, the RAM 104 has a temporary memory region that temporarily saves data created at execution of each operating program when necessary.

In the following, for simpler description, a process in which the main control unit 101 loads the basic operating program 1001 from the ROM 103 onto the RAM 104 and executes the basic operating program 1001 to control each operating block is described simply as a process in which the basic operation executing unit 1101 performs control of each operating block. The same applies also to the description of other operating programs.

The receiving function executing unit 1102 controls each operating block of the broadcast receiving apparatus 100 to reproduce video and audio components transmitted by the broadcasting system of the present embodiment. In particular, a transport processing unit 1102a mainly controls the MMT decoder function of the separating unit 132, and distributes a video data string, audio data string, and the like separated from an MMT data string to corresponding decode processing units, respectively. An AV decode processing unit 1102b mainly controls the video decoder 141, the audio decoder 143, and the like. An application processing unit 1102c mainly controls the cache unit 152, the application control unit 153, the browser unit 154, and the sound source unit 156. A caption processing unit 1102d mainly controls the caption decoder 144. A subtitle processing unit 1102e mainly controls the subtitle decoder 145. A general-purpose data processing unit 1102f mainly controls the data decoder 151. An EPG generating unit 1102g interprets the descriptive contents of an MH-EIT and others included in MMT-SI to generate an EPG screen. A presentation processing unit 1102h mainly controls the video color gamut conversion unit 142, the subtitle synthesizing unit 146, the subtitle color gamut conversion unit 147, the application color gamut conversion unit 155, the video synthesizing unit 161, and the audio synthesizing unit 164 based on the logical plane structure.

The above-described operating programs may be stored in advance in the ROM 103 and/or the storage (accumulation) unit 110 at the time of product shipment, or may be acquired from the other application server 500 and others on the Internet 200 through the LAN communication unit 121 after the product shipment. Alternatively, the operating programs stored in a memory card, optical disc, and the like may be acquired through the extension interface unit 124 and others.

[Configuration of Broadcast Station Server]

Figure 8:
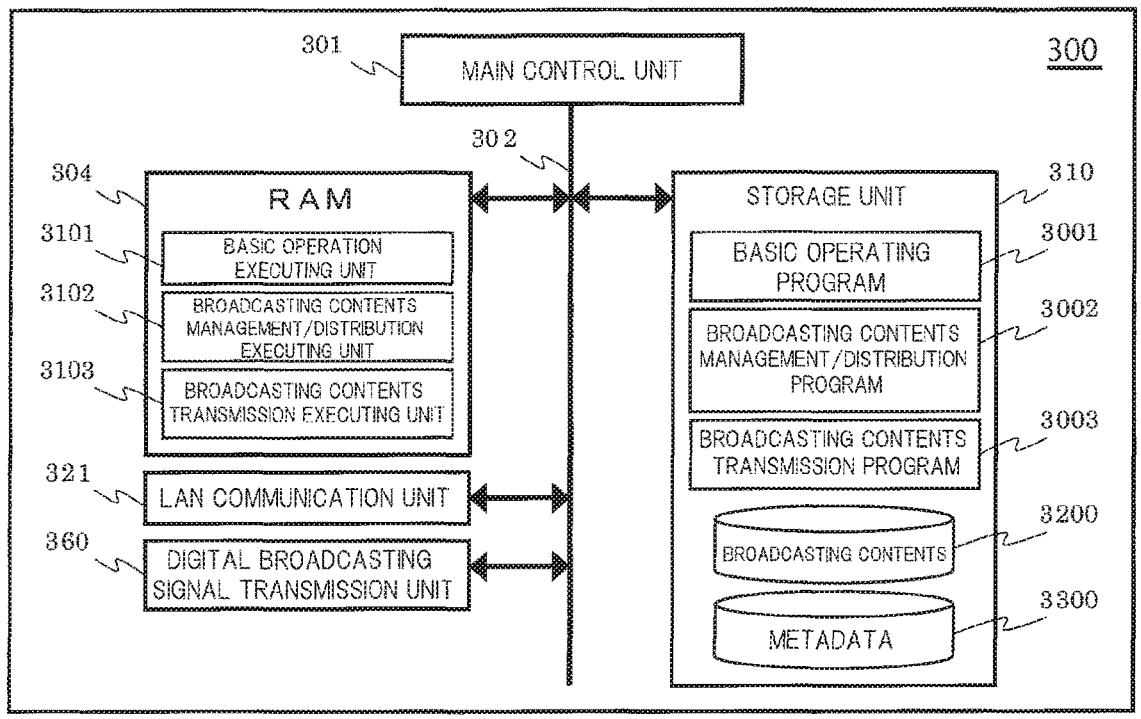
FIG. 8 is a block diagram of a broadcast station server according to the first embodiment.

FIG. 8 is a block diagram showing an example of an internal configuration of the broadcast station server 300. The broadcast station server 300 includes a main control unit 301, a system bus 302, a RAM 304, a storage unit 310, a LAN communication unit 321, and a digital broadcasting signal transmission unit 360.

The main control unit 301 is a microprocessor unit that controls the whole of the broadcast station server 300 in accordance with a predetermined operating program. The system bus 302 is a data communication path through which data is exchanged between the main control unit 301 and each of operating blocks in the broadcast station server 300. The ROM 304 serves as a work area used when each operating program is executed.

The storage unit 310 stores a basic operating program 3001, a broadcasting contents management/distribution program 3002, and a broadcasting contents transmission program 3003, and includes a broadcasting contents memory region 3200 and a metadata memory region 3300. The broadcasting contents memory region 3200 stores the contents of broadcasting programs and others broadcasted by the broadcast station. The metadata memory region 3300 stores metadata such as the titles, IDs, summaries, casts, and broadcasting dates of the broadcasting programs and copy control information related to program contents.

Further, the basic operating program 3001, the broadcasting contents management/distribution program 3002, and the broadcasting contents transmission program 3003 stored in the storage unit 310 are loaded onto the RAM 304, and the respective loaded programs are executed by the main control unit 301 to configure a basic operation executing unit 3101, a broadcasting contents management/distribution executing unit 3102, and a broadcasting contents transmission executing unit 3103.

In the following, for simpler description, a process in which the main control unit 301 loads the basic operating program 3001 from the storage unit 310 onto the RAM 304 and executes the basic operating program 3001 to control each operating block is described simply as a process in which the basic operation executing unit 3101 performs control of each operating block. The same applies also to the description of other operating programs.

The broadcasting contents management/distribution executing unit 3102 performs management of the contents of broadcasting programs stored in the broadcasting contents memory region 3200 and the metadata stored in the metadata memory region 3300, and performs control when the contents of broadcasting programs and metadata are delivered to a service provider based on a contract. Further, when delivering the contents of broadcasting programs and metadata to the service provider, the broadcasting contents management/distribution executing unit 3102 may perform a process of authenticating the service provider server 400 based on the contract when necessary.

The broadcasting contents transmission executing unit 3103 manages a time schedule and others when transmitting an MMT data string, which includes the contents of broadcasting programs accumulated in the broadcasting contents memory region 3200, and the titles and IDs of broadcasting programs and copy control information of program contents accumulated in the metadata memory region 3300, from the radio tower 300t via the digital broadcasting signal transmission unit 360.

The LAN communication unit 321 is connected to the Internet 200, and communicates with the service provider server 400 and others on the Internet 200. The LAN communication unit 321 has a coding circuit, a decoding circuit, and the like. The digital broadcasting signal transmission unit 360 modulates an MMT data string composed of a video data string, audio data string, program data string, and the like of the contents of broadcasting programs accumulated in the broadcasting contents memory region 3200, and transmits the modulated data string as the digital broadcast waves through the radio tower 300t.

[Configuration of Service Provider Server]

Figure 9:
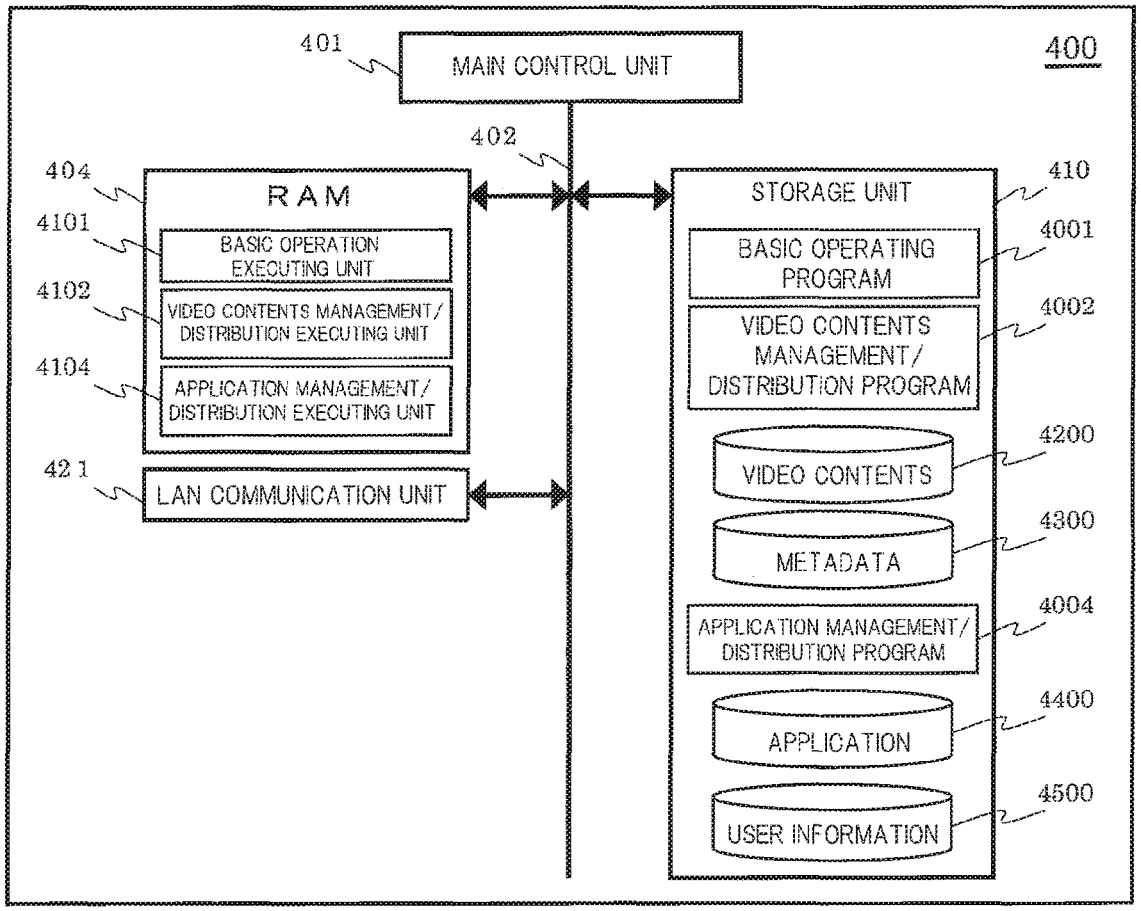
FIG. 9 is a block diagram of a service provider server according to the first embodiment.

FIG. 9 is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessor unit that controls the whole of the service provider server 400 in accordance with a predetermined operating program. The system bus 402 is a data communication path through which data is exchanged between the main control unit 401 and each of operating blocks in the service provider server 400. The ROM 404 serves as a work area that is used when each operating program is executed.

The storage unit 410 stores a basic operating program 4001, a video contents management/distribution program 4002, and an application management/distribution program 4004, and includes a video contents memory region 4200, a metadata memory region 4300, an application memory region 4400, and a user information memory region 4500. The video contents memory region 4200 stores the contents of broadcasting programs provided from the broadcast station server 300 as video contents, and stores video contents and the like created by the service provider. The metadata memory region 4300 stores metadata provided from the broadcast station server 300 and metadata related to video contents created by the service provider. The application memory region 4400 stores various applications and others for distributing the services cooperated with broadcasting programs in response to demands from television receivers. The user information memory region 4500 stores information (personal information, authentication information, etc.) related to a user who is permitted to access the service provider server 400.

Further, the basic operating program 4001, the video contents management/distribution program 4002, and the application management/distribution program 4004 stored in the storage unit 410 are loaded onto the RAM 404, and the respective loaded basic operating program, video contents management/distribution program, and application management/distribution program are executed by the main control unit 401 to configure a basic operation executing unit 4101, a video contents management/distribution executing unit 4102, and an application management/distribution executing unit 4104.

In the following, for simpler description, a process in which the main control unit 401 loads the basic operating program 4001 stored in the storage unit 410 onto the RAM 404 and executes the basic operating program 4001 to control each operating block is described simply as a process in which the basic operation executing unit 4101 performs control of each operating block. The same applies also to description of other operating programs.

The video contents management/distribution executing unit 4102 acquires the contents and others of broadcasting programs and metadata from the broadcast station server 300, manages video contents and others and metadata stored in the video contents memory region 4200 and the metadata memory region 4300, and controls distribution of the video contents and others and metadata to television receivers. Further, when distributing the video contents and others and metadata to the television receivers, the video contents management/distribution executing unit 4102 may perform a process of authenticating the television receivers when necessary. Further, the application management/distribution executing unit 4104 manages applications stored in the application memory region 4400 and controls distribution of the applications in response to demands from the television receivers. Further, when distributing the applications to the television receivers, the application management/distribution executing unit 4104 may perform a process of authenticating the television receivers when necessary.

The LAN communication unit 421 is connected to the Internet 200, and communicates with the broadcast station server 300 on the Internet 200 and the broadcast receiving apparatus 100 via the router device 200r. The LAN communication unit 421 includes a coding circuit, a decoding circuit, and the like.

[Hardware Configuration of Portable Information Terminal]

Figure 10A:
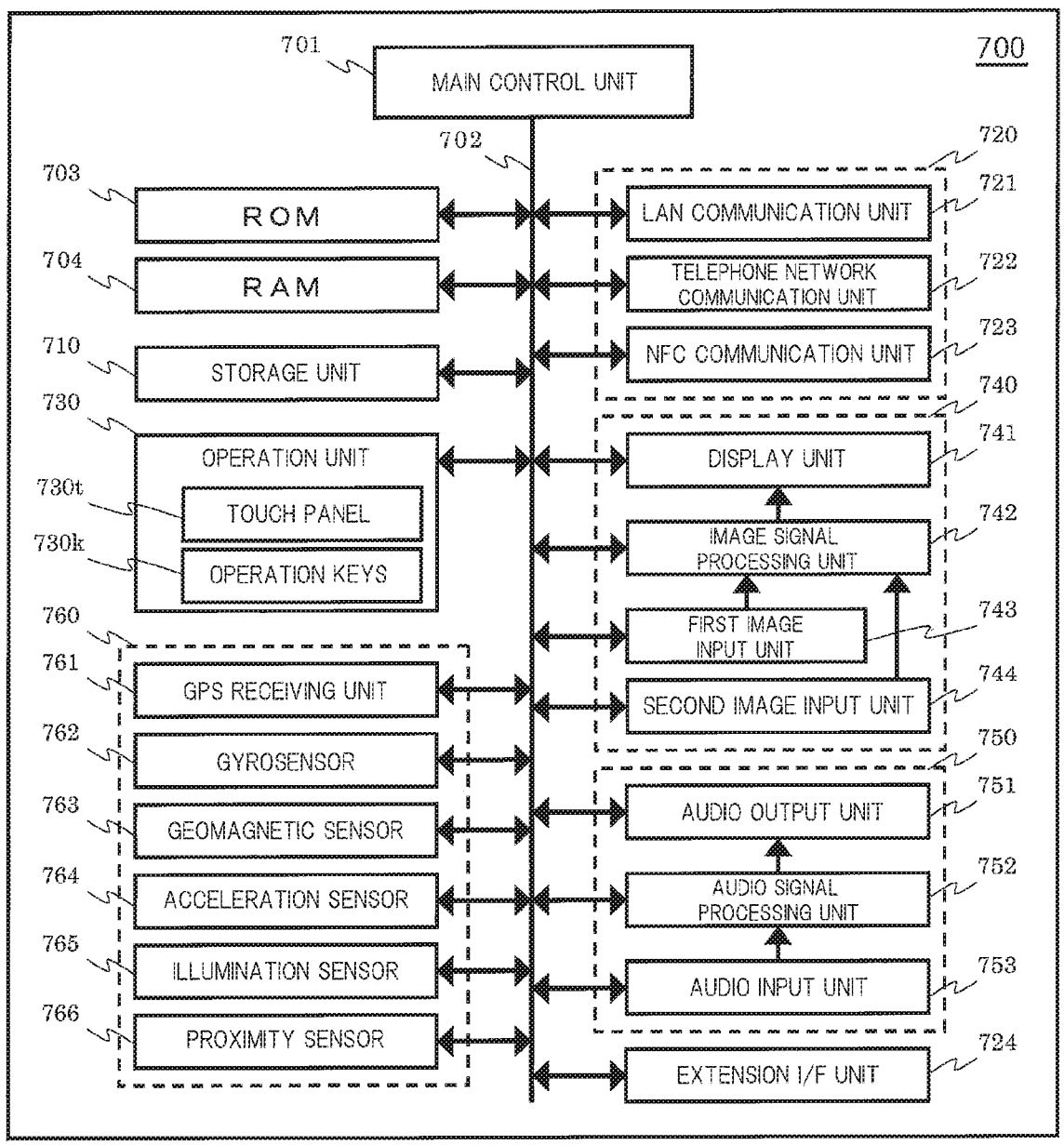
FIG. 10A is a block diagram of a portable information terminal according to the first embodiment.

FIG. 10A is a block diagram showing an example of an internal configuration of the portable information terminal 700. The portable information terminal 700 includes a main control unit 701, a system bus 702, a ROM 703, a RAM 704, a storage unit 710, a communication processing unit 720, an extension interface unit 724, an operation unit 730, an image processing unit 740, an audio processing unit 750, and a sensor unit 760.

The main control unit 701 is a microprocessor unit that controls the whole of the portable information terminal 700 in accordance with a predetermined operating program. The system bus 702 is a data communication path through which data is exchanged between the main control unit 701 and each of operating blocks in the portable information terminal 700.

The ROM 703 is a memory storing a basic operating program such as operating system and other operating programs, and is provided as, for example, a rewritable ROM such as EEPROM and flash ROM. The RAM 704 serves as a work area used when the basic operating program and other operating programs are executed. The ROM 703 and the RAM 704 may be integrated with the main control unit 701. Further, a part of the memory region of the storage unit 710 may be used as the ROM 703 instead of providing the ROM 703 having the independent configuration shown in FIG. 10A.

The storage unit 710 stores the operating programs and operation set values of the portable information terminal 700 and personal information of the user of the portable information terminal 700. In addition, the storage unit 710 can store an operating program downloaded through the Internet 200 and various data created by the operating program. Further, the storage unit 710 can store such contents as moving images, still images, and sounds that are downloaded through the Internet 200. A part of the memory region of the storage unit 710 may be used to substitute for a part or the whole of the function of the ROM 703. Further, the storage unit 710 needs to retain the stored information even when power is not supplied to portable information terminal 700 from an external power source. Therefore, the storage unit 710 is provided as, for example, a non-volatile semiconductor element memory such as flash ROM or SSD or a magnetic disk drive such as an HDD.

Note that the operating programs stored in the ROM 703 and the storage unit 710 can be added, updated and functionally extended by the downloading process from server devices on the Internet 200.

The communication processing unit 720 includes a LAN communication unit 721, a mobile phone network communication unit 722, and an NFC communication unit 723. The LAN communication unit 721 is connected to the Internet 200 via the router device 200r and the access point 200a, and transmits and receives data to and from server devices and other communication equipment on the Internet 200. The LAN communication unit 721 is connected to the router device 200r and the access point 200a through wireless communication such as Wi-Fi (registered trademark). The mobile phone network communication unit 722 performs telephone communication (telephone call) and data transmission and reception through wireless communication with the base station 600b on the mobile phone communication network. The NFC communication unit 723 communicates wirelessly with the corresponding reader/writer when located in proximity to the reader/writer. The LAN communication unit 721, the mobile phone network communication unit 722, and the NFC communication unit 723 each have a coding circuit, a decoding circuit, an antenna, and the like. The communication processing unit 720 may further includes other communication units such as a BlueTooth (registered trademark) communication unit and an infrared communication unit.

The extension interface unit 724 is a group of interfaces for extending the function of the portable information terminal 700, and is configured of a video and audio interface, a USE interface, a memory interface, and the like in the present embodiment. The video and audio interface receives video and audio signals from external video and audio output devices, and outputs video and audio signals to external video and audio input devices. The USE interface is connected to a PC and others and transmits and receives data to and from the PC and others. A keyboard and other USE devices may also be connected to the USE interface. A memory card and other memory media are connected to the memory interface to transmit and receive data to and from them.

The operation unit 730 is an instruction input unit that inputs operation instructions to the portable information terminal 700. In the present embodiment, the operation unit 730 is composed of a touch panel 730t overlaid on a display unit 741 and operation keys 730k in which button switches are arranged. The operation unit 730 may be composed of either the touch panel 730t or the operation keys 730k. The portable information terminal 700 may be operated using a keyboard or the like connected to the extension interface unit 724, or may be operated using a separate terminal device connected through wired communication or wireless communication. Namely, the portable information terminal 700 may be operated through instructions from the broadcast receiving apparatus 100. Further, the display unit 741 may be provided with the above-described touch panel function.

The image processing unit 740 includes the display unit 741, an image signal processing unit 742, a first image input unit 743, and a second image input unit 744. The display unit 741 is, for example, a display device such as liquid crystal panel, and offers image data processed in the image signal processing unit 742 to the user of the portable information terminal 700. The image signal processing unit 742 has a video RAM (not shown), and the display unit 741 is driven based on image data inputted to the video RAM. Further, the image signal processing unit 742 has a function of performing processes of converting formats, superposing a menu and other OSD (On Screen Display) signals, and others when necessary. Each of the first image input unit 743 and the second image input unit 744 is a camera unit that inputs image data of surroundings or a target object by converting light input through a lens into electrical signals by using an electronic device such as a CCD (Charge Coupled Device) and CMOS (Complementary Metal Oxide Semiconductor) sensor.

The audio processing unit 750 includes an audio output unit 751, an audio signal processing unit 752, and an audio input unit 753. The audio output unit 751 is a speaker, and offers an audio signal processed in the audio signal processing unit 752 to the user of the portable information terminal 700. The audio input unit 753 is a microphone, and converts the voice of the user and others into audio data to input it to the portable information terminal 700.

The sensor unit 760 is a group of sensors that detect the state of the portable information terminal 700, and includes a GPS receiving unit 761, a gyro sensor 762, a geomagnetic sensor 763, an acceleration sensor 764, an illuminance sensor 765, and a proximity sensor 766 in the present embodiment. These sensors make it possible to detect the location, tilt, angle, and motion of the portable information terminal 700, and the brightness and the proximity of an object around the portable information terminal 700. The portable information terminal 700 may further include other sensors such as a pressure sensor in addition to these sensors.

The portable information terminal 700 may be provided as a cellular phone, a smartphone, or a tablet terminal, or may be provided as a PDA (Personal Digital Assistants), a notebook PC, or the like. Alternatively, the portable information terminal 700 may be provided as a digital still camera, a video camera capable of taking moving pictures, a portable game machine, a navigation device, or other portable digital devices.

The configuration example of the portable information terminal 700 shown in FIG. 10A includes a number of constituent elements that are not essential to the present embodiment such as the sensor unit 760, but even the configuration that does not include such constituent elements does not impair the effect of the present embodiment. The portable information terminal 700 may further include additional constituent elements (not shown) such as a digital broadcast receiving function and an electronic money settlement function.

[Software Configuration of Portable Information Terminal]

Figure 10B:
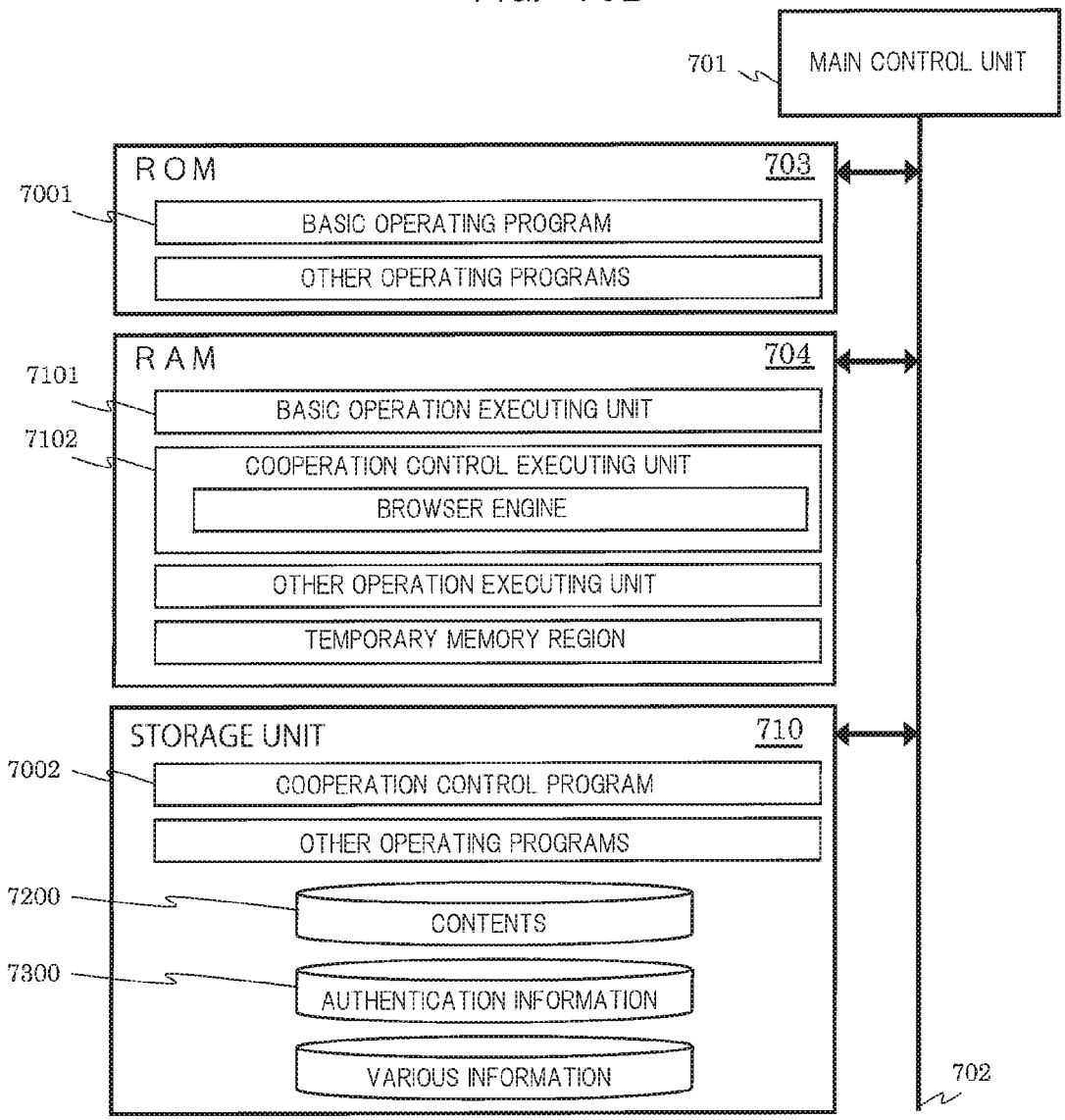

FIG. 10B is a software configuration diagram of the portable information terminal 700 of the present embodiment, and shows respective software configurations of the ROM 703, the RAM 704, and the storage unit 710. In the present embodiment, the ROM 703 stores a basic operating program 7001 and other operating programs, and the storage unit 710 stores a cooperation control program 7002 and other operating programs. Further, the storage unit 710 includes a contents memory region 7200 storing such contents as moving images, still images, and sounds, an authentication information memory region 7300 storing authentication information and others needed when access is made to the television receiver or each server device, and a various information memory region storing other various types of information.

The basic operating program 7001 stored in the ROM 703 is loaded onto the RAM, 704, and the loaded basic operating program is executed by the main control unit 701 to configure a basic operation executing unit 7101. Similarly, the cooperation control program 7002 stored in the storage unit 710 is loaded onto the RAM 704, and the loaded cooperation control program 7002 is executed by the main control unit 701 to configure a cooperation control executing unit 7102. Further, the RAM 704 has a temporary memory region that temporarily saves data created at execution of each operating program when necessary.

In the following, for simpler description, a process in which the main control unit 701 loads the basic operating program 7001 from the ROM 703 onto the RAM 704 and executes the basic operating program 7001 to control each operating block is described simply as a process in which the basic operation executing unit 7101 performs control of each operating block. The same applies also to the description of other operating programs.

The cooperation control executing unit 7102 manages device authentication, connection, data transmission and reception, and the like when the portable information terminal 700 performs operations cooperated with the television receiver. Further, the cooperation control executing unit 7102 has a browser engine function for executing an application cooperated with the television receiver.

The above-described operating programs may be stored in advance in the ROM 703 and/or the storage unit 710 at the time of product shipment, or may be acquired from the other application server 500 and others on the Internet 200 through the LAN communication unit 721 or the mobile phone network communication unit 722 after the product shipment. Alternatively, the operating programs stored in a memory card, optical disc, and the like may be acquired through the extension interface unit 724 and others.

[Time Management of Broadcast Receiving Apparatus]

The broadcast receiving apparatus of the present embodiment has two types of time management functions. The first time management function is the time management function based on the NTP, which has been already described above with reference to FIG. 7C. The second time management function is a time management function based on an MH-TOT, and is the time managed based on time information transmitted by the MH-TOT described in FIG. 6B.

FIG. 13A shows an example of a configuration of time information transmitted in the NTP format. FIG. 13B shows an example of the data structure of the above-described MPU timestamp descriptor. A "reference_timestamp" parameter, "transmit_timestamp" parameter, and the like in the NTP format represent time data in the NTP-length format with a 64-bit length, and an "mpu_presentation_time" parameter in the MPU timestamp descriptor also represents time data in the NTP timestamp format with a 64-bit length. In the time data in the NTP-length format and the time data in the NTP timestamp format, "second or more" of UTC is expressed by 32 bits, and "less than second" is also expressed by 32 bits. Namely, the time information in the NTP format can transmit the time information up to "less than second". Further, since the time information in the NTP format is expressed by the UTC notation, it is compatible with NTP data included in a signal received through the communication line (e.g., signal received by the LAN communication unit 121 of FIG. 7A) as shown in FIG. 3(B), unlike the clock management in the conventional digital broadcasting.

In contrast, the information transmitted by the MH-TOT is as follows. The broadcast receiving apparatus 100 can acquire the current date and Japan Standard Time through the MH-TOT. FIG. 11A shows an example of the data structure of the MH-TOT. The broadcast receiving apparatus 100 can acquire the current date and current time from a "JST_time" parameter included in the MH-TOT. As shown in FIG. 11B, the "JST_time" parameter includes the information of 16 lower-order bits of coded data of the current date based on the Modified Julian Date (MJD) and the information of 24 bits representing the Japan Standard Time (JST) with 6 blocks of 4-bit binary-coded decimal (BCD). The current date can be calculated by performing a given calculation on the 16-bit coded data of the MJD. The 6 blocks of 4-bit binary-coded decimal are made up of 2 blocks of 4-bit binary-coded decimal that represent "hour" with a two-digit decimal number, next 2 blocks of 4-bit binary-coded decimal that represent "minute" with a two-digit decimal number, and last 2 blocks of 4-bit binary-coded decimal that represent "second" with a two-digit decimal number.

Thus, the difference between time information based on the NTP and time information based on the MH-TOT is that the NTP is the information expressed in the UTC notation that covers time units up to "less than second" as described above, while the information based on the MH-TOT is the information expressed in the JST notation that covers time units up to "second".

In the broadcast receiving apparatus 100 of the present embodiment, the time management function based on the NTP that is the time information expressed in the UTC notation is used for the synchronization in decoding process and display process of broadcasting signal contents including video, audio, subtitles, and captions, and other presentation data, and thus it is possible to achieve a highly accurate synchronization process. Further, by referring to time information expressed in the UTC notation instead of time information based on clocks of the broadcast station, it is also possible to perform the synchronization in decoding process and display process between broadcasting signal contents received by broadcasting signals including video, audio, subtitles, captions, and other data and data received through the communication line including video, audio, subtitles, and captions, and other data.

In addition, in the broadcast receiving apparatus 100 of the present embodiment, the time management function based on the "JST_time" including the 24-bit information expressed by 6 blocks of 4-bit binary-coded decimal in the MH-TOT may be used for performing each of the process of presenting the current time to the user and the process handling the MH-event information table (MH-EIT) described in FIG. 6B. In general, in the process of presenting the current time to the user, the broadcast receiving apparatus is rarely required to have the accuracy to the extent of less than "second". Each piece of time information in the MH-event information table (MH-EIT) is stored as 24-bit information composed of 6 blocks of 4-bit binary-coded decimal, expressing "hour", "minute", and "second" with two-digit decimal numbers, like the EIT for conventional digital broadcasting that is transmitted by the MPEG2-TS method. For this reason, the time management function based on the MH-TOT of the broadcast receiving apparatus 100 of the present embodiment easily matches with a process using the MH-EIT. The process using the MH-EIT includes, specifically, a process of creating a program guide (to be described later), a process of controlling timer recording and viewing reservation, a process of protecting copy rights such as temporary data storage, and the like. This is because each of these processes is rarely required to have the accuracy to the extent of less than "second", and the accuracy covering up to time unit "second" is enough.

Further, the process of creating a program guide, the process of controlling timer recording and viewing reservation, and the process of protecting copy rights such as temporary data storage are functions incorporated even in a receiver of the conventional digital broadcasting system using the MPEG2-TS method. Accordingly, if the broadcasting system of the present embodiment is configured in such a way as to execute the time management process compatible with the time management function of the conventional digital broadcasting system using the MPEG2-TS method in performing the process of creating a program guide, the process of controlling timer recording and viewing reservation, the process of protecting copy rights such as temporary data storage, and others, it becomes unnecessary to separately design process algorithms for these processes (process of creating a program guide, process of controlling timer recording and viewing reservation, process of protecting copy rights such as temporary data storage, etc.) when the broadcast receiving apparatus having both of a receiving function of digital broadcasting by the conventional MPEG2-TS method and a receiving function of digital broadcasting by the MMT method is configured, and the cost is thus reduced.

Further, even in a receiver that does not have the receiving function of digital broadcasting by the conventional MPEG2-TS method but has only the receiving function of digital broadcasting by the MMT method, algorithms for the function incorporated in the receiver of digital broadcasting system using the conventional MPEG2-TS method can be applied without creating new algorithms for the processes of creating a program guide, controlling timer recording and viewing reservation, protecting copy rights such as temporary data storage, and the like, and thus the development with less cost is possible.

Consequently, with the configuration in which the time management function based on the "JST_time" parameter in the MH-TOT is used for performing these processes (process of creating a program guide, process of controlling timer recording and viewing reservation, process of protecting copy rights such as temporary data storage, etc.), even the broadcast receiving apparatus for the digital broadcasting by the MMT method is made highly compatible with the broadcasting system using the conventional broadcasting method, and therefore can be provided at low cost.

As describe above, the broadcast receiving apparatus 100 of the present embodiment has the time management function using two types of time information different in accuracy from each other. One time information is expressed in the notation consistent with the conventional digital broadcasting system, while the other time information has higher resolution power than the one time information. Using the latter time information for the process of synchronizing contents data of broadcasting signals achieves the information presentation process more accurate than that in the conventional broadcasting system, and using the former time information for the processes of creating a program guide, controlling timer recording and viewing reservation, protecting copy rights such as temporary data storage, and others allows the broadcast receiving apparatus to be provided at low cost.

Therefore, the broadcast receiving apparatus 100 of the present embodiment has the two types of time management function described above, and it is thus possible to achieve both of the highly accurate information presentation and the cost reduction.

First Modification Example of Time Management

Next, a first modification example of the time management in the broadcasting system of the present embodiment will be described below.

In the configuration of the first modification example, in order to improve the accuracy of time management by the NTP-based time management function that has already been described with reference to FIG. 7C, information related to an estimated delay time in time information transmission from a time management server (not shown) or the broadcast station server 300 to the broadcast receiving apparatus 100 is included in a broadcasting signal to be transmitted, and the information related to the estimated delay time is used to correct a system clock for the NTP-based time management function in the broadcast receiving apparatus 100.

At this time, the information related to the estimated delay time may be included in a TMCC (Transmission and Multiplexing Configuration Control) region outside the TLV multiplexing stream instead of the TLV multiplexing stream shown in FIG. 3(A). By transmitting the information in the TMCC region, the information related to the estimated delay time can be extracted without performing a process of separating the TLV multiplexing stream (demultiplexing process) in the broadcast receiving apparatus 100. Namely, the information acquisition that is less likely to be affected by the delay in the separating process in the broadcast receiving apparatus 100 is possible, and thus a highly accurate correcting process of the system clock can be performed. An example of the data structure of time information transmitted in the TMCC signal will be described with reference to FIG. 13C. For example, the time information is preferably stored in a TMCC extension information region to be transmitted. In the time information in the TMCC extension information region of FIG. 13C, a "delta" parameter expresses the estimated value of transmission delay from a time management server that distributes the UTC or a server device that generates a TMCC signal to a general broadcast receiving apparatus, in the form of a 32-bit signed fixed-point value. Note that the 16 high-order bits thereof represent an integer part and 16 low-order bits thereof represent a decimal fraction. A "transmit_timestamp" parameter is a transmission timestamp, and expresses a time at which the TMCC signal is transmitted from the server device, in the NTP timestamp-length format. The 32 high-order bits thereof represent an integer part, and the 32 low-order bits thereof represent a decimal fraction.

In the first modification example, the broadcast receiving apparatus 100 of the present embodiment can correct more accurately the system clock for the NTP-based time management function, which is used for the process of synchronizing contents data of broadcasting signals, by using the information related to the estimated delay time (e.g., the "delta" parameter and/or the "transmit_timestamp" parameter) described in the time information stored and transmitted in the TMCC extension information region.

Second Modification Example of Time Management

Next, a second modification example of the time management in the broadcasting system of the present embodiment will be described below.

As describe above, the broadcast receiving apparatus 100 of the present embodiment has the time management function of managing the time by acquiring the current date and the Japan Standard Time from the information transmitted in the MH-TOT. The current date and the Japan Standard Time acquired from the information transmitted in the MH-TOT are superposed on video information, application information, and others in the video synthesizing unit 161 of the broadcast receiving apparatus 100, and are offered to the user by outputting them to the monitor unit 162 and video output unit 163. As described above, the MH-TOT has the data structure shown in FIG. 11A, and the broadcast receiving apparatus 100 can acquire the current date and the current time from the "JST_time" parameter in the MH-TOT.

However, since the "JST_time" parameter uses only the 16 low-order bits of the MJD coded data, calculation for determining a date of "Apr. 22, 2038" ends up in arithmetic overflow, and the above-described predetermined calculation cannot express the date following "Apr. 23, 2038". To deal with this problem, in the second modification example of the present embodiment, the calculation method is switched depending on whether the value of the MJD is equal to or larger than a given value or the value is smaller than the given value so that the date following "Apr. 23, 2038" can be expressed.

FIG. 12 shows a first calculation method that is used when the value of the MJD is equal to or larger than the given value and a second calculation method that is used when the value of the MJD is smaller than the given value. For example, when the given value is set to "32768 (0x8000)", the current date is calculated by using the first calculation method in the case where the value of the MJD is equal to or larger than "32768", and is calculated by using the second calculation method in the case where the value of the MJD is smaller than "32768". Note that the case in which the value of the MJD is smaller than "32768" is equivalent to the case in which the most significant bit of the 16-bit data of the MJD is "0". In this manner, the broadcast receiving apparatus 100 of the present embodiment can express the date following "Apr. 23, 2038". However, the given value can be determined arbitrarily, and it may be set to, for example, "16384 (0x4000)" or "49152 (0xC000)". The condition for switching the calculation method may be set to the case where the 2 high-order bits of the 16-bit data of the Mull are "00" or the case where the 2 high-order bits of the 16-bit data of the MJD are not "11". Note that, when the given value is set to "32768" and the above-described method is used, a date preceding "Sep. 4, 1948" cannot be expressed, but it does not pose a specific problem regarding the practical use of the television receiver.

Alternatively, the first calculation method and the second calculation method may be switched depending on a flag that replaces a part or the whole of a "reserved" parameter in the data structure of the MH-TOT of FIG. 11A or depending on a newly added flag, instead of switching the first calculation method and the second calculation method depending on the result of comparison between the MJD and the given value. For example, in the case where the most significant bit of the 16-bit coded data of the MJD is "0", the flag is set to "1" when the MJD value represents the date following "Apr. 23, 2038", and the flag is set to "0" when the MJD value does not represent the date following "Apr. 23, 2038". Then, when the flag is "1", the second calculation method shown in FIG. 12 is used, while when the flag is "0", the first calculation method is used. Alternatively, a descriptor having the same meaning as the above-mentioned flag may be newly prepared and added to the MH-TOT.

As described above, in the broadcasting system of the present embodiment, absolute time data in the NTP format is transmitted, and the broadcast receiving apparatus 100 of the present embodiment has the NTP-based time management function. In addition, the broadcast receiving apparatus 100 of the present embodiment controls the decoding timing and presentation timing of video and audio signals in units of presentation by referring to NTP timestamps and others described in MPU timestamp descriptors set in units of MPU. As described above, the time information in the NTP format has the configuration shown in FIG. 13A. Further, the MPU timestamp descriptor has the configuration shown in FIG. 13B.

Accordingly, the broadcast receiving apparatus 100 of the present embodiment may select either the first calculation method or the second calculation method in accordance with the value of time data and others obtained by referring to the "reference_timestamp" parameter, the "transmit_timestamp" parameter, or the "mpu_presentation_time" parameter. Specifically, for example, when the most significant bit of the 64-bit time data in the NTP-length format is "0", the second calculation method is used, and when the most significant bit is not "0", the first calculation method is used.

By any of the above methods, the broadcast receiving apparatus 100 of the present embodiment can express the date following "Apr. 23, 2038".

[Channel Selection Process (Initial Scan) in Broadcast Receiving Apparatus]

The AMT of the broadcasting system of the present embodiment provides a list of IP packet multicast groups that is used to receive IP packets transmitted by the TLV multiplexing method without distinguishing them from IP packets transmitted through the communication line as much as possible. A plurality of IP multicast groups can be listed for one service identification. In addition, in order to describe a series of IP addresses efficiently, an address mask can be used.

In the broadcast receiving apparatus 100 of the present embodiment, a list of services acquired from the TLV-NIT can be stored in a non-volatile memory such as the ROM 103 and the storage unit 110 at the time of channel scan in the initial setting or rescan for the setting change, and a list of IP multicast groups corresponding to the services can be associated with the services as IP-related information and stored in the non-volatile memory. The list of services and IP-related information are stored in the non-volatile memory to be referred to constantly, so that a need of acquiring the TLV-NIT or AMT at the time of channel switching and others is eliminated, and thus the broadcasting contents can be efficiently acquired.

FIG. 14 is a diagram showing an example of an operation sequence at the time of channel scan (rescan) in the broadcast receiving apparatus 100 of the present embodiment.

When the channel scan starts, the receiving function executing unit 1102 sets an initial frequency value for the tuner/demodulating unit 131 and instructs the tuner/demodulating unit 131 to tune to the frequency value (S101). When the tuner/demodulating unit 131 succeeds in locking to the set frequency value (S102: Yes), the receiving function executing unit 1102 acquires the TLV-NIT from a received signal (S103).

When the TLV-NIT acquired in the process of S103 is valid data (S104: Yes), the receiving function executing unit 1102 acquires information of a TLV stream ID, an original network ID, and the like from the acquired TLV-NIT (S105). FIG. 15A shows an example of the data structure of the TLV-NIT. The information of the TLV stream ID and the information of the original network ID can be acquired from a "tlv_stream_id" parameter and an "original_network_id" parameter, respectively. Furthermore, delivery system information related to physical conditions for the broadcast transmission path corresponding to the TLV stream ID and the original network ID is acquired from a delivery system descriptor (S106), and a service ID list is acquired from a service list descriptor (S107). FIG. 15B shows an example of the data structure of a satellite delivery system descriptor. FIG. 15C shows an example of the data structure of a service list descriptor. Note that, when the TLV-NIT has a plurality of different pieces of data such as the TLV stream ID, the original network ID, the delivery system information, and the service ID list, the processes of S105 to S107 are repeated. Subsequently, the receiving function executing unit 1102 creates a service list based on data acquired in the processes of S105 to S107 such as the TLV stream ID, the original network ID, the delivery system information, and the service ID list, and stores the created service list in the ROM 103 or the storage unit 110 (updates the service list at the time of rescan) (S108).

Next, the receiving function executing unit 1102 then acquires an AMT from the received signal (S109), and further acquires a list of IP multicast groups related to each service ID stored in the service list (S110). FIG. 15D shows an example of the data structure of the AMT. Note that, when the AMT has lists of IP multicast groups related to a plurality of service IDs, the process of S110 is repeated. When there is a plurality of AMTS having lists of IP multicast groups related to different service IDs, the processes of S109 and S110 are repeated. Next, the receiving function executing unit 1102 then associates the list of IP multicast groups acquired in the process of S110 with the service ID as IP-related information, and stores the IP-related information in the ROM 103 or the storage unit 110 (updates the IP-related information at the time of rescan) (S111).

When the tuner/demodulating unit 131 fails in locking to the set frequency value in the process of S102 (S102: No) and when the TLV-NIT acquired in the process of S103 is not valid data (S104: No), the processes of S105 to S111 are not performed.

After finishing the process of S111, when finding that the frequency value set for the tuner/demodulating unit 131 is a final frequency value in a channel scan range (S112: Yes), the receiving function executing unit 1102 ends the operation sequence. On the other hand, when finding that the set frequency value is not the final frequency value in the channel scan range (S112: No), the receiving function executing unit 1102 increases the frequency value set for the tuner/demodulating unit 131 (S113) and repeats the processes of S102 to S111. Note that, if the service IDs for all services making up the broadcasting network can be acquired from one TLV-NIT and an ANT having lists of IP multicast groups related to the service IDs can be acquired, the processes of S112 and S113 are unnecessary.

Through the series of processes described above, when performing the channel scan for initial setting or the rescan for setting change, the broadcast receiving apparatus 100 of the present embodiment can create/update a list of services making up the broadcasting network (service list), and at the same time, create/update a list of IP multicast groups corresponding to each service (IP-related information) and store the created service list and IP-related information in a non-volatile memory such as the ROM 103 and the storage unit 110.

Note that the rescan for setting change may be automatically performed when a change in the information in the table is detected by referring to respective "version_number" parameters of the TLV-NIT and AMT. When a change in the "version_number" parameter of either the TLV-NIT or AMT is detected, only the information related to the table in which the change in parameter is detected may be automatically updated. However, when the above-described automatic updating is performed, execution of the automatic rescan should preferably be reported to the user. Alternatively, the change in the information in the table may be reported to the user so that the user makes a decision on whether or not to perform the rescan.

[Channel Selection Process (Channel Switching) in Broadcast Receiving Apparatus]

FIG. 16 is a diagram showing an example of an operation sequence at the time of channel selection (channel switching) in the broadcast receiving apparatus 100 of the present embodiment.

When the user gives a command to switch a channel by operating a remote controller and others (not shown), the receiving function executing unit 1102 interprets the command transmitted from the remote controller and specifies a service ID of an intended service (S201). Next, the receiving function executing unit 1102 then starts to acquire an AMT from the signal received from the tuner/demodulating unit 131. When succeeding in acquiring the MT within a given time (S202: Yes), the receiving function executing unit 1102 acquires information related to a list of IP multicast groups corresponding to the service ID, from the acquired AMT (S204). When failing to acquire the AMT within the given time (S202: No), the receiving function executing unit 1102 refers to the IP-related information stored in the ROM 103 or the storage unit 110 (S203), thereby acquiring information related to the list of IP multicast groups corresponding to the service ID (S204). Note that the receiving function executing unit 1102 may always refer to the IP-related information stored in the ROM 103 or the storage unit 110 without performing the determination process of S202.

Subsequently, the receiving function executing unit 1102 starts to acquire the TLV-NIT from the signal received from the tuner/demodulating unit 131. When succeeding in acquiring the TLV-NIT within a given time (S205: Yes), the receiving function executing unit 1102 acquires delivery system information for acquiring an IP data flow corresponding to the service ID, from the acquired TLV-NIT (S207). When failing to acquire the TLV-NIT within the given time (S205: No), the receiving function executing unit 1102 refers to the service list stored in the ROM 103 or the storage unit 110 (S206), thereby acquiring the delivery system information for acquiring the IP data flow corresponding to the service ID (S207). Note that the receiving function executing unit 1102 may always refer to the service list stored in the ROM 103 or the storage unit 110 without performing the determination process of S205. When the delivery system information has been acquired in the process of S207, the receiving function executing unit 1102 then controls the tuner/demodulating unit 131 with the frequency value specified by the acquired delivery system information, receives the IP data flow corresponding to the service ID (S208), extracts an MMT data string from the received IP data flow, and outputs the MMT data string to the separating unit 132.

In the separating unit 132, the transport processing unit 1102a acquires an MMTP packet with a packet ID "0", from the input MMT data string (S209), and further acquires an MPT from the acquired MMTP packet (S210). Next, the transport processing unit 1102a then refers to an "MMT_package_id_byte" parameter included in the acquired MPT, and checks whether the 16 low-order bits of the "MMT_package_id_byte" parameter have the same value as the service ID. When the 16 low-order bits of the "MMT_package_id_byte" parameter have the same value as the service ID in the example of the data structure of the MPT shown in FIG. 17 (S211: Yes), it is determined that the MMTP packet with the packet ID "0" is an MMTP packet having the data of the program corresponding to the service ID, and acquisition of an MFU is executed based on information included in the acquired MPT (S216).

On the other hand, when the 16 low-order bits of the "MMT_package_id_byte" parameter do not have the same value as the service ID (S211: No), it is determined that the MMTP packet with the packet ID "0" is not the MMTP packet having data of the program corresponding to the service ID. In this case, the transport processing unit 1102a newly acquires a PLT (S212), and checks the acquired PLT to confirm a packet ID (x in this case) of an MMTP packet that transmits an MPT having the "MMT_package_id_byte" parameter corresponding to the service ID (S213). Further, the transport processing unit 1102a then acquires an MMTP packet with a packet ID "x" from the above-mentioned input MMT data string (S214), and acquires an MPT from the acquired MMTP packet (S215). Further, the transport processing unit 1102a then acquires an MFU based on information included in the acquired MPT (S216).

Note that the transport processing unit 1102a may always perform the processes of S212 to S215 without performing the processes of S209 to S211. In this case, the process time can be reduced when the data of the program corresponding to the service ID is stored in an MMTP packet other than the MMTP packet with the packet ID "0".

After the MFU is acquired in the process of S216, the transport processing unit 1102a extracts coded video data, coded audio data, and the like from the acquired MFU, and outputs the coded video data, the coded audio data, and the like to the video decoder 141, the audio decoder 143, and the like. Thereafter, a video and audio decoding process under the control by the AV decode processing unit 1102b and a presentation process under the control by the presentation processing unit 1102h are performed, but these processes are known to the public and detailed descriptions thereof are omitted.

Through the series of processes described above, the broadcast receiving apparatus 100 of the present embodiment can execute a channel selection (channel switching) operation. In particular, as described above with reference to FIGS. 14 and 16, a service list and IP-related information are created and are stored in a non-volatile memory such as the ROM 103 and the storage unit 110 so as to be referred to constantly at the time of channel scan for initial setting or rescan for setting change, and the service list and IP-related information stored in a non-volatile memory such as the ROM 103 and the storage unit 110 are referred to at the time of channel selection (channel switching), so that the efficiency of the channel selection (channel switching) operation can be improved. Namely, the time taken from the start to end of the channel selection (channel switching) can be reduced, compared to a case where the AMT and TLV-NIT are acquired again at the time of channel selection (channel switching).

[Screen Layout Control of Broadcast Receiving Apparatus]

The broadcast receiving apparatus 100 of the present embodiment can control the screen layout based on the description of an LCT. FIG. 18 shows an example of the data structure of the LCT.

In FIG. 18, a "left_top_pos_x" parameter and a "right_down_pos_x" parameter indicate a horizontal position on the top left of a region and a horizontal position on the bottom right of the region in terms of the ratio of the number of pixels to the total number of pixels arranged in the horizontal direction, respectively, when the left side of the full-screen display is defined as "0" and the right side of the same is defined as "100". A "left_top_pos_y" parameter and a "right_down_pos_y" parameter indicate a vertical position on the top left of the region and a vertical position on the bottom right of the region in terms of the ratio of the number of pixels to the total number of pixels arranged in the vertical direction, respectively, when the top side of the full-screen display is defined as "0" and the bottom side of the same is defined as "100". Further, a "layer_order" parameter indicates a relative position in the depth direction of the region.

Examples of layout assignment to layout numbers based on the parameter settings are shown in FIGS. 19A to 19D together with set values for the parameters.

FIG. 19A shows default layout setting of the broadcast receiving apparatus 100 of the present embodiment, and shows an example in which one region is set for the full-screen. FIG. 19E shows an example in which the full-screen is divided into three regions, and the respective regions are defined as "region 0", "region 1" and "region 2". For example, when the full-screen is made up of 7680 horizontal pixels×4320 vertical pixels, the "region 0" is set within a range of (0, 0)-(6143, 3455) because the "left_top_pos_x" parameter is "0", the "left_top_pos_y" parameter is "0", the "right_down_pos_x" parameter is "80", and the "right_down_pos_y" parameter is "80". In the same manner, the "region 1" is set within a range of (6144, 0) to (7679, 4319), and the "region 2" is set within a range of (0, 3456) to (6143, 4319).

FIG. 19C shows an example in which three regions are set like the example of FIG. 19B. In the example of FIG. 19C, however, the "region 0" is set within a range of (0, 0) to (7679, 4319), and the "region 1" and "region 2" are set within the same ranges of the "region 1" and "region 2" described above and are located in front of the "region 0" in accordance with the setting of the "layer_order" parameter. FIG. 19D shows an example in which the "region 0" is set in a device 0 (default device: broadcast receiving apparatus 100 in the present embodiment) and the "region 1" is set in a device 1 (portable information terminal 700 in the present embodiment).

As described above, in the broadcasting system of the present embodiment, screen layout control for displaying multimedia services on the receiver in a manner intended by the service provider can be performed by using the LCT.

Note that decimal fractions that are generated when the screen is divided in accordance with the setting values of the "left_top_pos_x" parameter and others are rounded up or down, or rounded off (or in the case of binary numbers, "0" is rounded down while "1" is rounded up). For example, when the full-screen is made up of 7680 horizontal pixels× 4320 vertical pixels and the "left_top_pos_x" parameter of the "region 0" is "0", the "left_top_pos_y" parameter is "0", the "right_down_pos_x" parameter is "51", and the "right_down_pos_y" parameter is "51", the "region 0" may be set within a range of (0, 0)-(3916, 2203) by rounding up decimal fractions or may be set within a range of (0, 0)-(3915, 2202) by rounding down decimal fractions. Alternatively, decimal fractions may be rounded up or down in units of 8-pixel blocks or 16-pixel blocks in consideration of macro-blocks at the time of an image compression process. Through the process described above, region setting based on the LCT and conversion of the resolution of multimedia contents in the above region can be performed efficiently.

[Exceptional Process of Screen Layout Control of Broadcast Receiving Apparatus]

Figure 20A:
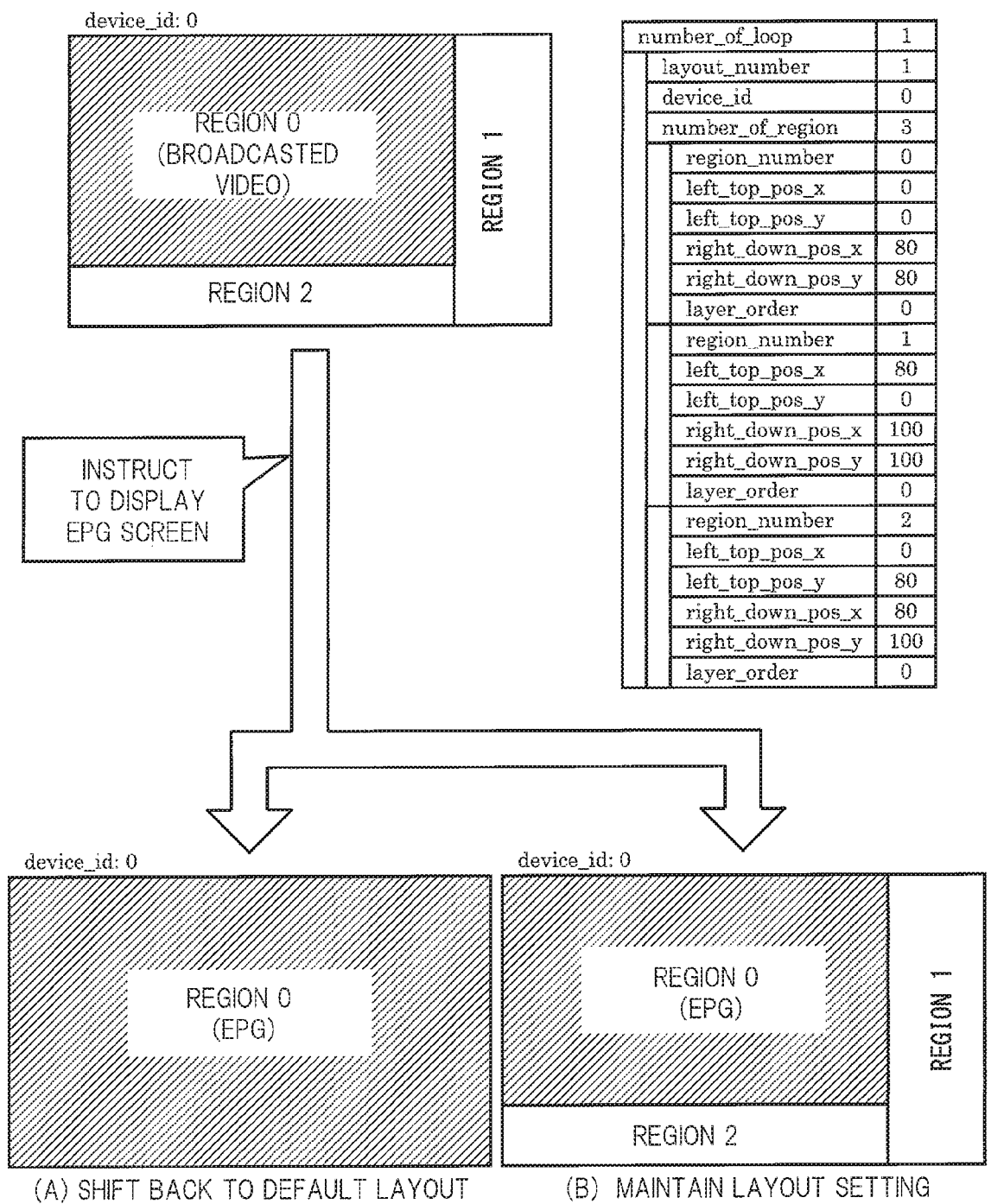
FIG. 20A is an explanatory diagram of an operation of an exceptional process of screen layout control based on the LCT.

Even when the control of the screen layout region is performed based on the LCT in the broadcast receiving apparatus 100 of the present embodiment, if the user gives an instruction to display an EPG screen, the broadcast receiving apparatus 100 of the present embodiment can perform the screen layout control in which the descriptive contents of the LCT is left out of account, as an exceptional process. FIG. 20A shows an example of an operation of the exceptional process of the screen layout control based on the LCT.

When the screen layout control similar to that shown in FIG. 19B is performed based on the descriptive contents of the LCT, a video of broadcasting program is displayed in the "region 0", and broadcasting contents such as program-cooperation data cooperated with the broadcasting program are displayed in the "region 1" and the "region 2", if the user gives an instruction to display an EPG screen with the remote controller (not shown), the broadcast receiving apparatus 100 of the present embodiment shifts the screen layout setting back to the default setting (i.e., a state in which the screen layout control similar to that shown in FIG. 19A is performed) as shown in FIG. 20A(A) regardless of the descriptive contents of the LCT, and controls the screen layout to display the EPG screen on the entire screen. Further, when the user gives an instruction to end the display of the EPG screen, the broadcast receiving apparatus 100 executes again the screen layout control in accordance with the descriptive contents of the LCT.

By performing the control described above, the EPG screen can be displayed in a large size and easiness to see the EPG screen can be improved, compared to the case where the EPG screen is displayed while maintaining the control of screen layout region as shown in FIG. 20A(B).

Figure 20B:
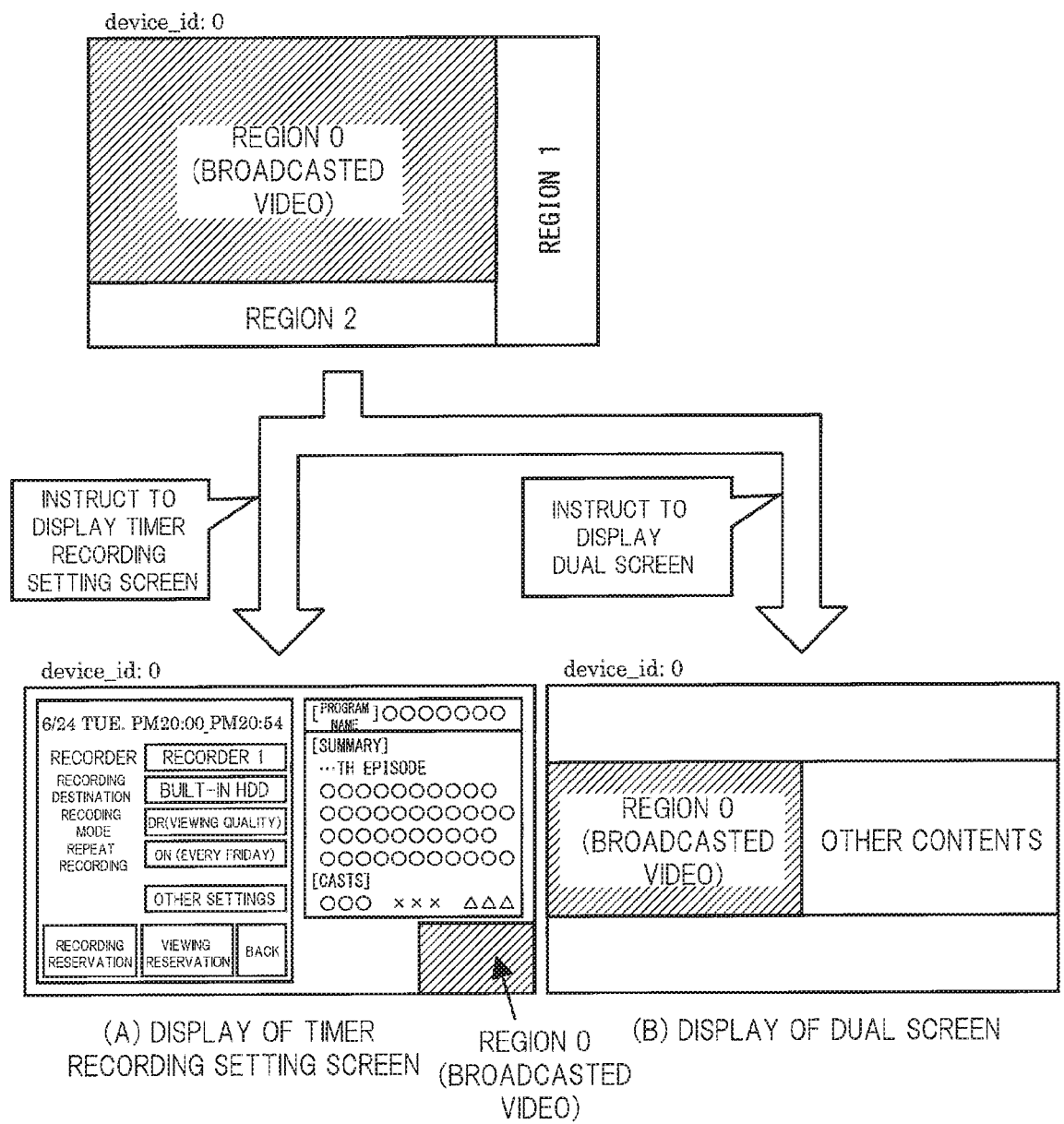
FIG. 20B is an explanatory diagram of an operation of an exceptional process of screen layout control based on the LCT.

Note that the exceptional process of the screen layout control is applied not only to the case of displaying the EPG screen but also to the case of displaying sub-screens of various setting screens (timer recording setting screen in the example of FIG. 20B(A)) or displaying dual screens in the broadcast receiving apparatus 100, as shown in FIG. 20B.

In the case of the timer recording setting screen shown in (A) of FIG. 202, a display area of broadcasting contents is shifted from the full-screen region to a sub-screen region on the right bottom corner of the screen. In the case of the dual screen display shown in (B) of FIG. 202, the display area of broadcasting contents is shifted from the full-screen region to a divided screen region in the middle left side of the screen. In both cases, since the display area for displaying broadcasting contents is narrowed, compared to the case of using the entire screen, it is not preferable to maintain the control of screen layout region in the display area (that is, a plurality of broadcasting contents is kept displayed simultaneously in divided regions) from the viewpoint of offering fine visibility. For this reason, in the above-described situation, the broadcast receiving apparatus 100 of the present embodiment selects the broadcasting contents of the "region 0" and displays only the selected contents in the display area. Note that the broadcasting contents of the "region 1" or "region 2" may be selected and displayed depending on a region selection state right before the selection.

By performing the control described above, the easiness to see the broadcasting contents can be improved, compared to the case where various broadcasting contents are displayed while maintaining the control of screen layout region. The same applies also to the cases of displaying a sub-screen for a timer recording program list, displaying internet contents on a browser, and others.

[Display of EPG in Broadcast Receiving Apparatus]

In the broadcasting system of the present embodiment, time-series information related to events (so-called programs) included in services making up the broadcasting network is transmitted in the form of MH-EIT. FIG. 21 shows an example of the data structure of the MH-EIT of the present embodiment. The MH-EIT is classified into two classes by a table ID (corresponding to a "table_id" parameter in FIG. 21), and can provide information of the current and next events in its own TLV stream and schedule information of events in its own TLV stream. The broadcast receiving apparatus 100 of the present embodiment refers to the MH-EIT and others to identity a service with a service ID (corresponding to a "service_id" parameter in FIG. 21), thereby acquiring information of the start time, broadcasting time, and the like of each event to create an EPG screen. Further, the broadcast receiving apparatus 100 can display the created EPG screen on the monitor unit 162 by superposing it on video information and others in the video synthesizing unit 161.

Figure 22A:
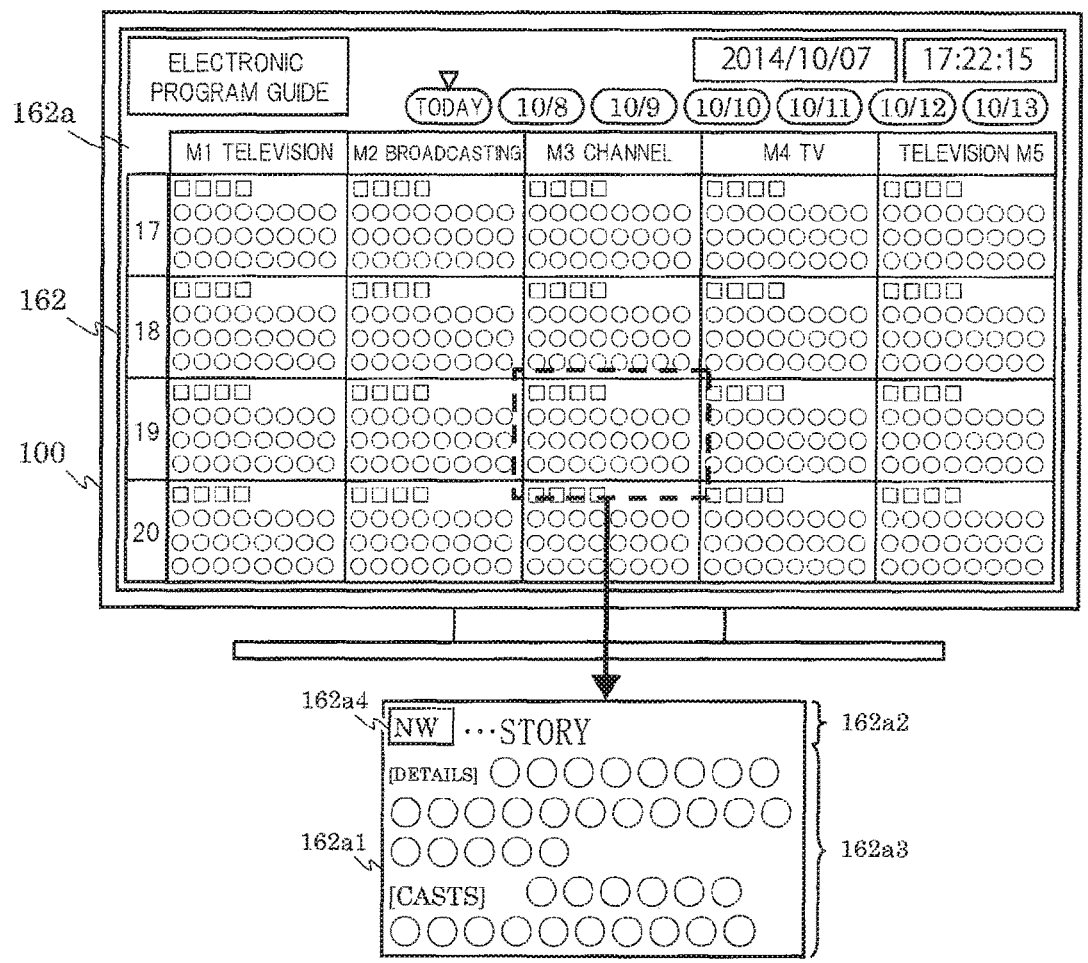
FIG. 22A is a screen display diagram of an EPG screen of the broadcast receiving apparatus according to the first embodiment.

FIG. 22A is a diagram showing an example of an EPG screen in the broadcast receiving apparatus 100 of the present embodiment. An EPG screen 162a has a matrix form with the vertical axis representing time and the horizontal axis representing service IDs (channels), and displays detailed information of broadcasting programs to be broadcasted in each channel in each time zone. Further, detailed information 162a1 of each broadcasting program is composed mainly of a title region 162a2 and a detail description region 162a3.

In the title region 162a2, symbols and others expressing the title and properties of the broadcasting program are displayed. The symbols and others expressing the properties of the broadcasting program are, for example, symbols/characters indicating that the broadcasting program is a new program or rerun program, or may be a mark or the like standing for "data" indicating that the program supports data broadcasting by a broadcasting service, or may be a mark 162a4 or the like standing for "NetWork" indicating that contents, applications, and others related to the broadcasting program can be acquired through the network. In addition, the symbols and others expressing the properties of the broadcasting program may be substituted by differentiating the background color of the detailed information 162a1 from others or enclosing the display region of the detailed information 162a1 with a thick line.

Note that, even when control information (messages, tables, descriptors, etc.) in the broadcasting system of the present embodiment indicates that contents, applications, and others related to the broadcasting program can be acquired through the network, if access to server devices on the network cannot be made for such a reason that a LAN cable is not connected to the LAN communication unit 121 of the broadcast receiving apparatus 100, the screen may be controlled so as not to display the mark 162a4 or the like standing for "Network".

Figure 22B:
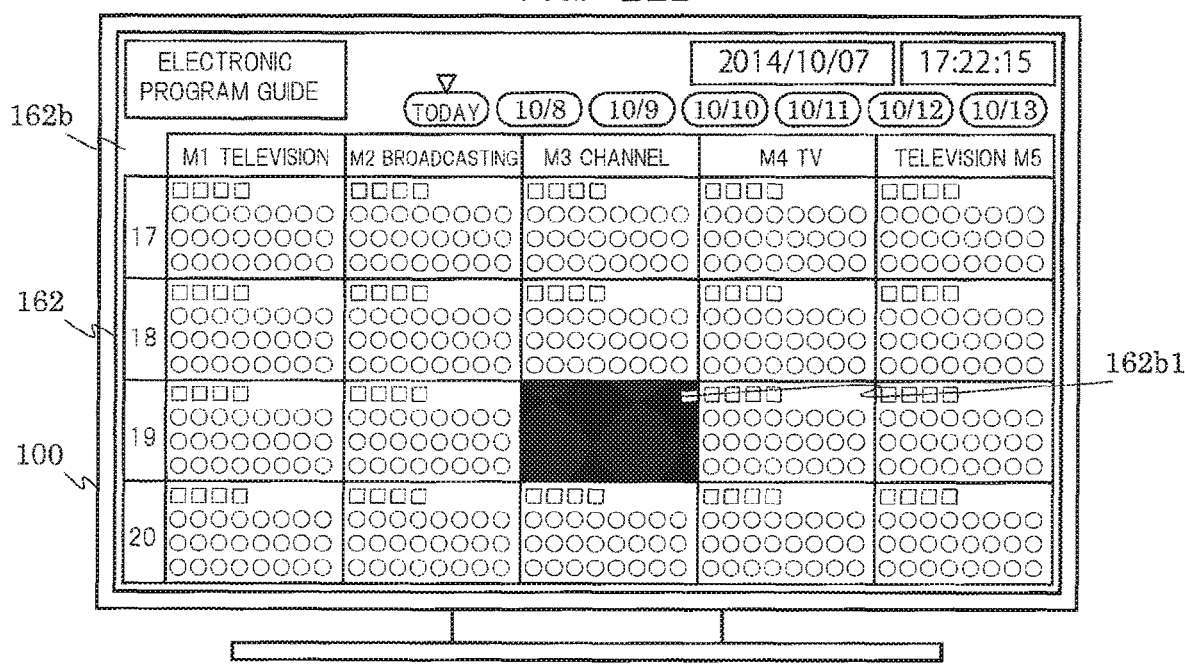
FIG. 22B is a screen display diagram of an EPG screen of the broadcast receiving apparatus according to the first embodiment.

In addition, when the broadcasting program is a network-distribution program distributed through the Internet 200 and therefore cannot be acquired from broadcast waves, and further the broadcast receiving apparatus 100 cannot access server devices on the network like in the case described above, the screen may be controlled so that a region of detailed information 162b1 displayed on an EPG screen 162b is grayed out as shown in FIG. 22B. Namely, the screen is controlled so as not to display detailed information of a network-distribution program that the user is not allowed to view. Alternatively, the gray-out process may be substituted by differentiating the background color of the detailed information 162b1 from others. It is also possible to notify the user that the broadcast receiving apparatus 100 is incapable of accessing server devices on the network or the user is not allowed to view a network-distribution program associated with the detailed information 162b1, by a popup message or the like when the user operates the remote controller (not shown) to select the detailed information 162b1.

Through the control described above, the broadcast receiving apparatus 100 can provide the user with information of broadcasting programs in a form that does not give any sense of discomfort to the user in accordance with the network connection state.

FIG. 22C is a diagram showing another example of the EPG screen in the broadcast receiving apparatus 100 of the present embodiment. In FIG. 22C, "M1 television", "M2 broadcasting", "M3 channel", "M4 TV", "Television M5", and others are the names of broadcast stations of respective channels, and the "M2 broadcasting" station provides broadcasting programs distributed through broadcast waves as well as network-distribution programs (information 162c1 indicated in a column of "network broadcasting" in FIG. 22C) distributed through the Internet 200 at the same time.

As shown in FIG. 22C, when a channel that provides only the network-distribution programs distributed through the Internet 200 is present, the screen is usually controlled to display the information of all the channels (including the information 162c1) as shown by an EPG screen 162c in FIG. 22C (A). Meanwhile, in the case where the broadcast receiving apparatus 100 cannot access server devices on the network or the like, the screen may be controlled so as not to display information of the channel of "M2 broadcasting (network broadcasting)" that provides only the network-distribution programs distributed through the Internet 200 (information 162c1 in FIG. 22C(A)) as shown by an EPG screen 162d in FIG. 22C(B).

Through the control described above, it becomes unnecessary for the user of the broadcast receiving apparatus 100 to check the information of a channel that provides programs that the user is not allowed to view.

[Display of Emergency Warning Broadcasting in Broadcast Receiving Apparatus]

The broadcast receiving apparatus 100 of the present embodiment can perform a process of receiving emergency warning broadcasting when an emergency warning broadcasting start control signal bit of a TMCC signal, which is included in transmission data including a TLV stream, changes from "0" to "1".

The emergency warning broadcasting may be provided as an application that displays a warning message on the full-screen scale or may be provided as character information in the form of a caption message. It is preferable that the character information in the form of a caption message is displayed regardless of the condition of the broadcast receiving apparatus 100 just before reception of the emergency warning broadcasting in a case where the emergency warning broadcasting is provided as character information in the form of a caption message. Namely, as shown in FIG. 23, when the broadcast receiving apparatus 100 receives emergency warning broadcasting in a state where the user views a regular broadcasting program by watching a program screen 162e of the broadcasting program displayed on the monitor unit 162, character information 162e1 by the emergency warning broadcasting is superposed and displayed on the program screen 162e. In the same manner, when the broadcast receiving apparatus 100 receives emergency warning broadcasting in a state where an EPG screen 162f is displayed on the monitor unit 162 in accordance with an instruction given by the user to display the EPG screen, character information 162f1 by the emergency warning broadcasting is superposed and displayed on the EPG screen 162f.

Through the control described above, even when the user selects an EPG screen, a setting screen, a timer recording program list screen, or an internet browser screen and causes the broadcast receiving apparatus 100 to display such a screen, it is possible to avoid overlooking important character information based on the received emergency warning broadcasting. Note that this control may be performed for the character information of an ordinary caption other than the emergency warning broadcasting.

[Various Exceptional Processes]

When failing to acquire data of a transmission path other than a TLV stream in the same package, the broadcast receiving apparatus 100 of the present embodiment may perform, for example, the following exceptional processes.

As described above with reference to FIG. 6E, in the broadcasting system compatible with the broadcast receiving apparatus 100 of the present embodiment, data acquired from a TLV stream and data acquired from a transmission path other than the TLV stream can be included in the same package, based on location information (corresponding to the "MMT_general_location_info( )" in FIG. 17) stored in the MPT. However, the data transmission path other than the TLV stream that is indicated by the location information (e.g., IPv4 data flow, IPv6 data flow, MPEG2-TS of broadcasting, etc.) is a receiving function different from a receiving function of TLV/MMT streams. For this reason, even when the broadcast receiving apparatus 100 is in operation, the data may not be acquired from such a data transmission path in a situation where the receiving function of the data transmission path is not working, a situation where the receiving function is working but a relay device and others are not operating, a situation where a wired or wireless connection of the transmission path is not established, and a situation where the broadcast receiving apparatus 100 is placed in an environment in which the data transmission path cannot be connected.

In such situations, when the broadcast receiving apparatus 100 of the present embodiment receives an event in which the location information stored in the MPT indicates that the data acquired from the TLV stream and the data acquired from the transmission path other than the TLV stream are correlated to be included in the same package, the broadcast receiving apparatus 100 may perform the following operations.

For example, when an LCT specifies a plurality of regions on the screen as shown in FIGS. 19B and 19C, and video included in the TLV stream and data acquired from a transmission path other than the TLV stream are correlated so that the video is displayed in the "region 0" and the data is displayed in the "region 1" and "region 2", but the data from the transmission path other than the TLV stream to be displayed in the "region 1" and "region 2" cannot be acquired, the layout display of a plurality of regions specified by the LCT may be forbidden. Specifically, even when the LCT is received, the video contents received from the TLV stream is kept displayed in the "region 0" in the default layout display shown in FIG. 19A, and this layout is prevented from shifting to the layout display of a plurality of regions shown in FIGS. 19B and 19C. Further, even if an instruction to make a layout change from the default layout to the layout specified by the LCT is inputted to the operation input unit 170 of FIG. 7A in this state, a shift to the layout display of a plurality of regions of FIGS. 19B and 19C may be prevented by maintaining the default layout of FIG. 19A or shifting the screen to a different data broadcasting screen.

As another operation example when an LCT specifies a plurality of regions on the screen as shown in FIGS. 19B and 19C, and video included in the TLV stream and data acquired from a transmission path other than the TLV stream are correlated so that the video is displayed in the "region 0" and the data is displayed in the "region 1" and "region 2", but the data from the transmission path other than the TLV stream to be displayed in the "region 1" and "region 2" cannot be acquired, a display frame for the plurality of regions of FIGS. 19B and 19C specified by the LCT is displayed temporarily to display a background color or a given still image in the "region 1" and "region 2", and if the data from the transmission path other than the TLV stream indicated by the location information of the MPT cannot be acquired after an elapse of a given time, the display layout is shifted back to the default layout display shown in FIG. 19A. In this case, it is preferable that the screen is controlled so that the program video included in the TLV stream is kept displayed in the "region 0" even in the layout change shown in FIGS. 19A, 19B, and 19C because the program video itself for the user continues.

Further, even in a state where the video contents received in the TLV stream are displayed in the "region 0" in the default layout display of FIG. 19A because the data from the transmission path other than the TLV stream to be displayed in the "region 1" and "region 2" cannot be acquired, operations of various communication functions and receiving functions of the broadcast receiving apparatus 100 of the present embodiment are started or communication environment and communication state of the various communication functions and reception environment and reception state of the various receiving functions are changed in some cases, with the result that it becomes possible to acquire the data from the transmission path other than the TLV stream to be displayed in the "region 1" and "region 2" In such a case, the broadcast receiving apparatus 100 of the present embodiment may immediately shift the display layout from the default layout display of FIG. 19A to the layout of a plurality of regions of FIGS. 19B and 19C specified by the LCT so that the video contents received from the TLV stream are displayed in the "region 0" and the data acquired from the transmission path other than the TLV stream is displayed in the "region 1" and "region 2". Alternatively, the layout change may be performed after an instruction to make a layout change from the default layout to the layout specified by the LCT is inputted to the operation input unit 170, instead of performing the layout change immediately.

[Copy Right Protection Function]

In the digital broadcasting system compatible with the broadcast receiving apparatus 100 of the present embodiment, the copy control information may be included in the MPT so that the copy control information is transmitted to indicate copy control states of contents that the MPT refers to, and the copy control states includes "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+allowing move once), and "copy prohibited". In this case, the broadcast receiving apparatus 100 of the present embodiment may be configured to control the processes of storing the contents in the storage (accumulation) unit 110, recoding the contents on a removable recording medium, outputting the contents to external equipment, copying the contents to external equipment, and moving the contents to external equipment in accordance with the copy control information. Note that data to be subjected to the storage process may include not only the data stored in the storage (accumulation) unit 110 in the broadcast receiving apparatus 100 but also a record that is protected by an encoding process or the like so as to be reproduced only by the broadcast receiving apparatus 100. Specifically, data to be subjected to the storage process includes the data recorded in an external recording device in the state of being reproduced only by the broadcast receiving apparatus 100.

Specific examples of processes based on the copy control information will be described below.

First, when the copy control information included in the MPT indicates "freely copiable", the broadcast receiving apparatus 100 of the present embodiment is allowed to perform the processes of storage to the storage (accumulation) unit 110, recoding on the removable recording medium, output to external equipment, copy to external equipment, and move to external equipment, without limitations. However, in the case where "freely copiable" is divided into "freely copiable and requiring encoding process upon storage and output" and "freely copiable and not requiring encoding process upon storage and output" and when the copy control information indicates "freely copiable and requiring encoding process upon storage and output", the broadcast receiving apparatus 100 is allowed to perform the processes of storage to the storage (accumulation) unit 110, recoding on the removable recording medium, output to external equipment, copy to external equipment, and move to external equipment any number of times without any limitation, but has to apply the encoding process in any cases.

Further, when the copy control information included in the MPT indicates "copiable only for one generation", the broadcast receiving apparatus 100 of the present embodiment is allowed to store encoded contents in the storage (accumulation) unit 110, but when the stored contents are to be outputted to external equipment for viewing, the broadcast receiving apparatus 100 has to output the contents after encoding the contents together with the copy control information indicating "copy prohibited". However, the broadcast receiving apparatus 100 is allowed to perform a so-called moving process to the external equipment (the process of copying the contents to the external equipment and disabling the reproduction of the contents in the storage (accumulation) unit 110 of the broadcast receiving apparatus 100 by, for example, deleting the contents).

Further, when the copy control information included in the MPT indicates "copiable given times", the broadcast receiving apparatus 100 of the present embodiment is allowed to store encoded contents in the storage (accumulation) unit 110, but when the stored contents are to be outputted to external equipment for viewing, the broadcast receiving apparatus 100 has to output the contents after encoding the contents together with the copy control information indicating "copy prohibited". However, the broadcast receiving apparatus 100 is allowed to perform the copying and move process of contents to the external equipment predetermined times. In the case of the so-called "dubbing 10", the broadcast receiving apparatus 100 is allowed to perform copying to the external equipment nine times and the moving process to the external equipment once.

Further, when the copy control information included in the MPT indicates "copy prohibited", the broadcast receiving apparatus 100 of the present embodiment is prohibited from copying to the storage (accumulation) unit 110. However, when the broadcast receiving apparatus 100 is configured to have a "temporary storage" mode in which storage to the storage (accumulation) unit 110 is allowed only for a predetermined given time or a given time specified by control information (e.g., the MH-Expire descriptor or the like shown in FIG. 6D) included in a broadcasting signal, the broadcast receiving apparatus 100 is allowed to store the contents temporarily in the storage (accumulation) unit 110 even when the copy control information included in the MPT indicates "copy prohibited". When the contents for which the copy control information included in the MPT indicates "copy prohibited" are to be outputted to external equipment for viewing, the broadcast receiving apparatus 100 has to output the contents after encoding the contents together with the copy control information indicating "copy prohibited".

Note that the output of the contents to the external equipment for viewing can be performed by the video output unit 163 and the audio output unit 166 or through the digital IF unit 125 and the LAN communication unit 121 of FIG. 7A. The copying or moving process to the external equipment can be performed through the digital IF unit 125 and the LAN communication unit 121 of FIG. 7A.

According to the processes described above, proper contents protection can be achieved in accordance with the copy control information correlated with contents.

Further, the copying process of the contents for which the copy control information indicates copy limitations such as "copiable only for one generation", "copiable given times", and "copy prohibited" to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present. The same applies also to the case of the contents for which the copy control information indicates "freely copiable and requiring encoding process upon storage and output".

Similarly, the process of storing the contents for which the copy control information indicates copy limitations such as "copiable only for one generation", "copiable given times", and "freely copiable and requiring encoding process upon storage and output" temporarily in the storage (accumulation) unit 110 and then moving the contents to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present.

Video and audio output for viewing contents stored in the storage (accumulation) unit 110 of the broadcast receiving apparatus 100 is allowed in principle only when the IP address of the external equipment which is the destination of a transmission packet sent from the broadcast receiving apparatus 100 is present in the same subnet as the IP address of the broadcast receiving apparatus 100, and the output is prohibited when the IP address of the external equipment is outside the subnet in which the IP address of the broadcast receiving apparatus 100 is present. However, when the external equipment is connected within a given period in the subnet in which the IP address of the broadcast receiving apparatus 100 is present and is registered (by paring) as equipment allowed to view the contents even outside the subnet in which the IP address of the broadcast receiving apparatus 100 is present, video and audio output for viewing the contents stored in the storage (accumulation) unit 110 of the broadcast receiving apparatus 100 to the external equipment may be allowed even when the IP address of the external equipment is outside the subnet in which the IP address of the broadcast receiving apparatus 100 is present. In this case, the video and audio output for viewing the contents is performed by encoding the contents.

According to the process described above, different processes are performed depending on whether the IP address of the external equipment is present in the same subnet as the IP address of the broadcast receiving apparatus 100 or is outside the same subnet, so that both of the user convenience and contents protection can be achieved.

Next, as described above with reference to FIG. 6E, in the digital broadcasting system compatible with the broadcast receiving apparatus 100 of the present embodiment, data that is acquired from a path (IPv4, IPv6, MPEG2-TS, URL, etc.) different from data that is acquired from a TLV stream of the broadcasting path may be included in the same package and the same event as the data that is acquired from the TLV stream based on the location information ("MMT_general_location_info( )" of FIG. 17) in the MTP. The contents protection that is performed when copy control information is included in the MPT in this case will be described.

First, when copy control information is included in the MPT, data that is included in the same package and the same event based on the location information may be controlled in accordance with the copy control information included in the TLV stream even if the data is acquired from a path (IPv4, IPv6, MPEG2-TS, URL, etc.) different from data that is acquired from a TLV stream of the broadcasting path. As described above, the copy control states of contents specified by the copy control information include "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+allowing move once), and "copy prohibited".

Herein, if data location indicated by the location information includes MPEG2-TS data transmitted by a different digital broadcasting signal, the transmitted MPEG2-TS data is correlated with copy control information also in the different digital broadcasting signal. Accordingly, a problem arises as to in what way and in accordance with which information the copy control of the MPEG2-TS data should be performed (which of the copy control information included in the TLV/MMT stream and the copy control information included in the MPEG2-TS should be referred to in performing copy control).

In the digital broadcasting system of the present embodiment, this problem can be solved by performing any one of the following operations in the broadcast receiving apparatus 100.

First Operation Example

In a first operation example, when copy control information is included in the MPT and data that is included in the same package and the same event based on the location information includes MPEG2-TS data transmitted by a different digital broadcasting signal, priority is given to a copy control state indicated by the copy control information included in the TLV stream over a copy control state indicated by the copy control information included in the MPEG2-TS in performing copy control.

For example, when the copy control state indicated by the copy control information included in the TLV stream is "copiable only for one generation" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "copiable only for one generation". For example, when the copy control state indicated by the copy control information included in the TLV stream is "freely copiable" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "freely copiable".

By this operation, data acquired from a path other than the TLV stream can also be put in a copy control state desired in the broadcasting system compatible with the broadcast receiving apparatus 100 of the present embodiment.

Second Operation Example

In a second operation example, when copy control information is included in the MPT and data that is included in the same package and the same event based on the location information includes MPEG2-TS data transmitted by a different digital broadcasting signal, a copy control state indicated by the copy control information included in the TIN stream is compared with a copy control state indicated by the copy control information included in the MPEG2-TS, and if the copy control state indicated by the copy control information included in the MPEG2-TS is severer than the copy control state indicated by the copy control information included in the TLV stream, the MPEG2-TS data is excluded from contents to be processed when performing the storing process to the storage (accumulation) unit 110, recording process on the removable recoding medium, or outputting process from the digital interface.

By this operation, with respect to the data acquired from the path other than the TLV stream, the original copy control information of the data set in the broadcasting system in which the data is transmitted is taken into account, and also the redundant copy control states on the broadcast receiving apparatus 100 of the present embodiment can be eliminated.

Further, if the copy control state indicated by the copy control information included in the MPEG2-TS is identical to or less severe than the copy control state indicated by the copy control information included in the TLV stream as a result of the above comparison, the MPEG2-TS data that is included in the same package and the same event based on the location information may be subjected to copy control as contents in the copy control state indicated by the copy control information included in the TLV stream.

By this operation, with respect to the data acquired from the path other than the TLV stream, the original copy control information of the data set in the broadcasting system in which the data is transmitted is taken into account, and the redundant copy control states on the broadcast receiving apparatus 100 of the present embodiment can be eliminated.

The copy right protection function of the broadcast receiving apparatus 100 of the present embodiment has been described as being performed based on the copy control information included in the MPT. However, the MPT is not the only table including the copy control information. The copy control information may be included also in tables other than the MPT such as the MH-service description table (MH-SDT), the MH-event information table (MH-EIT), or other tables shown in FIG. 6B, and the broadcast receiving apparatus 100 can perform the copy right protection process in accordance with the copy control information transmitted in these tables.

According to the above-described embodiment, it is possible to provide the broadcasting receiver supporting MMT digital broadcasting.

Second Embodiment

A second embodiment of the present invention will be described below. Constituent elements, processes, effects and the like of the second embodiment are the same as those of the first embodiment unless otherwise specified. For this reason, in the following description, differences between the first embodiment and the second embodiment are mainly described, and description of the matters common to both embodiments is omitted as much as possible in order to avoid redundant description. Further, the following description will be made based on the assumption that a broadcast receiving apparatus of the second embodiment is a television receiver that supports both of MMT method and MPEG2-TS method as the media transport method.

[Hardware Configuration of Broadcast Receiving Apparatus]

Figure 24:
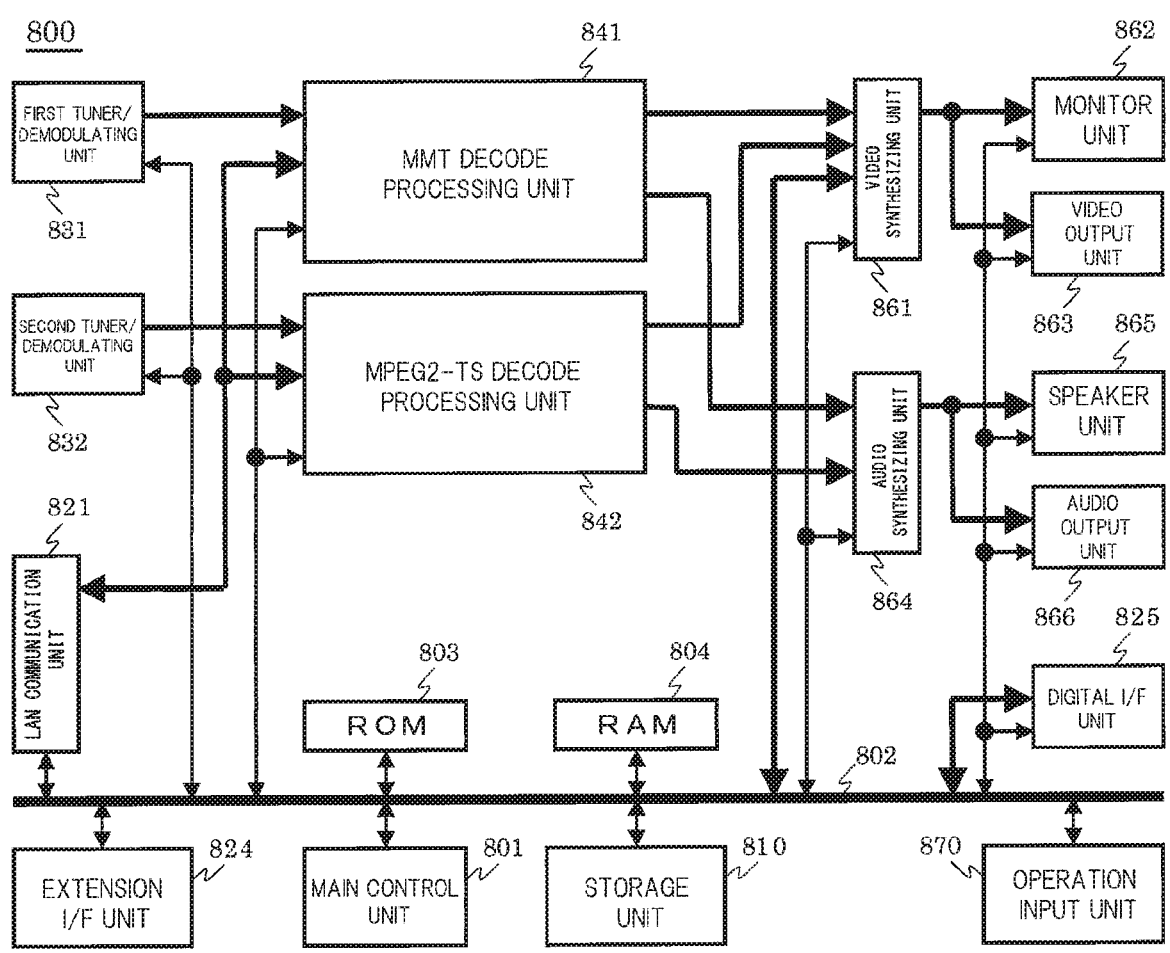
FIG. 24 is a block diagram of a broadcast receiving apparatus according to a second embodiment.

FIG. 24 is a block diagram showing an example of an internal configuration of a broadcast receiving apparatus 800. The broadcast receiving apparatus 800 includes a main control unit 801, a system bus 802, a ROM 803, a RAM 804, a storage unit 810, a LAN communication unit 821, an extension interface unit 824, a digital interface unit 825, a first tuner/demodulating unit 831, a second tuner/demodulating unit 832, an MMT decode processing unit 841, an MPEG2-TS decode processing unit 842, a video synthesizing unit 861, a monitor unit 862, a video output unit 863, an audio synthesizing unit 864, a speaker unit 865, an audio output unit 866, and an operation input unit 870.

The main control unit 801, the system bus 802, the ROM 803, the RAM 804, the storage unit 810, the extension interface unit 824, the digital interface unit 825, the monitor unit 862, the video output unit 863, the speaker unit 865, the audio output unit 866, the operation input unit 870, and the like have functions equivalent to those of the main control unit 101, the system bus 102, the ROM 103, the RAM 104, the storage (accumulation) unit 110, the extension interface unit 124, the digital interface unit 125, the monitor unit 162, the video output unit 163, the speaker unit 165, the audio output unit 166, the operation input unit 170, and the like in the broadcast receiving apparatus 100 of the first embodiment, respectively, and detail descriptions thereof are omitted.

The first tuner/demodulating unit 831 receives broadcast waves of a broadcasting service adopting the MMT method as the media transport method via an antenna (not shown), and tunes to (selects) a channel giving a service that the user wishes to have, under the control by the main control unit 801. Further, the first tuner/demodulating unit 831 demodulates a received broadcasting signal to acquire an MMT data string, and outputs the MMT data string to the MMT decode processing unit 841. The second tuner/demodulating unit 832 receives broadcast waves of a broadcasting service adopting the MPEG2-TS method as the media transport method via an antenna (not shown), and tunes to (selects) a channel giving a service that the user wishes to have, under the control by the main control unit 801. Further, the second tuner/demodulating unit 832 demodulates a received broadcasting signal to acquire an MPEG2-TS data string, and outputs the MPEG2-TS data string to the MPEG2-TS decode processing unit 842.

The MMT decode processing unit 841 receives the MMT data string output from the first tuner/demodulating unit 831, and performs processes of separating and decoding a video data string, an audio data string, a caption data string, a subtitle data string, and the like, which are real-time presentation elements, based on a control signal included in the MMT data string. The MMT decode processing unit 841 has the functions equivalent to those of the separating unit 132, the video decoder 141, the video color gamut conversion unit 142, the audio decoder 143, the caption decoder 144, the subtitle decoder 145, the subtitle synthesizing unit 146, the subtitle color gamut conversion unit 147, the data decoder 151, the cache unit 152, the application control unit 153, the browser unit 154, the application color gamut conversion unit 155, the sound source unit 156, and the like in the broadcast receiving apparatus 100 of the first embodiment. The MMT decode processing unit 841 is capable of performing the various processes described in the first embodiment. The details of the various processes have been described in the first embodiment, and further descriptions thereof are omitted.

The MPEG2-TS decode processing unit 842 receives the MPEG2-TS data string output from the second tuner/demodulating unit 832, and performs processes of separating and decoding a video data string, an audio data string, a caption data string, a subtitle data string, and the like, which are real-time presentation elements, based on a control signal included in the MPEG2-TS data string. The MPEG2-TS decode processing unit 842 has the function equivalent to that of an IRD (Integrated Reviver Decoder) of a conventional television receiver that receives broadcast waves of a broadcasting service adopting the MPEG2-TS method as the media transport method, and detailed descriptions thereof are omitted.

The video synthesizing unit 861 receives video information, subtitle information, and application information output from the MMT decode processing unit 841 and video information, subtitle information, and application information output from the MPEG2-TS decode processing unit 842, and properly performs a selection process and/or a superposition process. The video synthesizing unit 861 has a video RAM (not shown), and the monitor unit 862 and others are driven based on video information and others inputted to the video RAM. In addition, the video synthesizing unit 861 performs a scaling process, a superposing process of EPG screen information, and others under the control by the main control unit 801 when necessary. The audio synthesizing unit 864 receives audio information output from the MMT decode processing unit 841 and audio information output from the MPEG2-TS decode processing unit 842, and properly performs a selection process and/or a mixing process.

The LAN communication unit 821 is connected to the Internet 200 via the router device 200r, and transmits and receives data to and from server devices and other communication equipment on the Internet 200. Further, the LAN communication unit 821 acquires an MMT data string (or part of it) and an MPEG2-TS data string (or part of it) of a program transmitted through the communication line, and properly outputs them to the MMT decode processing unit 841 and the MPEG2-TS decode processing unit.

[Time Display in Broadcast Receiving Apparatus]

The broadcast receiving apparatus 800 of the present embodiment can display the current date and current time on the EPG screen and other various setting screens. Information related to the current date and current time is transmitted by an MH-TOT or the like in the case of a broadcasting service adopting the MMT method as the media transport method, and the information is transmitted by a TOT (Time Offset Table) or the like provided in SI (Service Information) defined in the MPEG-2 system in the case of a broadcasting service adopting the MPEG2-TS method as the media transport method. The broadcast receiving apparatus 800 can acquire the information related to the current date and current time by referring to the MH-TOT and the TOT.

In general, when the video synthesizing unit 861 mainly selects video information and others output from the MMT decode processing unit 841, the video synthesizing unit 861 superposes the information related to the current date and current time acquired from the MH-TOT on the video information and others, and when the video synthesizing unit 861 mainly selects video information and others output from the MPEG2-TS decode processing unit 842, the video synthesizing unit 861 superposes the information related to the current date and current time acquired from the TOT on the video information and others.

However, since the broadcasting service adopting the MMT method as the media transport method is different from the broadcasting service adopting the MPEG2-TS method as the media transport method in coding/decoding processes, transmission paths, and the like, there is a possibility that inconsistency occurs in current time display between the case of selecting the broadcasting service adopting the MMT method as the media transport method and the case of selecting the broadcasting service adopting the MPEG2-TS method as the media transport method. For example, when an EPG screen 162g displaying channel information of the broadcasting service adopting the MMT method as the media transport method is switched to an EPG screen 162h displaying channel information of the broadcasting service adopting the MPEG2-TS method as the media transport method as shown in FIG. 25, the inconsistency caused when the display of current time is switched from a current time display 162g1 to a current time display 162h1 may give the user a feeling of visual discomfort.

In order to prevent the user from having such a feeling of visual discomfort, the broadcast receiving apparatus 800 of the present embodiment performs control to superpose the information related to the current date and current time acquired from the TOT on the video information and others even when the video synthesizing unit 861 mainly selects the video information and others output from the MMT decode processing unit 841. Namely, the broadcast receiving apparatus 800 of the present embodiment performs control to superpose current time information provided by the broadcasting service adopting the MPEG2-TS method as the media transport method, on the contents of the broadcasting service adopting the MMT method as the media transport method.

Through the control described above, the broadcast receiving apparatus 800 of the present embodiment always displays the current time information that is acquired by referring to the TOT. Thus, even when the broadcasting service adopting the MMT method as the media transport method and the broadcasting service adopting the MPEG2-TS method as the media transport method are switched to each other, it is possible to prevent the user from having such a feeling of visual discomfort due to inconsistency in the display of current time.

Figures 26A, 26B:
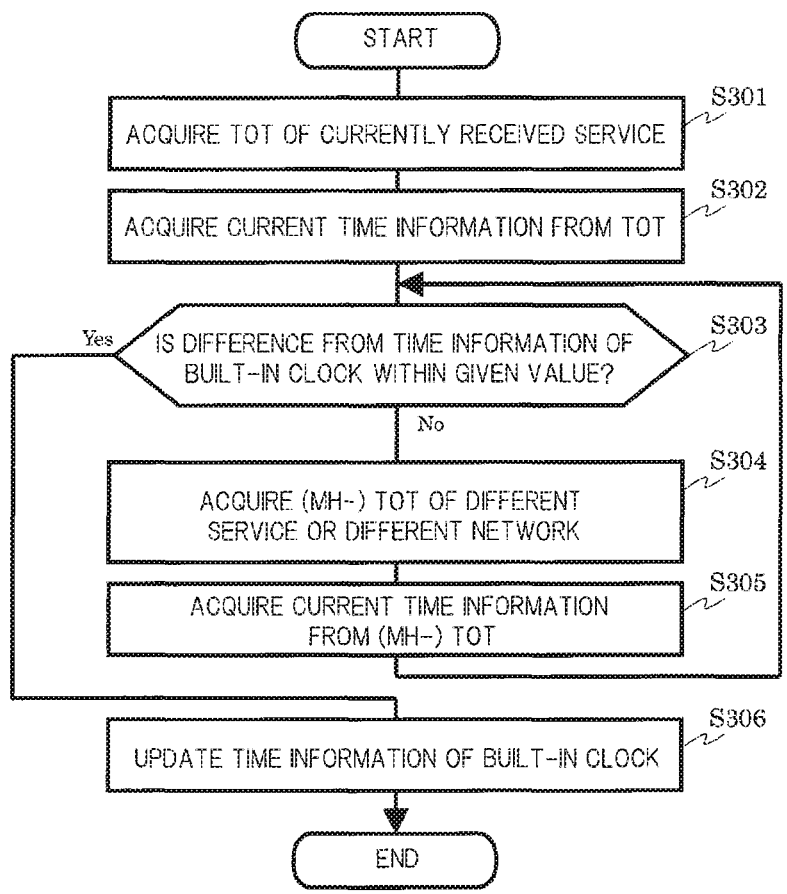
FIG. 26A is an explanatory diagram of an operation of selection control of a reference source of current time information according to the second embodiment.
FIG. 26B is an operation sequence diagram of an update process of current time information according to the second embodiment.

FIG. 26A shows an example of selection control of a reference source of current time information in accordance with the reception state of broadcasting services in the broadcast receiving apparatus 800 of the present embodiment. The broadcast receiving apparatus 800 of the present embodiment always refers to the TOT to acquire current time information when the broadcast receiving apparatus 800 is in a condition in which it can receive the broadcasting service adopting the MPEG2-TS method as the media transport method, and refers to the MH-TOT to acquire current time information only when the broadcast receiving apparatus 800 is in a condition in which it cannot receive the broadcasting service adopting the MPEG2-TS method as the media transport method but can receive the broadcasting service adopting the MMT method as the media transport method.

In addition, the above-mentioned effect can be achieved also by performing control to superpose current time information provided by the broadcasting service adopting the MMT method as the media transport method on contents of the broadcasting service adopting the MPEG2-TS method as the media transport method contrary to the above control.

In both of the case of control in which current time information provided by the broadcasting service adopting the MPEG2-TS method as the media transport method is superposed on contents of the broadcasting service adopting the MMT method as the media transport method and the case of control in which current time information provided by the broadcasting service adopting the MMT method as the media transport method is superposed on contents of the broadcasting service adopting the MPEG2-TS method as the media transport method, the current time information can be corrected by referring to the "delta" parameter of the time information in the TMCC extension information region as described above in [Time Management of Broadcast Receiving Apparatus] of the first embodiment.

Further, in both cases of the broadcasting service in which the MMT method is adopted as the media transport method and the broadcasting service in which the MPEG2-TS method is adopted as the media transport method, there is a possibility that the MH-TOT or TOT transmitted by respective broadcasting services making up the network has an error due to the fault of the transmission system or the transmission failure. As the measures for the error of the MH-TOT or TOT described above, the broadcast receiving apparatus 800 of the present embodiment has a function of performing an update process of time information of a built-in clock by acquiring an MH-TOT or TOT from a different broadcasting service in the same network or an arbitrary broadcasting service in another network and referring to current time information of the acquired MH-TOT or TOT when it is determined that the MH-TOT or TOT acquired from the service being received at present has an error.

FIG. 26B shows an example of an update process of current time information in the case where the broadcasting service adopting the MPEG2-TS method as the media transport method is received in the broadcast receiving apparatus 800 of the present embodiment. Note that the process similar to that shown in FIG. 26B is possible even when the broadcasting service adopting the MMT method as the media transport method is received.

When the time information of the built-in clock is updated in the broadcast receiving apparatus 800 of the present embodiment, first, the receiving function executing unit 1102 acquires the TOT from the MPEG2-TS data string of the currently received broadcasting service (broadcasting serving adopting the MPEG2-TS method as the media transport method) (S301), and then acquires the current time information by referring to the acquired TOT (S302). Next, the receiving function executing unit 1102 performs the process of comparing the current time information acquired in the process of S302 and the time information of the built-in clock.

When the difference between the current time information acquired in the process of S302 and the time information of the built-in clock is within a given value (e.g., within 3 minutes) as a result of the comparison process (S303: Yes), the receiving function executing unit 1102 updates the time information of the built-in clock based on the current time information acquired in the process of S302 (S306). Meanwhile, when the difference between the current time information acquired in the process of S302 and the time information of the built-in clock is not within the given value as a result of the comparison process (S303: No) or the TOT acquired in S301 has a flag or the like indicating that an error is present in the data, the receiving function executing unit 1102 acquires a TOT from an MPEG2-TS data string of a different broadcasting service in the same network or acquires an MH-TOT from an MMT data string of an arbitrary broadcasting service (broadcasting serving adopting the MMT method as the media transport method) in another network (S304), and further acquires current time information from the acquired TOT or MH-TOT (S305). The receiving function executing unit 1102 can perform the comparison process of S303 again based on the current time information acquired in the process of S305.

Through the process described above, the broadcast receiving apparatus 800 of the present embodiment can perform the update process of the time information of the built-in clock by acquiring an MH-TOT or TOT from a different broadcasting service in the same network or an arbitrary broadcasting service in another network and referring to current time information of the acquired MH-TOT or TOT when it is determined that the MH-TOT or TOT acquired from the service being received at present has an error.

When the current time information whose difference from the time information of the built-in clock falls within a given range cannot be acquired even by the repetition of S304 and S305 like in the initial setting after the product shipment, the time information of the built-in clock may be set newly based on the current time information acquired in the process of S302. In this manner, it is possible to deal with the case where the time information of the built-in clock of the broadcast receiving apparatus 800 of the present embodiment has an error.

[Display of EPG in Broadcast Receiving Apparatus]

Event schedule information of the broadcasting service adopting the MMT method as the media transport method is transmitted by MH-EIT or the like. Meanwhile, event schedule information of the broadcasting service adopting the MPEG2-TS method as the media transport method is transmitted by EIT (Event Information Table) or the like included in SI defined in the MPEG-2 system. Therefore, in general, when video information or the like provided by the broadcasting service adopting the MMT method as the media transport method is displayed, the event schedule information (MH-EIT) of the broadcasting service adopting the MMT method can be acquired, and when video information or the like provided by the broadcasting service adopting the MPEG2-TS method as the media transport method is displayed, the event schedule information (EIT) of the broadcasting service adopting the MPEG2-TS method can be acquired.

However, the broadcast receiving apparatus 800 of the present embodiment can acquire both MH-EIT and EIT when displaying video information or the like provided by the broadcasting service adopting the MMT method as the media transport method as well as when displaying video information or the like provided by the broadcasting service adopting the MPEG2-TS method as the media transport method, and thus the user friendliness can be improved.

Figure 27A:
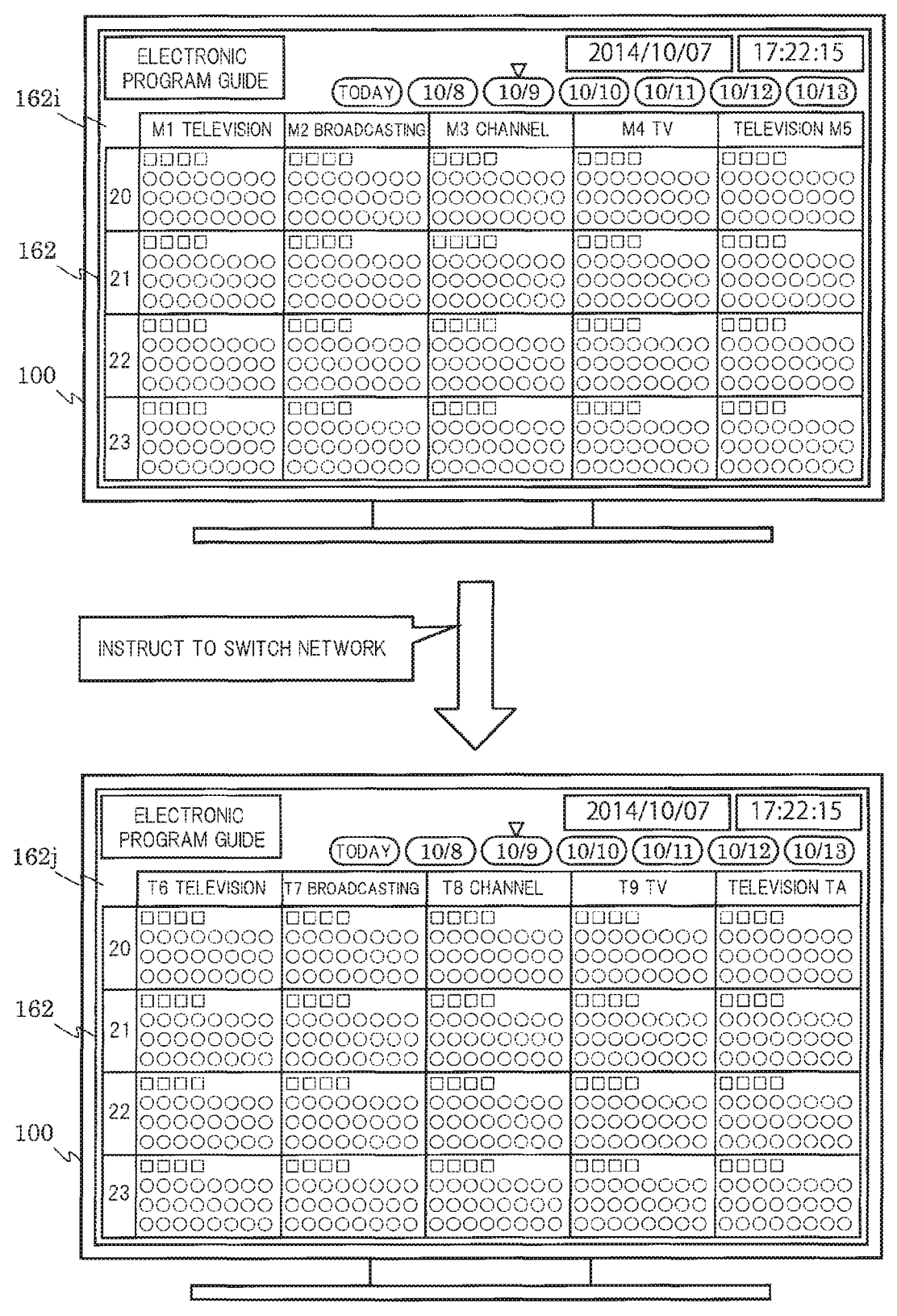

FIG. 27A shows an example of the EPG screen in the broadcast receiving apparatus 800 of the present embodiment. In FIG. 27A, an EPG screen 162*i* is an EPG screen that is created based on the MH-EIT of the broadcasting service adopting the MMT method as the media transport method, and "M1 television", "M2 broadcasting", "M3 channel", "M4 TV", "television M5" and the like are the names of broadcast stations that provide the broadcasting service adopting the MMT method as the media transport method. Further, an EPG screen 162*j* is an EPG screen that is created based on the EIT of the broadcasting service adopting the MPEG2-TS method as the media transport method, and "T6 television", "T7 broadcasting", "T8 channel", "T9 TV", "television TA" and others are the names of broadcast stations that provide the broadcasting service adopting the MPEG2-TS method as the media transport method.

For example, when the user who is watching a broadcasting program provided by the broadcasting service adopting the MMT method as the media transport method gives an instruction to display the EPG screen by operating the remote controller (not shown), an initial EPG screen (not shown) appears. The initial EPG screen is an EPG screen that is created based on the MH-EIT of the broadcasting service adopting the MMT method as the media transport method, and shows detailed information of broadcasting programs of respective channels in a time zone of "from 17:00 (around current time)" on "Oct. 7, 2014 (today)". Then, if the user wishes to check detailed information of broadcasting programs of respective channels in a time zone of "from 20:00" on "Oct. 9, 2014" and gives an instruction to update the EPG screen by operating the remote controller (not shown), the EPG screen 162*i* appears.

Subsequently, if the user wishes to check detailed information of broadcasting programs provided by the broadcasting service adopting the MPEG2-TS method as the media transport method and gives a network switching instruction by operating the remote controller (not shown), the EPG screen 162*j* appears. At this time, the broadcast receiving apparatus 800 of the present embodiment controls the screen to display detailed information of broadcasting programs of the respective channels in the same time zone on the same date (i.e., "from 20:00" on "Oct. 9, 2014") as those of the EPG screen 162*i* displayed just before the network switching, instead of the initial EPG screen that is created based on the EIT of the broadcasting service adopting the MPEG2-TS method as the media transport method (i.e., detailed information of broadcasting programs of the respective channels in the time zone of "from 17:00" on "Oct. 7, 2014").

Through the control described above, the user can consecutively check detailed information of broadcasting programs provided in the same time zone on the same date by a plurality of networks with different media transport methods by a simple operation. Namely, the user friendliness of the broadcast receiving apparatus 800 can be improved.

Figure 27B:
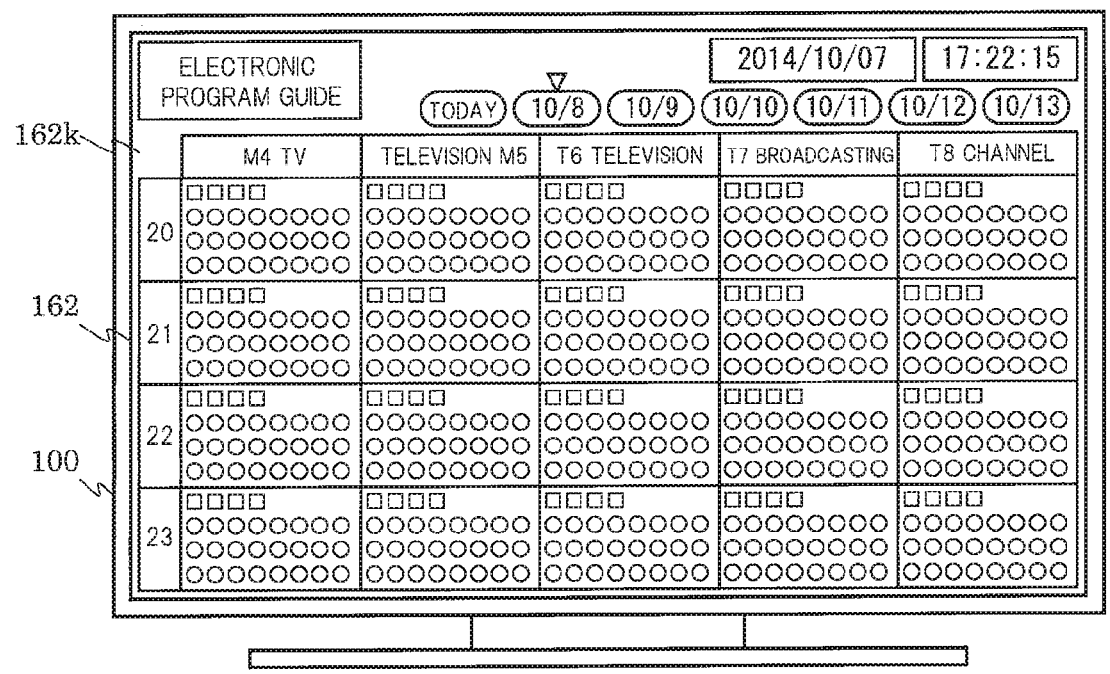
FIG. 27B is a screen display diagram of an EPG screen of the broadcast receiving apparatus according to the second embodiment.

FIG. 27B is a diagram showing an example of the EPG screen in the broadcast receiving apparatus 800 of the present embodiment that is different from the example mentioned above. An EPG screen 162*k* shows a state obtained by scrolling the EPG screen 162*i* of FIG. 27A in the direction of arrangement of the channels (horizontal direction) by the operation of the remote controller (not shown). Namely, in the example of FIG. 27B, by scrolling the EPG screen in the direction of arrangement of the channels (horizontal direction), the channel information that is created based on the MH-EIT of the broadcasting service adopting the MMT method as the media transport method and the channel information that is created based on the EIT of the broadcasting service adopting the MPEG2-TS method as the media transport method are displayed on the same time axis in a seamless manner.

Accordingly, even when the user wishes to check the channel information that is created based on the EIT of the broadcasting service adopting the MPEG2-TS method as the media transport method while checking the channel information that is created based on the MH-EIT of the broadcasting service adopting the MMT method as the media transport method, the user does not need to give a network switching instruction or the like by the operation of the remote controller (not shown). In addition, the user is allowed to collectively check detailed information of broadcasting programs provided in the same time zone on the same date by a plurality of networks with different media transport methods. Namely, the user friendliness of the broadcast receiving apparatus 800 can be improved.

Third Embodiment

Hereinafter, a third embodiment according to the present invention will be described. Constituent elements, effects and the like of the present embodiment are the similar to those of the first embodiment unless otherwise specified. For this reason, in the following description, differences between the present embodiment and the first embodiment will be mainly described, and description of the matters common to both embodiments is omitted as much as possible in order to avoid redundant description.

[System Configuration]

Figure 28:
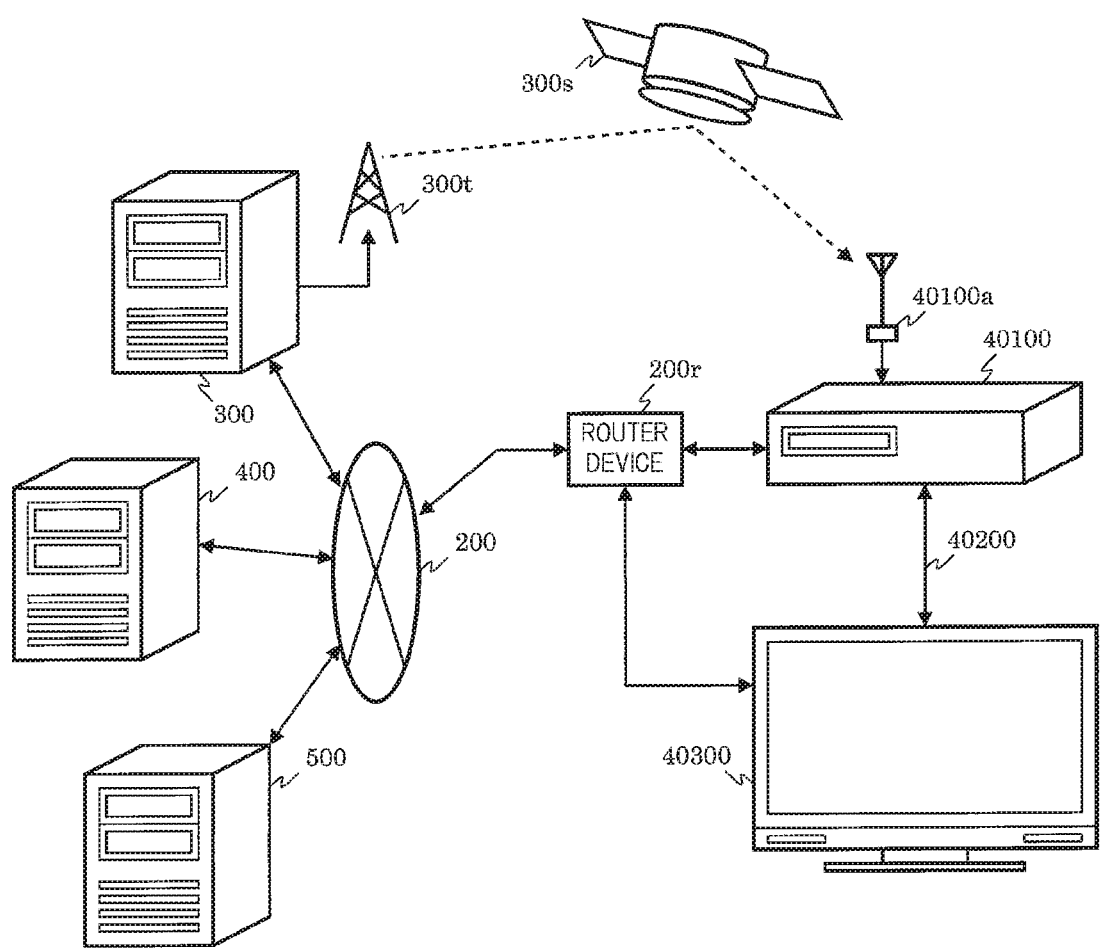
FIG. 28 is a system configuration diagram of a broadcast communication system according to a third embodiment.

FIG. 28 is a system configuration diagram showing an example of a broadcast communication system including a broadcast receiving apparatus according to the present embodiment. The broadcast communication system according to the present embodiment is configured by a broadcast receiving apparatus 40100, an antenna 40100*a*, a connection cable 40200, a monitor device 40300, a broadband network such as the Internet 200, a router device 200*r*, a radio tower 300*t* and a broadcast satellite (or communication satellite) 300*s* of a broadcast station, a broadcast station server 300, a service provider server 400, and other application server 500. Although it is not shown in the drawings, the broadcast communication system of the present embodiment may further include an access point 200*a*, a mobile phone communication server 600, a base station 600*b* for a mobile phone communication network, and a portable information terminal 700 by the similar connection in the system configuration diagram (see FIG. 1) of the broadcast communication system according to the first embodiment. Further, in such a case, the portable information terminal 700 may communicate directly with the broadcast receiving apparatus 40100 without passing through the router device 200*r* or the like.

The broadcast receiving apparatus 40100 receives broadcast waves transmitted from the radio tower 300*t* via the broadcast satellite (or communication satellite) 300*s* and the antenna 40100*a*. Alternatively, the broadcast receiving apparatus 40100 may receive the broadcast waves transmitted from the radio tower 300*t* directly from the antenna 40100*a* without passing through the broadcast satellite (or communication satellite) 300*s*. In addition, the broadcast receiving apparatus 40100 can be connected to the Internet 200 via the router device 200*r*, and thus can perform data transmission and reception through communication with each of server devices and other communication equipment on the Internet 200.

The connection cable 40200 is a communication cable that connects the broadcast receiving apparatus 40100 and the monitor device 40300, and coded video and audio data and the like outputted from the broadcast receiving apparatus 40100 are transmitted therethrough. The monitor device 40300 is a video display device that offers video information and audio information, which is acquired by subjecting the coded video and audio data and the like received through the connection cable 20200 to predetermined signal processing, to a user via a display device such as a liquid crystal panel and a speaker. Further, the monitor device 40300 is allowed to be connected to the Internet 200 via the router device 200*r*, and may be allowed to transmit and receive data by communication with each of the server devices and other communication equipment on the Internet 200. Further, the monitor device 40300 may be allowed to receive the broadcast waves transmitted from the radio tower 300*t* via an antenna 40300*a* (not shown).

[Hardware Configuration of Broadcast Receiving Apparatus]

FIG. 29A is a block diagram showing one example of an internal configuration of the broadcast receiving apparatus 40100. The broadcast receiving apparatus 40100 is configured by a main control unit 101, a system bus 102, a ROM 103, a RAM 104, a storage (accumulation) unit 110, a LAN communication unit 121, an extension interface unit 124, a digital interface unit 40125, a tuner/demodulating unit 131, a separating unit 132, a video decoder 141, a video color gamut conversion unit 142, an audio decoder 143, a caption decoder 144, a subtitle decoder 145, a subtitle synthesizing unit 146, a subtitle color gamut conversion unit 147, a data decoder 151, a cache unit 152, an application control unit 153, a browser unit 154, an application color gamut conversion unit 155, a sound source unit 156, a video synthesizing unit 161, a video output unit 163, an audio synthesizing unit 164, an audio output unit 166, an operation input unit 170, and a transcode processing unit 40181.

The broadcast receiving apparatus 40100 of the present embodiment is provided as an optical disc drive recorder such as a DVD recorder or a BD recorder, a magnetic disk drive recorder such as an HDD recorder, an STB, or the like. Namely, compared with the broadcast receiving apparatus 100 according to the first embodiment, the monitor unit 162 and the speaker unit 165 may be omitted in the broadcast receiving apparatus 40100.

The digital interface unit 40125 is an interface by which encoded digital video data and/or encoded digital audio data are outputted or inputted. The digital interface unit 40125 can output an MMT data string obtained by demodulation in the tuner/demodulating unit 131, an MMT data string obtained via the LAN communication unit 121, or mixed data of the respective MMT data strings as it is. Further, it may be controlled so that the MMT data string inputted from the digital interface unit 40125 is inputted into the separating unit 132. Output of digital contents stored in the storage (accumulation) unit 110 or storage of digital contents to the storage (accumulation) unit 110 may be executed via the digital interface unit 40125. Further, the digital interface unit 40125 may be a DVI terminal, an HDMI (registered trademark) terminal, a Display Port (registered trademark) terminal, or the like, and may be controlled so as to output video data, audio data and the like outputted from the video synthesizing unit 161 and the audio synthesizing unit 164 in a form compliant with DVI specifications, HDMI specifications, Display Port specifications and the like.

As a modification example of the hardware configuration, the function of the digital interface unit 40125 may be integrated into the LAN communication unit 121. In such a case, various processes of the digital interface unit 40125, which will be described in the following embodiment, are executed by the LAN communication unit 121. Further, the broadcast receiving apparatus 40100 executes the various processes for information obtained from a server on a network via the LAN communication unit 121, and then outputs digital data to external equipment connected to the network via the LAN communication unit 121.

The transcode processing unit 40181 is a signal processing unit that performs a transcode computation process of converting a coding method, a bit rate, a media transport method, and the like of each of the components making up the contents. For example, the transcode processing unit 40181 can convert an MMT data string of broadcasting program contents, which contain a video component in an MPEG-H HEVC format that are outputted from the separating unit 132, into an MPEG2-TS data string of program contents, which include a video component in an MPEFG-2 format or MPEG-4 AVC (Advanced Video Coding) format. Further, a process of changing only a bit rate without changing an encoding form of the component or the media transport method is possible. Note that the program contents subjected to the transcode computation process can be stored as recorded contents in the storage (accumulation) unit 110, or can be output and supplied from the digital interface unit 40125 or the like to an external monitor device or the like.

[Software Configuration of Broadcast Receiving Apparatus]

Figure 29B:
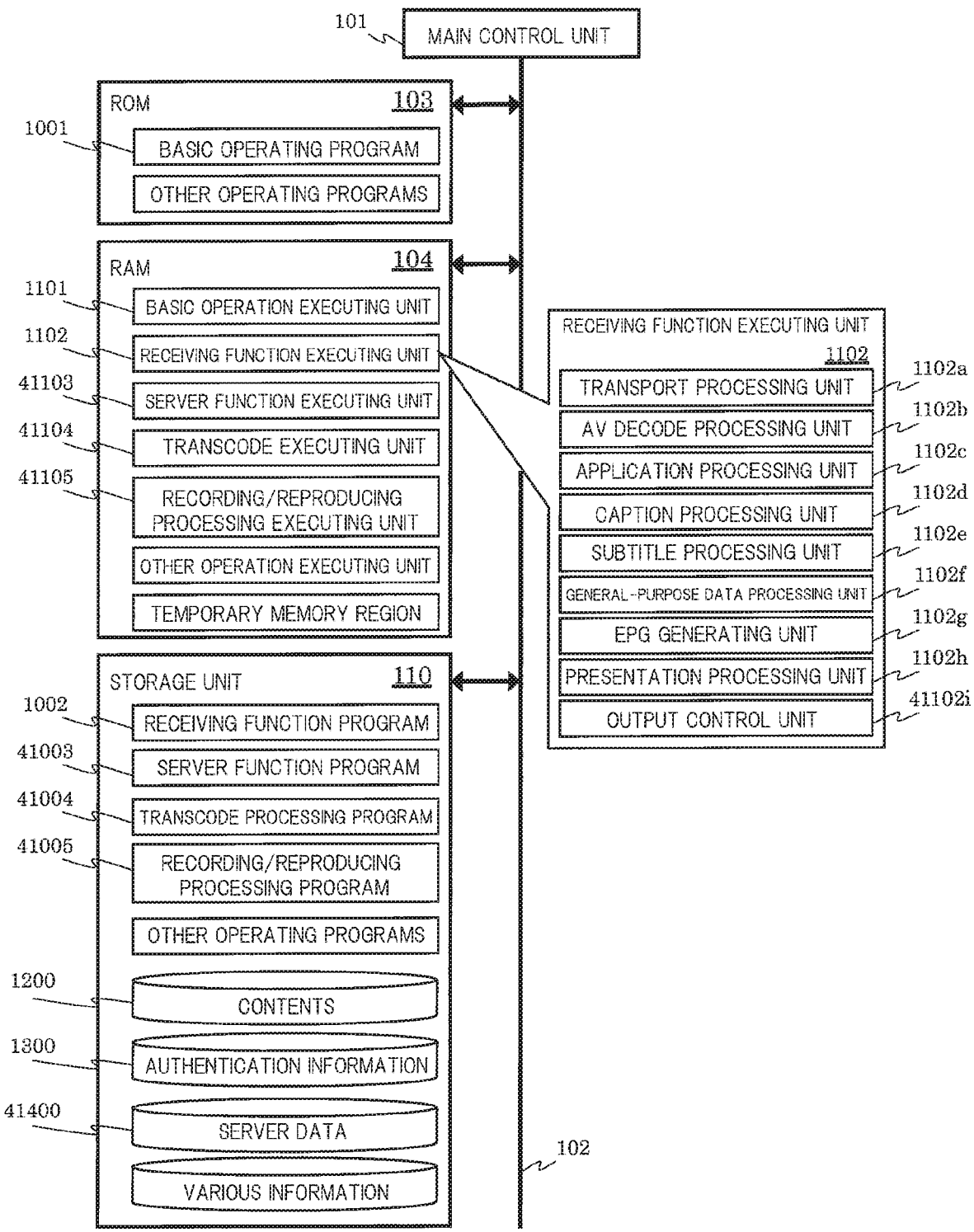
FIG. 29B is a software configuration diagram of the broadcast receiving apparatus according to the third embodiment.

FIG. 29B is a software configuration diagram of the broadcast receiving apparatus 40100 of the present embodiment, and shows respective software configurations of the ROM 103, the RAM 104, and the storage (accumulation) unit 110. Compared with the software configuration diagram of the broadcast receiving apparatus 100 according to the first embodiment (see FIG. 7D), a server function program 41003, a transcode processing program 41004, and a recording/reproducing processing program 41005 are added to the storage (accumulation) unit 110. Further, the storage (accumulation) unit 110 includes a server data memory region 41400 configured to store various data (applications, contents, other data, and the like) used for service that is to be provide to external equipment connected via the network. Note that the server data memory region 41400 may be shared with a contents memory region 1200.

Each of the server function program 41003, the transcode processing program 41004 and the recording/reproducing processing program 41005, which are stored in the storage (accumulation) unit 110, is loaded onto the RAM 104, and the main control unit 101 further executes the loaded server function program, the transcode processing program and the recording/reproducing processing program, whereby a server function executing unit 41103, a transcode executing unit 41104 and a recording/reproducing processing executing unit 41105 are respectively configured.

The server function executing unit 41103 executes management of various data stored in the server data memory region 41400 (applications, contents, other data, and the like), control of a process of distributing the various data in response to a request from the external equipment, an authentication process of the external equipment if necessary, and the like. Namely, by means of the server function executing unit 41103 and the server data memory region 41400, the broadcast receiving apparatus 40100 includes functions as a general server device. The transcode executing unit 41104 mainly controls a transcode computation process in the transcode processing unit 40181. The recording/reproducing processing executing unit 41105 mainly controls a recording process into the contents memory region 1200 of contents of a broadcasting program and a reproducing process of recorded contents from the contents memory region 1200.

Further, a receiving function executing unit 1102 loaded onto the RAM 104 further includes an output control unit 41102$i$. The output control unit 41102$i$ of the receiving function executing unit 1102 executes control of each process related to data output from each of the video output unit 163, the audio output unit 166, and the digital interface unit 40125.

In the following explanation, a process example to record received contents and then to reproduce and output them will be described. However, the outputted contents or control information regarding the contents may be changed or rewritten from the time when the contents are received. The changing or rewriting process may be executed at the time of receiving the contents, at the time of recording the contents, at the time of reproducing the contents, or at the time of outputting the contents. In a case where the contents or the control information regarding the contents is to be change or rewritten when to receive the contents, the transcode executing unit 41104 may execute the process. In a case where the contents or the control information regarding the contents is to be changed or rewritten when to record or reproduce the contents, the transcode executing unit 41104 or the recording/reproducing processing executing unit 41105 may execute the process. In a case where the contents or the control information regarding the contents is to be changed or rewritten when to output the contents, the transcode executing unit 41104 or the output control unit 41102$i$ may execute the process.

Note that the software configuration shown in FIG. 29B is merely described by means of example. In the present embodiment, the software configuration may not be provided with all of the programs and executing units shown in FIG. 29B.

[Interface Configuration between Broadcast Receiving Apparatus and Monitor Device]

Figure 30:
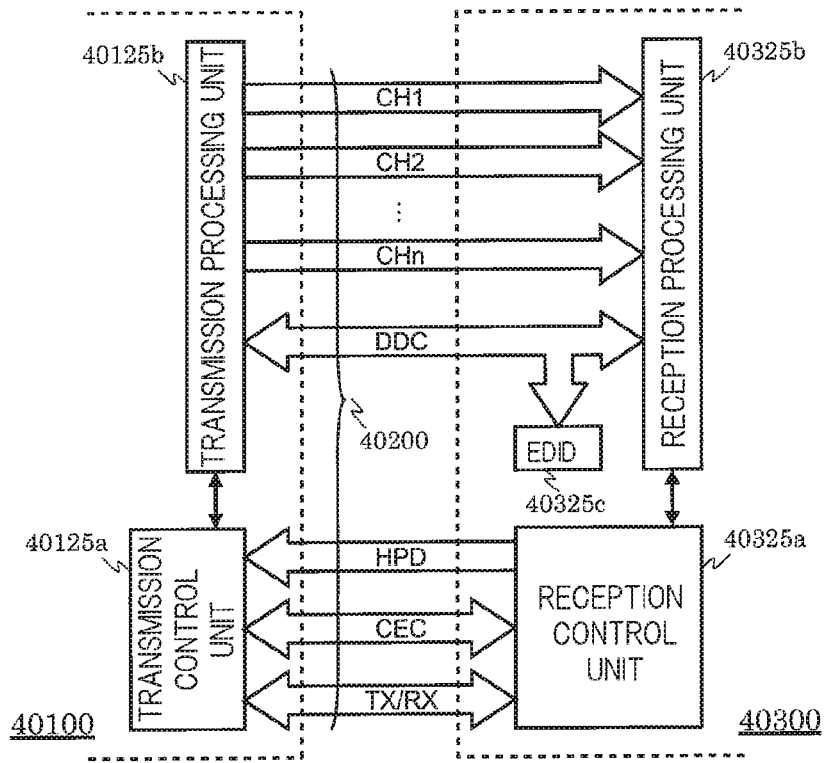
FIG. 30 is an interface configuration diagram between the broadcast receiving apparatus and a monitor device according to the third embodiment.

FIG. 30 is an interface configuration diagram showing one example of an interface configuration between the broadcast receiving apparatus 40100 and the monitor device 40300. In the present embodiment, the case where a connecting terminal (not shown) of the digital interface unit 40125 at the broadcast receiving apparatus 40100 side is connected to a connecting terminal (not shown) of the digital interface unit at the monitor device 40300 side via the connection cable 40200 will be described. Note that the monitor device 40300 may have the similar configuration of the broadcast receiving apparatus 100 shown in FIG. 7A. In this case, a digital interface unit 125 corresponds to the digital interface unit at the monitor device 40300 side described above, and the connection cable 40200 is connected to the connecting terminal.

As shown in FIG. 30, the connection cable 40200 is made up of n pairs of differential transmission lanes CH1 to CHn, a DDC (Display Data Channel) line standardized by the VESA (Video Electronics Standard Association), an HPD (Hot Plug Detect) line, a CEC (Consumer Electronics Control) line, a communication line (TX/RX line in FIG. 30), and the like. Note that the differential transmission lane may be referred to as a differential transmission line.

The n pairs of differential transmission lanes may be one pair of clock lanes and (n−1) pairs of data lanes. For example, in a case where the n is 4, they may be one pair of clock lanes and three pairs of data lanes. In a case where the n is 2, they may be one pair of clock lanes and one pair of data lanes. Further, all of the n pairs of differential transmission lanes may be data lanes for transmitting data onto which the clock is superimposed. For example, in a case where the n is 4, they may be four pairs of data lanes. Note that the clock lane and the data lane may respectively be referred to as a clock line and a data line.

A digital video (R/G/B/Vsync/Hsync, Y/Pb(Cb)/Pr(Cr), and the like)/audio signal, other control signals, and the like may be outputted to the data lane in a predetermined format from the video synthesizing unit 161 or the audio synthesizing unit 164 via a transmission processing unit 40125b of the digital interface unit 40125 at the broadcast receiving apparatus 40100 side. The predetermined format may be compliant with the specifications such as an HDMI (registered trademark), and detailed description will be omitted. The digital video/audio signal, the other control signal, and the like are received by a reception processing unit 40325b of the digital interface unit at the monitor device 40300 side; necessary processes such as image quality adjustment and volume adjustment are appropriately performed by a video processing unit and an audio processing unit (not shown); and they are outputted from a display unit and a speaker of the monitor device 40300.

The communication line may be made up of one transmitting line and one receiving line, or two transmitting lines and two receiving lines. Alternatively, the communication line may be made up of any of one sending/receiving line, two sending/receiving lines, or four sending/receiving lines. The one transmitting line and one receiving line and the two transmitting lines and two receiving lines may be one pair of transmitting lines and one pair of receiving lines, and two pairs of transmitting lines and two pairs of receiving lines that execute transmission and reception of data by the differential transmission, respectively. Further, the one sending/receiving line, the two sending/receiving lines, and four sending/receiving lines may be one pair of transmitting/receiving lines, two pairs of transmitting/receiving lines, and four pairs of transmitting/receiving lines that execute transmission and reception of data by the differential transmission, respectively. Note that, in the present embodiment, the "transmission" and "reception" respectively correspond to "transmission" and "reception" when viewed from the broadcast receiving apparatus 40100 side.

The communication line has the similar performance and function to those of a LAN cable connected to the LAN communication unit 121. Further, each of a transmission control unit 40125a of the digital interface unit 40125 at the broadcast receiving apparatus 40100 side and a reception control unit 40325a of the digital interface unit at the monitor device 40300 side has the similar network communication function to that of the LAN communication unit 121. Namely, the communication line of the connection cable 40200 can be regarded as a narrow-area network in which the broadcast receiving apparatus 40100 and the monitor device 40300 are connected.

Further, although it is not shown in the drawings, the connection cable 40200 may further include a power source line, a GND line, and a spare line. The n pairs of differential transmission lanes, the communication line and the like may be shielded by the GND line. All or a part of the spare line, a DDC line, an HPD line and a CEC line may be shared as a part of the communication line. For example, the spare line and the HPD line may constitute one transmitting line and one receiving line of the communication line or one pair of transmitting/receiving lines. The CEC line or the like may be omitted. The DDC line may be used as an I2C (I-squared-C) communication line between the main control unit 101 of the broadcast receiving apparatus 40100 and a main control unit (not shown) of the monitor device 40300.

The transmission processing unit 40125b of the digital interface unit 40125 at the broadcast receiving apparatus 40100 side can communicate with the reception processing unit 40325b of the digital interface unit at the monitor device 40300 side via the DDC line, and further read out EDID (Extended Display Identification Data) from an EDID storage unit 40325c. Namely, the broadcast receiving apparatus 40100 can grasp display performance of the monitor device 40300 by obtaining the EDID. Note that in the present embodiment, the display performance is items such as input resolution and a frame rate that the monitor device 40300 can execute, a video standard, whether compatible with 3D video display or not, and whether compatible with the network communication via the communication line or not. Further, in the present embodiment, a process of obtaining the EDID as means for grasping the display performance of the monitor device 40300 by the broadcast receiving apparatus 40100 will be described below as an example. However, the information to be obtained is not limited to the EDID. For example, information different from the EDID, such as performance identification information for identifying the display performance and the function of the monitor device 40300 may be obtained. Further, the display performance of the monitor device 40300 may be grasped by means other than the means for obtaining the performance identification information.

Further, the transmission control unit 40125a of the digital interface unit 40125 at the broadcast receiving apparatus 40100 side can control the transmission processing unit 40125b, and detect whether the monitor device 40300 is connected or not, whether a power source for the monitor device 40300 is turned on or not, and the like via the HPD line. Further, the transmission control unit 40125a of the digital interface unit 40125 at the broadcast receiving apparatus 40100 side can execute a process of turning the power source of the monitor device 40300 on via the CEC line. Further, the reception control unit 40325a of the digital interface unit at the monitor device 40300 side controls the reception processing unit 40325b.

Further, the differential transmission lane may be referred to as a unidirectional transmission signal line by which data are transmitted in only a single direction from the broadcast receiving apparatus 40100 side to the monitor device 40300 side. Similarly, each of the DDC line, the CEC line, and the communication line may be referred to as a bidirectional transmission signal line by which data can be transmitted from the broadcast receiving apparatus 40100 side to the monitor device 40300 side and data can be transmitted from the monitor device 40300 side to the broadcast receiving apparatus 40100 side.

Note that each of the configuration of the connection cable 40200, the internal configuration of the digital interface unit 40125 of the broadcast receiving apparatus 40100, and the internal configuration of the digital interface unit of the monitor device 40300, which are shown in FIG. 30, is only one example, and it may have a different configuration.

Further, the digital interface between the broadcast receiving apparatus 40100 and the monitor device 40300 as described above has been explained as the example of a wired interface using the connection cable 40200. However, it may be configured as a wireless interface.

[Recording Process of Program]

Figure 31:
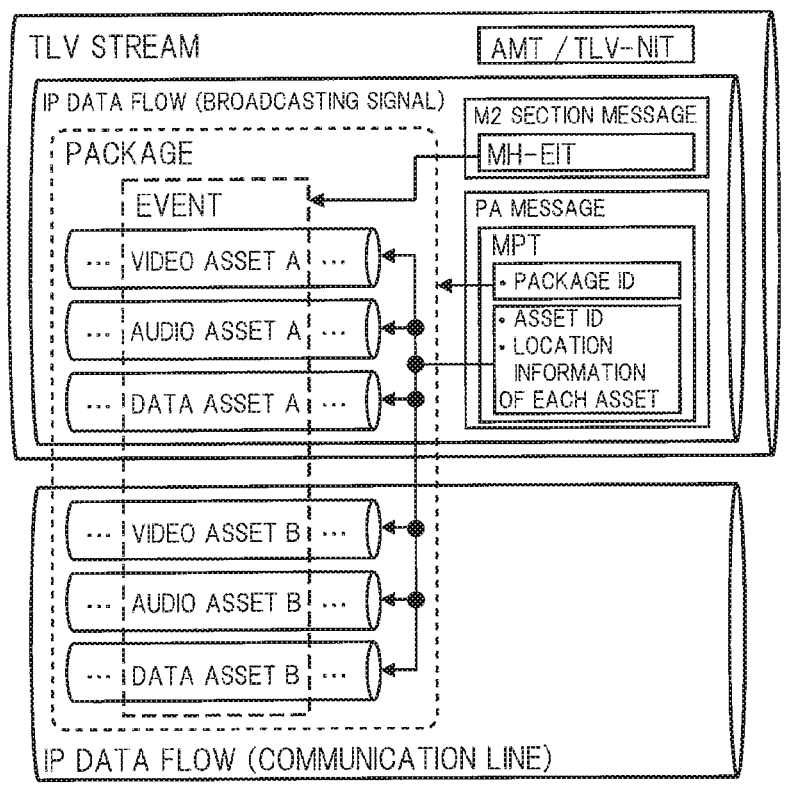
FIG. 31 is an explanatory diagram of a package configuration of a broadcasting service.

In the MMT that is the broadcasting system according to the present embodiment, each asset constituting a package can be transmitted via a plurality of routes. For example, as shown in FIG. 31, a video asset A, an audio asset A and a data asset A can be transmitted by an IP data flow that is transmitted via a broadcast transmission path, and a video asset B, an audio asset B and a data asset B can be transmitted by an IP data flow that is distributed via a communication line. Each of the IP data flows may further contain other assets such as a subtitle asset and a caption asset.

Further, the package is a series of a plurality of events, and each of the events corresponds to a so-called "program". For each program, a starting time, a broadcast time and the like are defined by the MH-EIT shown in FIG. 21. Further, an asset configuration of each program may be a program in the same package, or may be different from each other. For example, a certain program may be constituted by only a video asset A and an audio asset A, and the other program may be constituted by the video asset A, the audio asset A, the audio asset B and the data asset B.

The broadcast receiving apparatus 40100 according to the present embodiment can record a program that has no copy control information for "copy inhibit" (see [Copy Right Protection Function] in the first embodiment) in an external recording medium connected to the storage (accumulation) unit 110 or the extension interface unit 124. The above process of recording the program to the storage (accumulation) unit 110 or the external recording medium (hereinafter, collectively referred to as a "storage") may be referred to as a recording process. Note that even a program that has the copy control information for "copy inhibit" can be copied exceptionally in a case where temporary accumulation available is specified to the program by other control information or the like.

In the recording process, the similar control to the channel selection process that has been described using FIG. 16 may basically be executed, and each asset obtained in the process of S216 may be associated with program information, by which a program that is a target of the recording process can be identified, on the basis of the control of the recording/reproducing processing executing unit 41105, and they may be recorded in the storage. Further, each piece of control information by the MMT-SI is also recorded to the storage so as to be associated with the program information appropriately. Each of the assets may be obtained, on the basis of the description of the MPT obtained in the process of S210 or the process of S215, from the IP data flow included in a TLV stream transmitted via the broadcast transmission path or the IP data flow distributed via the communication line. The process of obtaining each of the assets from the IP data flow included in the TIN stream transmitted via the broadcast transmission path and recording it to the storage and the process of obtaining each of the assets from the IP data flow distributed via the communication line and recording it to the storage may be executed at the same timing, or at different timing.

Further, the recording process of each of the obtained assets to the storage may be executed in asset units, may be executed in IP data flow units, or may be executed in package units. In any case, association with the program information may be executed and managed on the storage. The recording/reproducing processing executing unit 41105 may create management information for the management and record it in the contents memory region 1200 or various information storage regions of the storage (accumulation) unit 110 so as to execute the managing process.

<Settings of Recording Process of Program>

Each asset included in the IP data flow transmitted via the broadcast transmission path (hereinafter, referred to as an "asset via broadcast transmission path") of assets constituting a program can be obtained while broadcasting the program. On the other hand, each asset included in the IP data flow distributed via the communication line (hereinafter, referred to as an "asset via communication line") of the assets constituting the program may be obtained at timing other than the timing while broadcasting the program. This is because the asset via communication line is data that are stored by the broadcast station server 300 or the service provider server 400 (hereinafter, collectively referred to as a "server device") and distributed. Therefore, there is a possibility that the broadcast receiving apparatus 40100 can obtain the asset via communication line at arbitrary timing by accessing the server device via the Internet 200 unless the asset via communication line is deleted from the server device.

Further, it is desirable that, when to view the program on real time, the asset via broadcast transmission path and the asset via communication line are simultaneously obtained regardless of presence or absence of a recording process of the program while broadcasting the program. However, in a case where only the recording process of the program is executed and simultaneous viewing thereof is not executed, a process of obtaining the asset via broadcast transmission path and recording it to the storage is executed while broadcasting the program, but a process of obtaining the asset via communication line and recording it to the storage may not be executed while broadcasting the program. Namely, when to execute the recording process of the program, the process of obtaining the asset via communication line and recording it to the storage can be executed so as to shift timing thereof from timing while broadcasting the program. For example, when to execute the recording process of the program, only the process of obtaining the asset via broadcast transmission path and recording it to the storage is executed, but the process of obtaining the asset via communication line and recording it to the storage is not executed. Moreover, it may be controlled so as to newly obtain the asset via communication line when to execute a reproducing process of the program for which the recording process has been executed.

In order to execute the control described above, the broadcast receiving apparatus 40100 according to the present embodiment can select whether the asset via communication line regarding the program that is the target of the recording process is to be recorded to the storage or not by means of setting when to execute the recording process of the program. Namely, in a case where the user selects to record the asset via communication line to the storage in the setting for the recording process of the program, the broadcast receiving apparatus 40100 obtains both the asset via broadcast transmission path and the asset via communication line when to execute the recording process of the program, and records them to the storage. Note that it is not always necessary to execute the recording processes at the same time. On the other hand, in a case where the user selects not to record the asset via communication line to the storage in the setting of the recording process of the program, the broadcast receiving apparatus 40100 obtains only the asset via broadcast transmission path and records it to the storage when to execute the recording process of the program.

Note that, as the setting described above of whether to execute the recording process of the asset via communication line to the storage when to execute the recording process of the program, the setting may be executed for each program that is the target of the recording process, or the same setting may be used for all of the programs each of which is the target of the recording process. For example, an item for carrying out the selection may be prepared on a timer recording setting screen, or a message for encouraging the user to carry out the selection may be displayed in response to pushing of a "record" key of a remote controller or the like. By configuring it in this manner, it is possible to execute the setting for each program that is the target of the recording process. Further, for example, a set value regarding the selection set by means of a menu operation or the like may be stored in the ROM 103 or the storage (accumulation) unit 110, and control may be executed on the basis of the stored set value when to execute the recording process of the program. By configuring it in this manner, it is possible to use the same setting for all of the programs each of which is the target of the recording process.

Figure 32A:
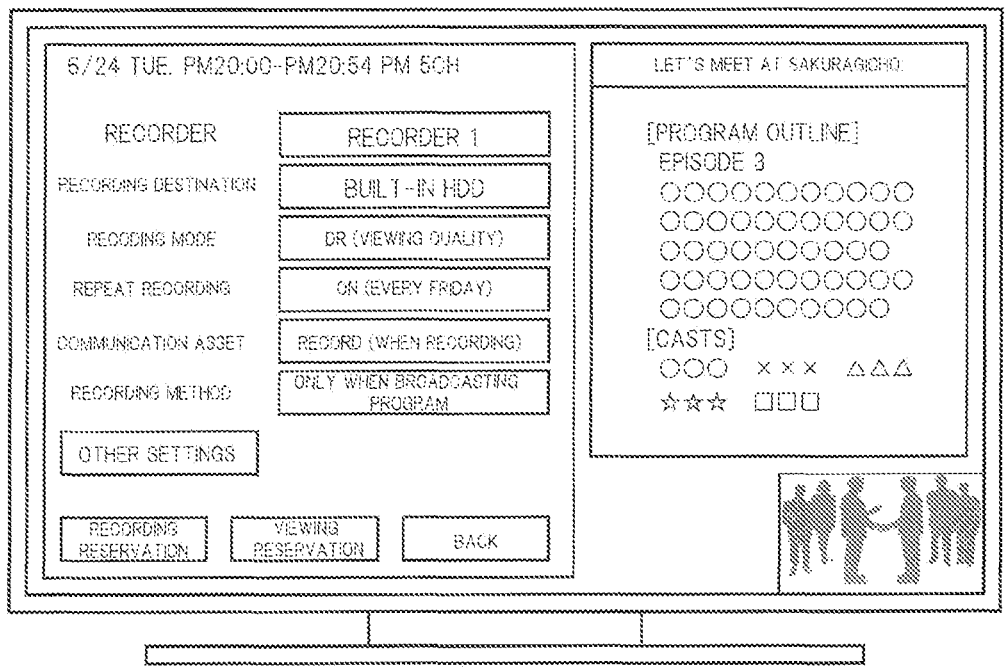
FIG. 32A is a screen display diagram for explaining a timer recording setting screen of the broadcast receiving apparatus according to the third embodiment.
Figure 32B:
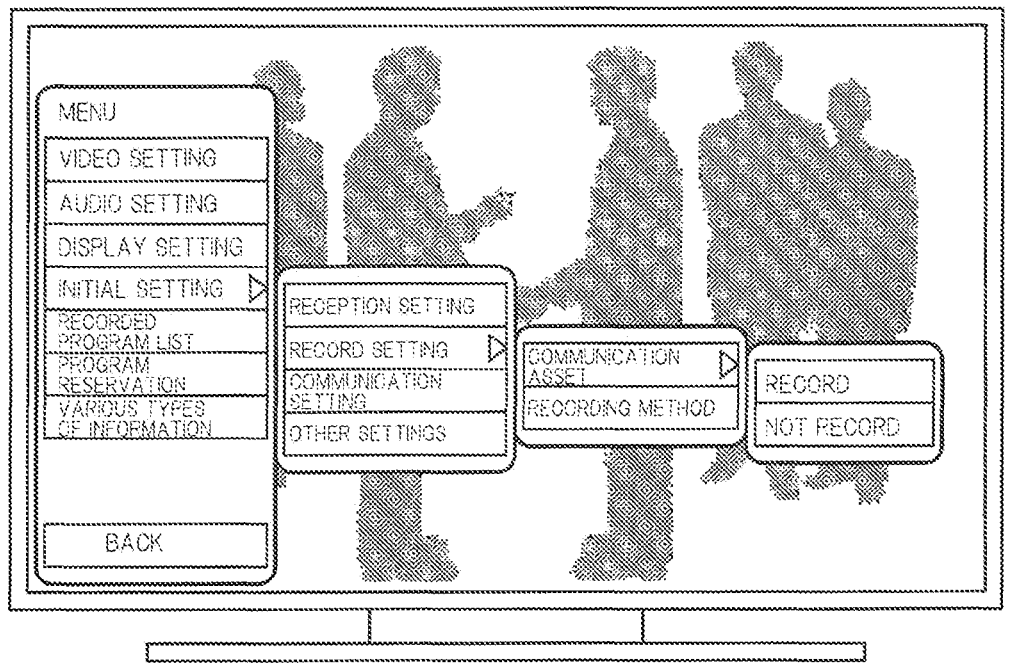
FIG. 32B is a screen display diagram for explaining a menu configuration of the broadcast receiving apparatus according to the third embodiment.

FIG. 32A is a screen display diagram showing one example of the timer recording setting screen in the broadcast receiving apparatus 40100 according to the present embodiment. In a case where "record" is selected among items for "communication asset" in FIG. 32A, a recording process of the asset via communication line to the storage is executed when to execute the recording process of the program. Further, in a case where "not record" is selected among the items, the recording process of the asset via communication line to the storage is not executed when to execute the recording process of the program. Moreover, in a case where "record" is selected among the items, items for "recording method" become effective. In a case where "only when broadcasting program" is selected among items for "recording method", the recording process of the asset via communication line to the storage is executed only at timing while broadcasting the program that is a recording target. In a case where "possible other than when broadcasting program" is selected among the items, the recording process of the asset via communication line to the storage may be executed at timing other than the timing while broadcasting the program that is the recording target, or may be executed at timing while broadcasting the program. In a case where the setting is executed by the menu operation or the like, a menu configuration as shown in FIG. 32B may be used. Note that the name of each of the items and the menu configuration are merely one example and they may be a different name and a different menu configuration.

<Recording Process of Asset via Communication Line>

Next, a process of obtaining an asset via communication line and recording it in the storage when the user selects to execute a recording process of the asset via communication line in the storage in the settings for the recording process of a program will be described.

As shown in one example of the data structure of the MH-EIT in FIG. 21, each program in the broadcasting system according to the present embodiment can be identified uniquely by each parameter such as "original_network_id", "tlv_stream_id", "service_id", or "event_id". Further, by referring to an AMT and a TLV-NIT in each of the parameters, it is possible to obtain the information regarding the TLV stream that includes the asset via broadcast transmission path constituting a package of each of the programs. Moreover, by referring to a PLT or MPT included in the TLV stream, it is possible to obtain the information regarding the IP data flow that includes the asset via communication line constituting a package of each of the programs. Namely, on the basis of each piece of the obtained information, the broadcast receiving apparatus 40100 according to the present embodiment can obtain the asset via broadcast transmission path from the IP data flow transmitted via the TLV stream, and can obtain the asset via communication line by accessing the server device that is a source of the IP data flow for distributing the asset via communication line.

Timing when the broadcast receiving apparatus 40100 according to the present embodiment can execute the process of obtaining the asset via broadcast transmission path and recording it to the storage is limited to a time while broadcasting the program that is the target of the recording process. However, as timing when the broadcast receiving apparatus 40100 can execute the process of obtaining the asset via communication line from the server device and recording it to the storage, there are three types of timing that include (A-1) before starting to broadcast the program that is the target of the recording process, (A-2) while broadcasting the program that is the target of the recording process, and (A-3) after the end of broadcasting the program that is the target of the recording process. However, only in the case of executing the recording process by timer recording, it is possible to execute the process of obtaining the asset via communication line from the server device and recording it to the storage at the timing (A-1) basically. On the other hand, it is possible to execute the process of obtaining the asset via communication line from the server device and recording it to the storage at the timing (A-2) and (A-3) even in the case of the recording process by timer recording and in the case of a recording process that is executed by instructing recording a program while viewing in progress (hereinafter, referred to as normal recording).

Hereinafter, the process of recording the asset via communication line to the storage that is executed at each timing of the (A-1), (A-2), and (A-3) will be described.

<A-1: Recording Process of Asset via Communication Line Before Starting to Broadcast Program>

In the case of the recording process by timer recording, a program that is a target of the recording process has already been selected before starting to broadcast the program. Namely, in the broadcast receiving apparatus 40100, each parameter such as "original_network_id", "tlv_stream_id", "service_id", and "event_id" of the program that is the target of the recording process is known. Therefore, in a case where the broadcast receiving apparatus 40100 can obtain a source address and the like of the server device to which the asset via communication line of the program that is the target of the recording process is to be stored by referring to the AMT and the TLV-NIT, or the PLT and the MPT on the basis of each of the parameters, the broadcast receiving apparatus 40100 may access the server device on the basis of the source address.

On the other hand, in a case where the source address and the like of the server device to which the asset via communication line of the program that is the target of the recording process is to be stored cannot be obtained because it is before starting to broadcast the program that is the target of the recording process, the broadcast receiving apparatus 40100 may obtain, as the alternative, a source address and the like of a server device to which an asset via communication line of a program, which has the same parameters as the program that is the target of the recording process, such as "original_network_id", "service_id", and a different "event_id" from that of the program that is the target of the recording process, is to be stored. Moreover, the broadcast receiving apparatus 40100 accesses the server device on the basis of the source address obtained as the alternative. Namely, this is because it is thought to be likely that the asset via communication line is stored in the same server device in a case where each of the parameters such as "original- _network_id" and "service_id" is the same as each other even though the parameter "event_id" is different from each other.

In a case where the asset via communication line of the program that is the target of the recording process can be obtained on the basis of the "event_id" parameter after accessing the server device even in any case described above, it is controlled so as to obtain the asset via communication line and record it to the storage. On the other hand, in a case where the asset via communication line of the program that is the target of the recording process cannot be obtained, it is determined that the process of obtaining the asset via communication line of the program that is the target of the recording process and recording it to the storage is impossible before starting to broadcast the program. In this case, process timing of the process of obtaining the asset via communication line of the program that is the target of the recording process and recording it to the storage may be changed so as to execute the process while broadcasting the program that is the target of the recording process.

Further, an application control code related to a program that is scheduled to be broadcast on a currently selected channel may be specified by "PREFETCH (obtain and retain)" or the like on an MH-AIT contained in the MMT-SI. In this case, even in a case where the recording process of the program by timer recording is not executed, it may be controlled so as to execute, as an exceptional process, the process of obtaining the asset via communication line of the program and recording it to the storage before starting to broadcast the program. Note that it may be controlled so that the asset via communication line that has been obtained and recorded to the storage by the control described above may be deleted as it is in a case where both the recording process of the program by timer recording and the recording process by normal recording are not executed consequently after the end of broadcasting the program. FIG. 33A shows one example of the data structure of the MH-AIT. A "application_control_code" parameter in FIG. 33A corresponds to the application control code.

Further, as described above, in a case where the application control code regarding the program that is scheduled to be broadcast on the currently selected channel is specified by "PREFETCH (obtain and retain)" or the like, the process of obtaining the asset via communication line of the program and recording it to the storage may be executed before starting to broadcast the program even when the copy control information of the program is specified by "copy inhibit". However, in this case, the process of recording it to the storage is a temporary process, and it is controlled so as to always delete or invalidate it after the end of broadcasting the program.

<A-2: Recording Process of Asset via Communication Line while Broadcasting Program>

With the process of obtaining the asset via communication line of the program that is the target of the recording process and recording it to the storage while broadcasting the program, the recording process by timer recording is similar to the recording process by normal recording. Namely, in a case where the source address and the like of the server device to which the asset via communication line of the program that is the target of the recording process is to be stored can be obtained by referring to the AMT and the TLV-NIT, or the PLT and the MPT on the basis of each of the parameters such as "original_network_id", "tlv_stream_id", "service_id", and "event_id" of the program that is the target of the recording process, the server device is accessed on the basis of the source address. Moreover, the asset via communication line of the program that is the target of the recording process, which is obtained from the server device, may be recorded to the storage. Alternatively, the asset via communication line of the program that is the target of the recording process, which is transmitted from the server device in a push type, may be selected and obtained on the basis of a transmission destination address and the like, and recorded to the storage.

Note that, in a case where it is determined that it is impossible to obtain the asset via communication line of the program that is the target of the recording process while broadcasting the program that is the target of the recording process due to lack of processing power based on a multi-tasking status of the broadcast receiving apparatus 40100 or lack of temporary communication performance based on network conditions, process timing of the process of obtaining the asset via communication line of the program that is the target of the recording process and recording it to the storage may be changed so as to execute the process after the end of broadcasting the program that is the target of the recording process.

Further, if the processing power of the broadcast receiving apparatus 40100 and the network conditions allows it, it may be controlled so that the asset via communication line of a program while viewing, for which the recording process is not executed, is obtained as the exceptional process prior to progress of the program, and is temporarily recorded to the storage. In this case, it may be controlled so as to delete the asset via communication line recorded to the storage after the end of broadcasting the program. In particular, in a case where the copy control information of the viewing program is specified by "copy inhibit", it is controlled so that a process of deleting the asset via communication line is always executed after the end of broadcasting the program.

<A-3: Recording Process of Asset via Communication Line after End of Broadcasting Program>

It is expected that obtaining of the asset via communication line becomes difficult while broadcasting the program that is the target of the recording process because access to the server device in which the asset via communication line of the program that is the target of the recording process is stored is concentrated. In order to avoid the situation described above, the broadcasting system according to the present embodiment allows control based on an MH-probability-applied delay descriptor. However, even though the control is executed by referring to the descriptor, a possibility that obtaining of the asset via communication line of the program that is the target of the recording process becomes difficult cannot be denied.

On the other hand, it is thought to be likely that the program that is the target of the recording process is not viewed while broadcasting the program and immediately after broadcasting it in the case of timer recording. Further, even in the case of normal recording, it is thought that simultaneous viewing of the program, for which a recording instruction is carried out, is not carried out in the case of selecting other channel after the recording instruction was carried out and viewing a program different from the program for which the recording instruction was carried out. In these cases, the broadcast receiving apparatus 40100 according to the present embodiment can control so as not to execute the process of obtaining the asset via communication line of the program that is the target of the recording process and recording it to the storage intentionally while broadcasting the program, and to execute it at predetermined timing after the end of broadcasting the program. Note that the predetermined timing may be timing when a predetermined time elapses after the end of broadcasting the program that is the target of the recording process, or a predetermined time defined in advance. Alternatively, the predetermined timing may be timing based on an instruction of the user made separately. It may be other arbitrary timing.

As described above, the process of obtaining the asset via communication line of the program that is the target of the recording process and recording it to the storage can be executed at timing after the end of broadcasting the program. This is limited to the case where the asset via communication line of the program that is the target of the recording process is not deleted on the server device even after the end of broadcasting the program. Therefore, the broadcast receiving apparatus 40100 according to the present embodiment first controls so as to: confirm information regarding a time limit until which the asset via communication line of the program that is a target of the recording process can be obtained from the server device (an obtainable time limit) while broadcasting the program that is the target of the recording process; and determine whether the process of obtaining the asset via communication line and recording it to the storage is executed at timing after the end of broadcasting the program or not in accordance with its result.

FIG. 33B shows a list of parameters and descriptors that are included in the MH-AIT of the broadcasting system according to the present embodiment. An MH-application expiration date descriptor in FIG. 33B is information regarding a time limit until which the asset via communication line of each program can be obtained from the server device. The name of the descriptor is one example, and it may be a different name. Further, the information may be specified by a parameter regardless of the descriptor.

In a case where it is confirmed that the process of obtaining of the asset via communication line and recording it to the storage can be executed at timing after the end of broadcasting of the program by referring to the MH-application expiration date descriptor, an MH-simplified application location descriptor is temporarily cached. Moreover, the server device is accessed at predetermined timing after the end of broadcasting of the broadcast that is the recording target on the basis of description of the MH-simplified application location descriptor, the process of obtaining the asset via communication line of the program and recording it to the storage is executed. The server device may be accessed on the basis of the information obtained by referring to the AMT and the TLV-NIT, or the PLT and the MPT on the basis of each of the parameters such as "original_network_id", "tlv_stream_id", "service_id", as "event_id" as described above. On the other hand, it is confirmed that the process of obtaining of the asset via communication line and recording it to the storage cannot be executed at the timing after the end of broadcasting of the program, change control of process timing may be executed so that the asset via communication line of the program is obtained during the broadcasting of the program that is the recording target and is recorded to the storage.

Further, the exceptional process in the obtaining process after the end of broadcasting the program of the asset via communication line will be described below.

For example, in setting of a recording process of a program, the recording process by timer recording or the recording process by normal recording is executed after the user selects not to record the asset via communication line to the storage. Then, in the broadcast receiving apparatus 40100 according to the present embodiment, only a process of obtaining the asset via broadcast transmission path of the program that is the target of the recording process and recording it to the storage is executed, but a process of obtaining the asset via communication line of the program and recording it to the storage is not executed. When the user instructs the broadcast receiving apparatus 40100 to reproduce a recorded program in the situation, the broadcast receiving apparatus 40100 reads out the asset via broadcast transmission path of the recorded program from the storage, and newly obtains the asset via communication line of the recorded program from the server device.

On the other hand, in a case where the time limit until which the asset via communication line of the recorded program can be obtained from the server is specified to the asset via communication line, inconvenience may occur that the broadcast receiving apparatus 40100 cannot obtain the asset via communication line of the recorded program from the server device even though the user instructs the broadcast receiving apparatus 40100 to reproduce the recorded program after the time limit elapses. In order to solve the inconvenience, the broadcast receiving apparatus 40100 according to the present embodiment has a function to appropriately obtain the asset via communication line of the recorded program from the server device regardless of an instruction of the user when it approaches the time limit until which the asset via communication line of the recorded program can be obtained from the server.

Specifically, it refers to the content of the MH-application expiration date descriptor associated with each of the recorded programs that are recorded to the storage every predetermined time interval. Moreover, in a case where the time limit until which the asset via communication line of each of the recorded programs can be obtained from the server device is within a given period, it may be controlled so as to access the server device to obtain the asset via communication line of each of the recorded programs, and to add it to the storage. Note that the predetermined time interval may be every 24 hours, every 12 hours, every 6 hours, or the like, for example. Further, the word "within a given period" may mean within 72 hours, within 48 hours, within 24 hours, or the like.

By executing the process described above, in the setting of the recording process of the program, the recording process is executed after the user selects not to record the asset via communication line to the storage. Moreover, even in a case where the time limit until which the asset via communication line of the recorded program can be obtained from the server is specified and the time limit expired, the broadcast receiving apparatus 40100 can read out both the asset via broadcast transmission path and the asset via communication line of the recorded program from the storage by instructing the broadcast receiving apparatus 40100 to reproduce the recorded program by the user. Namely, contents can be reproduced with high quality by using both the asset via broadcast transmission path and the asset via communication line.

Note that it is effective to provide description of information regarding the time limit until which the asset via communication line can be obtained in the MH-EIT in particular when the recording process of the asset via communication line of the broadcasting program that is the recording target among the recording processes described in above (A-1) to (A-3) is executed at timing other than timing during a broadcast time of the broadcasting program that is the recording target. For example, as the information regarding the time limit until which the asset via communication line can be obtained, both or one of "a starting date of a period during which the asset via communication line can be obtained" and "an ending date of the period during which the asset via communication line can be obtained" may be described in the MH-EIT in a form of the parameter or descriptor for each event (or program). By configuring it in this manner, it is possible to easily grasp whether the asset via communication line of the broadcasting program that is the recording target can be obtained before starting to broadcast the broadcasting program that is the recording target or not even when to execute the process of (A-1) described above, for example, by referring to the MH-EIT. Similarly, in the process of (A-2) or the process of (A-3) described above, it is also possible to easily grasp whether the asset via communication line of the broadcasting program that is the recording target can be obtained after the end of broadcasting the broadcasting program that is the recording target or not by referring to the MH-EIT.

Further, in a case where there is information regarding the time limit until which the asset via communication line can be obtained in the MH-EIT, the information may be displayed when to display the EPG. For example, in a case where the mark 162a4 standing for "Network" is displayed in the title region 162a2 of the detailed information 162a1 shown in FIG. 22A and this program has information regarding the time limit until which the asset via communication line can be obtained, a mark (not shown) standing for "Expiration" indicating that a time limit is specified to obtain the asset via communication line from the server device may further be displayed in the title region 162a2. Further, the information regarding the time limit until which the asset via communication line can be obtained ("a starting date of a period during which the asset via communication line can be obtained", "an ending date of the period during which the asset via communication line can be obtained", and the like) may be displayed in the detail description region 162a3 as characters.

By describing the information regarding the time limit until which the asset via communication line can be obtained in the MH-EIT in this manner, it becomes possible to effectively execute the recording process in the broadcast receiving apparatus 40100 according to the present embodiment. Further, in the display of the EPG, the user can easily grasp the information regarding the time limit until which the asset via communication line can be obtained.

[Display of List of Recorded Programs]

Figure 34:
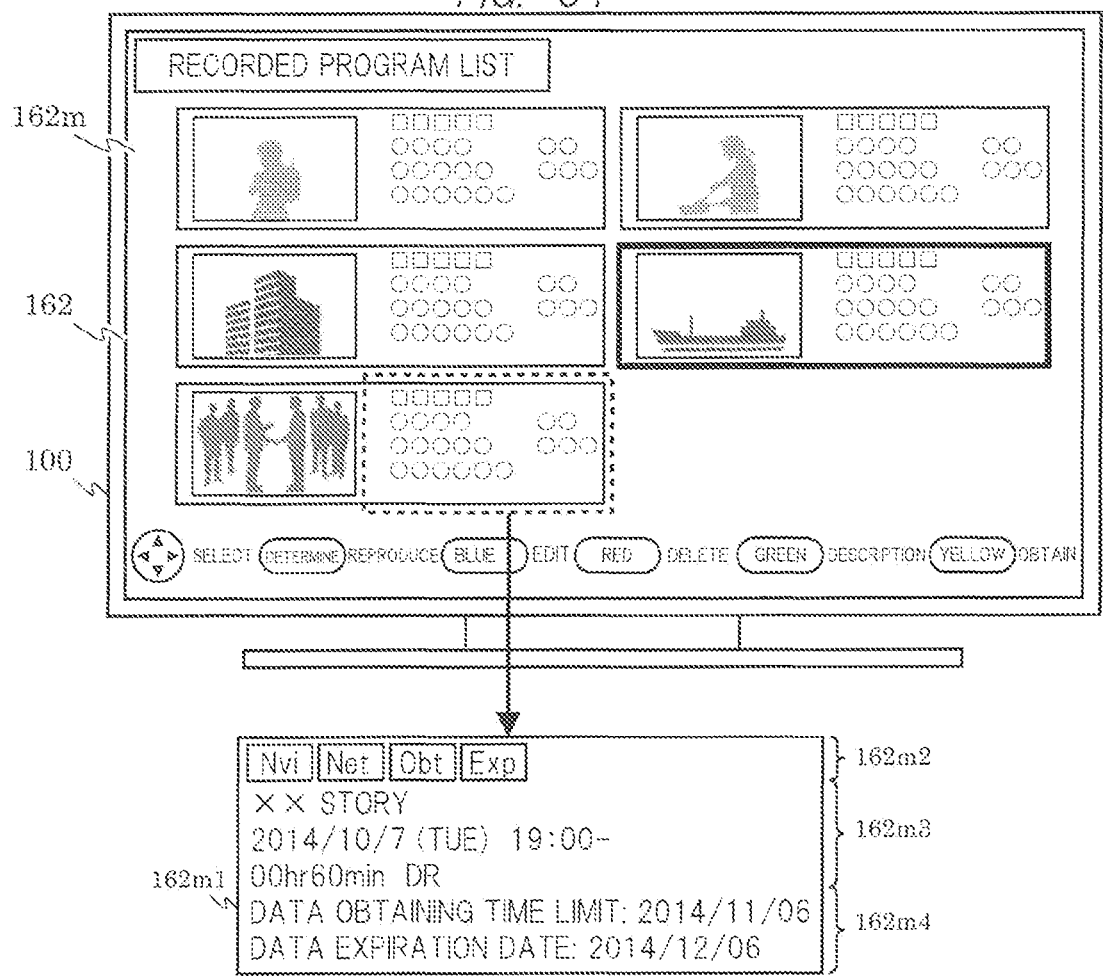
FIG. 34 is a screen display diagram for explaining a timer recording program list of the broadcast receiving apparatus according to the third embodiment.

FIG. 34 is a screen display diagram showing one example of a timer recording program list in the broadcast receiving apparatus 40100 according to the present embodiment. For example, when display of a recorded program list is instructed by operating the remote controller by which the broadcast receiving apparatus 40100 can be operated, a timer recording program list 162m as shown in FIG. 34 is displayed. The timer recording program list 162m displays recorded programs that are recorded to the storage as a list. A display format may be an order of recording time and date, or may be an order of program titles. Further, a subfolder may be provided for each channel or for each series. Information on the recorded programs may be constituted by a thumbnail unit and a program detailed information unit 162m1. The number of recorded programs displayed in a screen may be increased without displaying the thumbnail unit.

In the present embodiment, the program detailed information unit 162m1 may be configured by a program attribute region 162m2, a program basic information region 162m3, and a program extension information region 162m4.

Symbols each of which denotes an attribute of each recorded program and the like are displayed in the program attribute region 162m2. For example, as the symbols denoting the attribute of each of the recorded programs and the like, a mark standing for "Non-viewed" indicating that it has not been viewed yet, a mark standing for "Network" indicating the asset via communication line of each of the recorded programs can be obtained from the server device, a mark standing for "Obtained" indicating that the asset via communication line has already been obtained and recorded in the storage, a mark standing for "Expiration" indicating that a time limit until which the asset via communication line can be obtained from the server device is specified, and the like are displayed. A mark having other meaning may be displayed further. Whether each of the marks is to be displayed or not is controlled in accordance with a status of each recorded program. Further, each of the marks may be substituted for a brevity code, characters, a sentence or the like that have the same meaning. Each of the attributes is not displayed in the program attribute region 162m2 normally, but may be pop-up displayed only in a case where each of the recorded programs is selected by a selection marker.

Basic information such as a program title, recording date and time, a recording time, a recording mode and the like of each of the recorded programs is displayed in the program basic information region 162m3.

Information regarding the time limit until which the asset via communication line of each of the recorded programs can be obtained from the server device ("data obtaining time limit" in FIG. 34) in a case where each of the recorded programs has a mark standing for "Network" described above and a mark standing for "Expiration", and information regarding an expiration date of each of the recorded programs ("data expiration date" in FIG. 34) in a case where each of the recorded programs has "Obtained" described above are displayed in the program extension information region 162m4. Other information may further be displayed.

As described above, it is possible for the user to easily grasp various types of information regarding the asset via communication line of each of the recorded programs by displaying the mark that means each attribute described above or information regarding each time limit in the timer recording program list 162m.

When a "cursor" key of the remote controller is operated in a state where the timer recording program list 162m is displayed, the selection marker can be moved among the respective recorded programs. Further, when a "determine" key of the remote controller is pushed, the reproducing process of the recorded program selected by the selection marker can be executed. Further, when a "red" key of the remote controller is pushed, the recorded program selected by the selection marker can be deleted. Further, when a "yellow" key of the remote controller is pushed and the recorded program selected by the selection marker has the mark standing for "Network", the asset via communication line of the recorded program can be obtained from the server device. It may be thought that the obtaining process that is executed when the "yellow" key of the remote controller is pushed is the same as the case where the process that has been explained as the exceptional process in the item "A-3: recording process of asset via communication line after the end of broadcasting the program" described above is executed regardless of the time limit until which the asset via communication line can be obtained from the server device or in response to an instruction of the user.

Further, in a case where the recorded program has the mark standing for "Network" and the mark standing for "Expiration" and a due date indicated by the "data obtaining time limit" expired, it may be controlled so as to delete display of the mark standing for "Network" and the mark standing for "Expiration". Namely, this is because the obtaining process of the asset via communication line of the recorded program cannot be executed due to expiration of the time limit. Further, in a case where the recorded program has the mark standing for "Obtained" and a due date indicated by the "data expiration date" expired, it may be controlled so as to delete display of the mark standing for "Obtained" and delete a communication line asset of the recorded program stored to the storage. Namely, this is because the reproducing process of the asset via communication line of the recorded program cannot be executed due to expiration of the time limit.

In a case where the asset via communication line of the recorded program, which contains data to be displayed in the "region 1" or "region 2" of the layout setting as shown in FIG. 19B based on description of an LCT cannot be obtained because the obtainable time limit from the server device expired or the like, or in a case where the reproducing process from the storage cannot be executed because the data expiration date expired or the like, the broadcast receiving apparatus 40100 according to the present embodiment controls so as to display the video with default layout setting (i.e., the layout setting shown in FIG. 19A) regardless of the description content of the layout setting of the LCT. The video based on the asset via broadcast transmission path is displayed in the "region 0" of the default layout setting. Whenever to execute the reproducing process of the recorded program, the process may be executed by applying a patch to the description of the layout setting of the LCT that is recorded so as to be associated with the recorded program. Alternatively, in a case where the asset via communication line of the recorded program cannot be obtained because the obtainable time limit from the server device expired as a trigger, or in a case where the reproducing process from the storage cannot be executed because the data expiration date expired as a trigger, the process may be realized by rewriting the description of the layout setting of the LCT that is recorded so as to be associated with the recorded program. Further, in a case where both the "region 1" and the "region 2" are display regions by the asset via communication line and a region for which the obtaining is disabled or the reproduction is disabled is only one of the regions, it may be controlled so as to execute a patch process or a rewriting process of description of the layout setting of the LCT.

According to the broadcast receiving apparatus 40100 of the present embodiment explained above, it is possible to effectively obtain the asset via communication line of the program during the recording process of the program. Further, it is also possible to easily inform the user of an obtaining status of the asset via communication line of the program when the recorded programs are displayed as the list. Namely, it is possible to provide a broadcast receiving apparatus capable of executing a function with a higher added value.

Fourth Embodiment

Hereinafter, a fourth embodiment according to the present invention will be described. Constituent elements, processes, effects and the like of the present embodiment are the same as those of the third embodiment unless otherwise specified. For this reason, in the following description, differences between the present embodiment and the third embodiment are mainly described, and description of the matters common to both embodiments is omitted as much as possible in order to avoid redundant description. In the present embodiment, data outputting process from a broadcast receiving apparatus 40100 to a monitor device 40300 via a connection cable 40200 will mainly be described.

[Output Control for Program]

In the present embodiment, the broadcast receiving apparatus 40100 is an optical disc drive recorder, a magnetic disk drive recorder, an STB or the like. Namely, the broadcast receiving apparatus 40100 does not have a monitor unit for displaying a video and a speaker unit for outputting an audio, whereby video information (video data) and audio information (audio data) are outputted from a digital interface unit 40125, and transmitted to the monitor device 40300 via the connection cable 40200. Moreover, the monitor device 40300 displays the video information and outputs the audio information. Note that the broadcast receiving apparatus 40100 can appropriately control an output format of the video information (video data) and the audio information (audio data) to the monitor device 40300 via the connection cable 40200. Hereinafter, an example of the output format of the video information (video data) and the audio information (audio data) compatible with the broadcast receiving apparatus 40100 according to the present embodiment will be described.

<B-1: Output 1 of Decoded Video Information and Decoded Audio Information>

A first example of the output format of the video information and the audio information compatible with the broadcast receiving apparatus 40100 is a format to output, from the digital interface unit 40125, decoded video information outputted from a video synthesizing unit 161 and decoded audio information outputted from an audio synthesizing unit 164 and transmit them to the monitor device 40300 via data lanes of the connection cable 40200.

In this first example, when to view a program while broadcasting, the broadcast receiving apparatus 40100 obtains each asset included in an IP data flow transmitted via a broadcast transmission path (in the present embodiment, referred to also as an "asset via broadcast transmission path") and each asset included in an IP data flow distributed via a communication line (in the present embodiment, referred to also as an "asset via communication line"), and appropriately executes a decoding process for them by a video decoder 141, an audio decoder 143, a caption decoder 144, a subtitle decoder 145, a data decoder 151, and the like. Note that, in a case where an application control code is specified by "PREFETCH" and the asset via communication line has thereby been cached, the asset via communication line may be obtained by reading out it from the cache. Moreover, it is controlled so as to output the decoded video information and the decoded audio information, which are respectively subjected to a synthesizing process in the video synthesizing unit 161 and the audio synthesizing unit 164, to the monitor device 40300 via the digital interface unit 40125.

Further, when to view a recorded program that is recorded to a storage (accumulation) unit 110 or the external recording medium (collectively referred to as a "storage" in the present embodiment), the broadcast receiving apparatus 40100 may appropriately execute the decoding process for each of the asset via broadcast transmission path and the asset via communication line read out from the storage by the reproducing process by means of the video decoder 141, the audio decoder 143, the caption decoder 144, the subtitle decoder 145, the data decoder 151, and the like. Note that, when to execute the reproducing process, the IP data flow including the asset via communication line may newly be obtained from the broadcast station server 300 or the service provider server 400 (collectively referred to also as a "server device" in the present embodiment). Moreover, it is controlled so as to output the decoded video information and the decoded audio information, which are respectively subjected to the synthesizing process by means of the video synthesizing unit 161 and the audio synthesizing unit 164, to the monitor device 40300 via the digital interface unit 40125.

With respect to whether either the asset via communication line read out from the storage or the asset via communication line included in the IP data flow newly obtained from the server device is to be used for the decoding process when to execute the reproducing process, priority orders may be determined in advance by menu setting or the like. Alternatively, whether the IP data flow including the asset via communication line is to be newly obtained from the server device or not may be controlled in accordance with version information and/or expiration date information accompanying the asset via communication line read out from the storage. Alternatively, a user may select it each time. For example, the user may first try to obtain the IP data flow including the asset via communication line from the server device. In a case where the IP data flow including the asset via communication line cannot be obtained from the server device, the user may use the asset via communication line read out from the storage. Alternatively, the user may first read out the asset via communication line from the storage, and newly obtain the IP data flow including the asset via communication line from the server device if necessary after confirming the version information and/or the expiration date information of the asset via communication line thus read out.

Figure 35A:
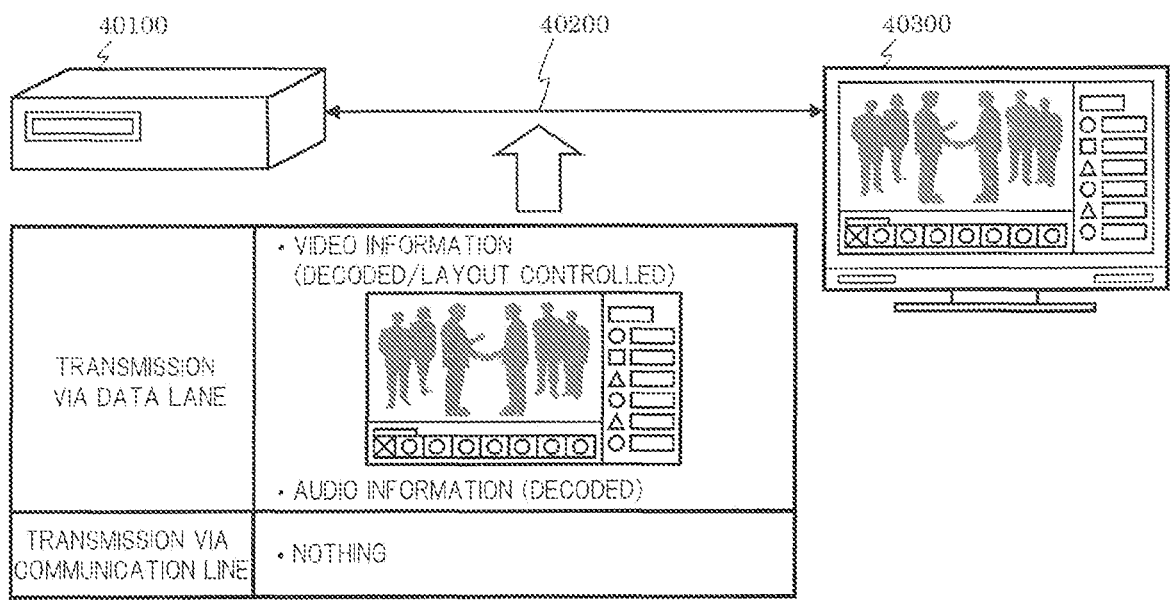
FIG. 35A is an explanatory diagram of an output format of a broadcast receiving apparatus according to a fourth embodiment.

Note that the decoded video information and the decoded audio information are mainly transmitted from the digital interface unit 40125 to the monitor device 40300 via the data lanes of the connection cable 40200. For example, they may be transmitted in a predetermined format compliant with HDMI (registered trademark) specifications. Further, in a case where the program to be viewed is a program to which control of layout setting by description of an LCT, the layout setting may have already been applied to the decoded video information outputted from the digital interface unit 40125 as shown in FIG. 35A as one example. Therefore, the monitor device 40300 can display the video information on the monitor unit in the layout setting intended by a contents provider without requiring a special process.

<B-2: Output 2 of Decoded Video Information and Audio Information>

A second example of the output format of the video information and the audio information compatible with the broadcast receiving apparatus 40100 is a format to output, from the digital interface unit 40125, decoded video information outputted from the video synthesizing unit 161 and decoded audio information outputted from the audio synthesizing unit 164 with respect to the asset via broadcast transmission path, and the asset via communication line outputted from the separating unit 132 as it is with respect to the asset via communication line, and to transmit, to the monitor device 40300, the decoded video information and the decoded audio information via the data lanes of the connection cable 40200, and the asset via communication line via the communication line of the connection cable 40200.

In this second example, when to view a program while broadcasting, the broadcast receiving apparatus 40100 controls so as to appropriately execute a decoding process for the asset via broadcast transmission path included in the IP data flow transmitted via the broadcast transmission path by the video decoder 141, the audio decoder 143, the caption decoder 144, the subtitle decoder 145, the data decoder 151, and the like, and further output the decoded video information and the decoded audio information, which are respectively subjected to the synthesizing process by the video synthesizing unit 161 and the audio synthesizing unit 164, to the monitor device 40300 via the digital interface unit 40125. On the other hand, it is controlled so as to output the asset via communication line included in the IP data flow distributed via the communication line from the separating unit 132 in a format of the IP data flow including the asset via communication line as it is, and output it to the monitor device 40300 via the digital interface unit 40125. Note that, in a case where the IP data flow including the asset via communication line has already been cached by specifying the application control code with "PREFETCH", the IP data flow read out from the cache may be outputted to the monitor device 40300 via the digital interface unit 40125.

Further, when to view a recorded program recorded to the storage, the broadcast receiving apparatus 40100 appropriately executes a decoding process for the asset via broadcast transmission path read out from the storage by the reproducing process by means of the video decoder 141, the audio decoder 143, the caption decoder 144, the subtitle decoder 145, the data decoder 151, and the like. With respect to the asset via communication line, the asset via communication line read out from the storage by the reproducing process may be reconstructed in the form of the IP data flow, and inputted into the digital interface unit 40125. Alternatively, it is controlled so as to output the IP data flow including the asset via communication line newly obtained from the server device may be inputted into the digital interface unit 40125. Moreover, the decoded video information and the decoded audio information, which are respectively subjected to the synthesizing process by the video synthesizing unit 161 and the audio synthesizing unit 164, and the IP data flow including the asset via communication line to the monitor device 40300 via the digital interface unit 40125.

With respect to whether either the asset via communication line read out from the storage or the asset via communication line included in the IP data flow newly obtained from the server device is to be outputted from the digital interface unit 40125 when to execute the reproducing process, priority orders may be determined in the similar manner to that of (B-1) described above.

Figure 35B:
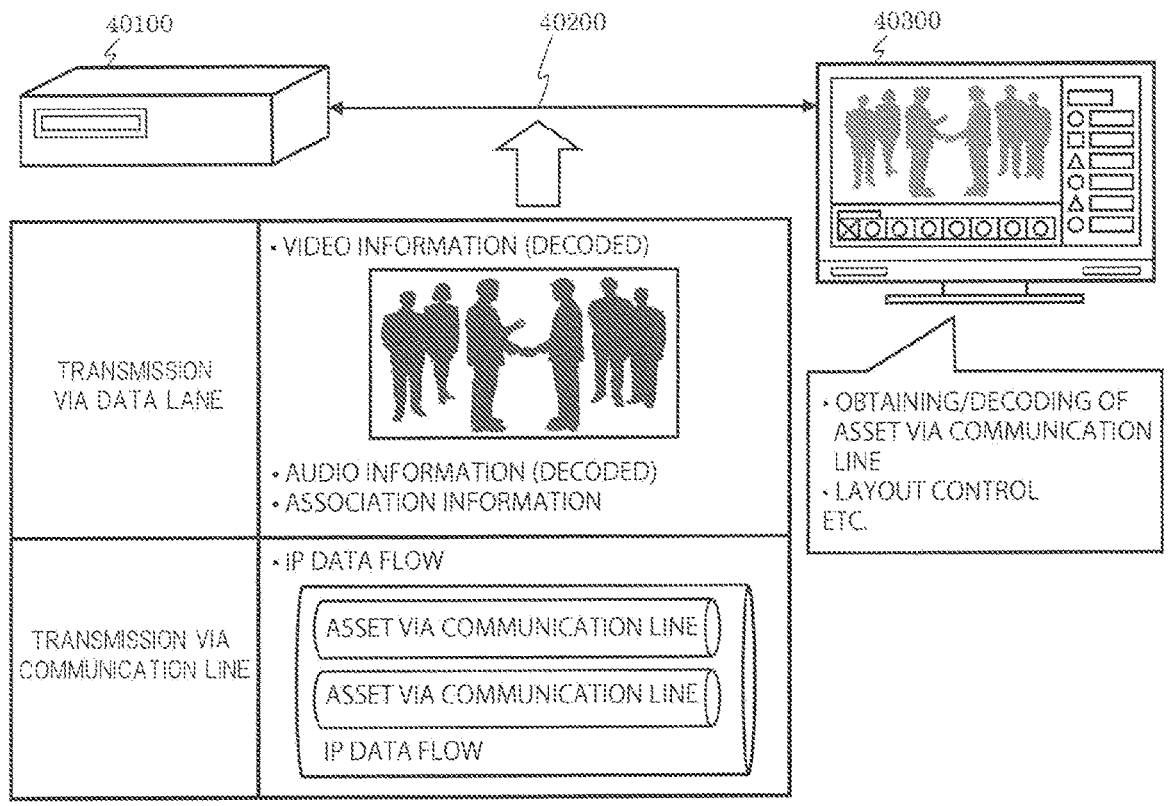
FIG. 35B is an explanatory diagram of an output format of the broadcast receiving apparatus according to the fourth embodiment.

With respect to the transmission of the decoded video information and the decoded audio information and the IP data flow including the asset via communication line from the digital interface unit 40125 to the monitor device 40300, as shown in FIG. 35B as one example, it may be controlled so that the decoded video information and the decoded audio information are mainly transmitted via the data lanes of the connection cable 40200, and that the IP data flow including the asset via communication line is mainly transmitted via the communication line of the connection cable 40200. Further, a distributing process of the IP data flow including the asset via communication line to the monitor device 40300 via the communication line of the connection cable 40200 may be executed by distributing the IP data flow, which is outputted from the separating unit 132 and includes the asset via communication line, from the digital interface unit 40125 to the monitor device 40300 in push type. Alternatively, the IP data flow, which is outputted from the separating unit 132 and includes the asset via communication line, may temporarily be stored in a server data memory region 41400 of the storage (accumulation) unit 110, and the stored IP data flow including the asset via communication line may be distributed from the digital interface unit 40125 in response to a request from the monitor device 40300. With respect to the distributing process of the IP data flow including the asset via communication line to the monitor device 40300 via the communication line of the connection cable 40200, the similar process may be executed in the following description.

Moreover, association information, which is various types of control information for associating the decoded video information and the decoded audio information with the asset via communication line, is transmitted via the data lanes of the connection cable 40200. The transmission of the decoded video information and the decoded audio information via the data lanes of the connection cable 40200 may be executed in a predetermined format compliant with HDMI specifications, for example. Further, the transmission of the association information via the data lanes of the connection cable 40200 may be executed by using a spare region or the like defined in the HDMI specifications, for example. The spare region or the like may be a region or the like, arranged in a blanking interval unit, through which each manufacturer can specify how to use it in the HDMI specifications.

The association information may be reference destination location information that indicates a reference destination for obtaining the asset via communication line, reference time information for controlling a decoding time and/or a presenting time of the asset via communication line, layout control information for controlling layout setting of the program to be viewed on monitor display. Other information may further be transmitted as the association information.

The reference destination location information is information that indicates a reference destination from which the monitor device 40300 obtains the asset via communication line. In a case where the monitor device 40300 is caused to obtain the IP data flow containing the asset via communication line from the server device again, the broadcast receiving apparatus 40100 may transfer location information and the like of an MPT included in the IP data flow obtained via the broadcast transmission path to the monitor device 40300 as the reference destination location information as it is. In a case where the monitor device 40300 is caused to obtain the IP data flow including the asset via communication line distributed from the broadcast receiving apparatus 40100, the broadcast receiving apparatus 40100 may transmit, as the reference destination location information, the location information and the like of the MPT included in the IP data flow obtained via the broadcast transmission path to the monitor device 40300 after rewriting the content thereof. By transmitting both types of the reference destination location information to the monitor device 40300, the monitor device 40300 may be caused to select whether to newly obtain the IP data flow including the asset via communication line from the server device or obtain the IP data flow including the asset via communication line, which is distributed from the broadcast receiving apparatus 40100.

Specifically, the rewriting process may execute by rewriting location information regarding the asset via communication line, which is contained in the MPT (corresponding to "MMT_general_location_info( )" shown in FIG. 17) or the like from "location_type=0x01" indicating data multiplexed onto an IPv4 data flow or "location_type=0x02" indicating data multiplexed onto an IPv6 data flow to "location_type=0x05" indicating data located on a specified URL. Moreover, it may be set so that description of the specified URL indicates the server data memory region 41400 managed by the server function executing unit 41103 of the broadcast receiving apparatus 40100. It is preferable that description of the reference destination is rewritten in the same format as the location information of the MPT transmitted via broadcast waves without changing its format in the rewriting process of the location information of the MPT. This is because it can be interpreted by the same function as that of the location information of the MPT transmitted via the broadcast waves when the monitor device 40300 interprets data outputted from the broadcast receiving apparatus 40100 and received by the monitor device 40300. In a case where the monitor device 40300 has the same function of receiving the broadcast waves as that of the broadcast receiving apparatus 40100, it is possible to apply the function to a process of receiving and interpreting digital interface output from the broadcast receiving apparatus 40100, and there is no need to mount its own function thereon. Therefore, it is possible to reduce the cost thereof as the whole system by configuring it in this manner.

Further, in a case where the monitor device 40300 obtains the asset via communication line from the IP data flow distributed from the broadcast receiving apparatus 40100 in push type, an IP packet ID of the IP data flow that the monitor device 40300 is to refer to, an asset ID of the asset via communication line to be obtained, or the like may be the reference destination location information.

As the reference time information, the NTP obtained by the broadcast receiving apparatus 40100 may be transferred, or the reference time information may be transmitted after a predetermined offset value is added to a value of the NTP. It is desirable that the monitor device 40300 controls the decoding process and a presenting process for the asset via communication line on the basis of the reference time information transmitted from the broadcast receiving apparatus 40100 in a case where the decoded video information and the decoded audio information transmitted from the broadcast receiving apparatus 40100 and the IP data flow including the asset via communication line are one obtained by executing the reproducing process for the recorded program recorded to the storage. For this reason, when to transmit the decoded video information and the decoded audio information and the IP data flow including the asset via communication line to the monitor device 40300, the broadcast receiving apparatus 40100 according to the present embodiment simultaneously transmits the decoded video information and the decoded audio information and reproduced program flag information. The reproduced program flag information indicates whether the IP data flow including the asset via communication line is one obtained by executing the reproducing process for a broadcasting program or one obtained by executing the reproducing process for the recorded program. The reproduced program flag information may also be one piece of the association information.

The layout control information is information indicating the setting content of the LCT in a case where the program is a program to which the control of the layout setting by the description of the LCT is subjected. The monitor device 40300 can control the layout setting at the time of the monitor display on the basis of the layout control information.

By obtaining the decoded video information and the decoded audio information and the layout control information from the broadcast receiving apparatus 40100 and obtaining the IP data flow including the asset via communication line from the broadcast receiving apparatus 40100 or the server device, the monitor device 40300 can display decoded video and various data transmitted through the IP data flow with a layout intended at the time of broadcasting. As described above, even in a case where the broadcast receiving apparatus 40100 executes the rewriting process of the location information, the broadcast receiving apparatus 40100 may output the content at the time of reception without rewriting LCT information. This is because an acquisition destination of the asset in a region of the LCT to which the asset via communication line is assigned at the time of receiving is merely changed by rewriting the location information, whereby there is no need to change the layout itself. Therefore, in a case where the monitor device 40300 has the same broadcast waves receiving function as that of the broadcast receiving apparatus 40100, the location information whose description of the reference destination is rewritten in the same format as that of the location information of the MPT transmitted via the broadcast waves and the LCT information that is not rewritten with the same description as the state where it is transmitted via the broadcast waves (there is no need to rewrite it at the time of recording or reproducing) are transmitted from the broadcast receiving apparatus 40100 to the monitor device 40300 via the digital interface when to output the decoded video of the program that is recorded in the broadcast receiving apparatus 40100 and then reproduced to the monitor device 40300 via the digital interface. Thus, it is possible to interpret the control information in the system having the same broadcast waves receiving function as that of the monitor device 40300. Therefore, it is possible to realize the reproduction more efficiently by displaying it with the layout intended at the time of broadcasting on the monitor device 40300.

Note that, in a case where the layout setting by the description of the LCT indicates a layout constituted by only the asset via broadcast transmission path, the broadcast receiving apparatus 40100 may control the layout setting, synthesize the decoded video information and the decoded audio information in a layout set state, and transmit it to the monitor device 40300 via the data lanes of the connection cable 40200. In this case, there is no need to transmit the layout control information as the association information.

Further, in the output format of this second example, there is an advantage that only the video information based on the asset via broadcast transmission path can be displayed even in a case where the monitor device 40300 is not compatible with the output format of the second example.

<B-3: Output 1 of Encoded Video Data and Encoded Audio Data>

A third example of the output format of the video data and the audio data compatible with the broadcast receiving apparatus 40100 is a format to output one IP data flow including the asset via broadcast transmission path and the asset via communication line from the digital interface unit 40125, and to transmit it to the monitor device 40300 via the data lanes of the connection cable 40200 or the communication line.

In this third example, when to view a program while broadcasting, the broadcast receiving apparatus 40100 obtains each of the IP data flow, which is transmitted via the broadcast transmission path and includes the asset via broadcast transmission path, and the IP data flow, which is distributed via the communication line and includes the asset via communication line, and outputs the respective IP data flows from the separating unit 132 as they are. Moreover, it is controlled so that the transcode processing unit 40181 executes a process of synthesizing the IP data flow including the asset via broadcast transmission path and the IP data flow including the asset via communication line into one IP data flow, and the synthesized IP data flow is outputted to the monitor device 40300 from the digital interface unit 40125. Note that, since the application control code is specified by "PREFETCH", the transcode processing unit 40181 may execute the synthesizing process based on the IP data flow including the asset via broadcast transmission path and the IP data flow read out from the cache in a case where the IP data flow including the asset via communication line has already been cached.

Further, when to view the recorded program recorded to the storage, the broadcast receiving apparatus 40100 may reconstruct the asset via broadcast transmission path and the asset via communication line read out from the storage by means of the reproducing process into a format of one IP data flow by means of the transcode processing unit 40181, and output the reconstructed IP data flow from the digital interface unit 40125 as the synthesized IP data flow. In a case where the recording process to the storage is executed by package units or IP data flow units, the transcode processing unit 40181 may execute the synthesizing process for the IP data flow including the asset via broadcast transmission path and the IP data flow including the asset via communication line read out from the storage by means of the reproducing process. Further, the asset via communication line may be obtained from the server device newly, and the transcode processing unit 40181 may execute the synthesizing process of the IP data flow including the asset via broadcast transmission path read out from the storage and the IP data flow including the asset via communication line newly obtained from the server device.

With respect to whether either the IP data flow, which is read out from the storage and includes the asset via communication line, or the IP data flow, which is newly obtained from the server device and includes the asset via communication line, is to be used for the synthesizing process when to execute the reproducing process, priority orders may be determined in the similar manner to that of (B-1) described above.

Note that various control signals (MMT-SI and the like) included in the IP data flow transmitted via the broadcast transmission path together with the asset via broadcast transmission path are basically included as they are in the synthesized IP data flow obtained as a result of the synthesizing process of the IP data flow including the asset via broadcast transmission path and the IP data flow including the asset via communication line in the transcode processing unit 40181. However, the rewriting process is appropriately executed for the association information in which the asset via broadcast transmission path and the asset via communication line are associated with each other. Specifically, in the rewriting process, the location information regarding the asset via communication line included in the MPT (corresponding to "MMT_general_location_info( )" shown in FIG. 17) and the like may be rewritten into "location_type=0x00" indicating data multiplexed to the IP data flow itself from "location_type=0x01" indicating data multiplexed to the IPv4 data flow and/or "location_type=0x02" indicating data multiplexed to the IPv6 data flow.

Figure 35C:
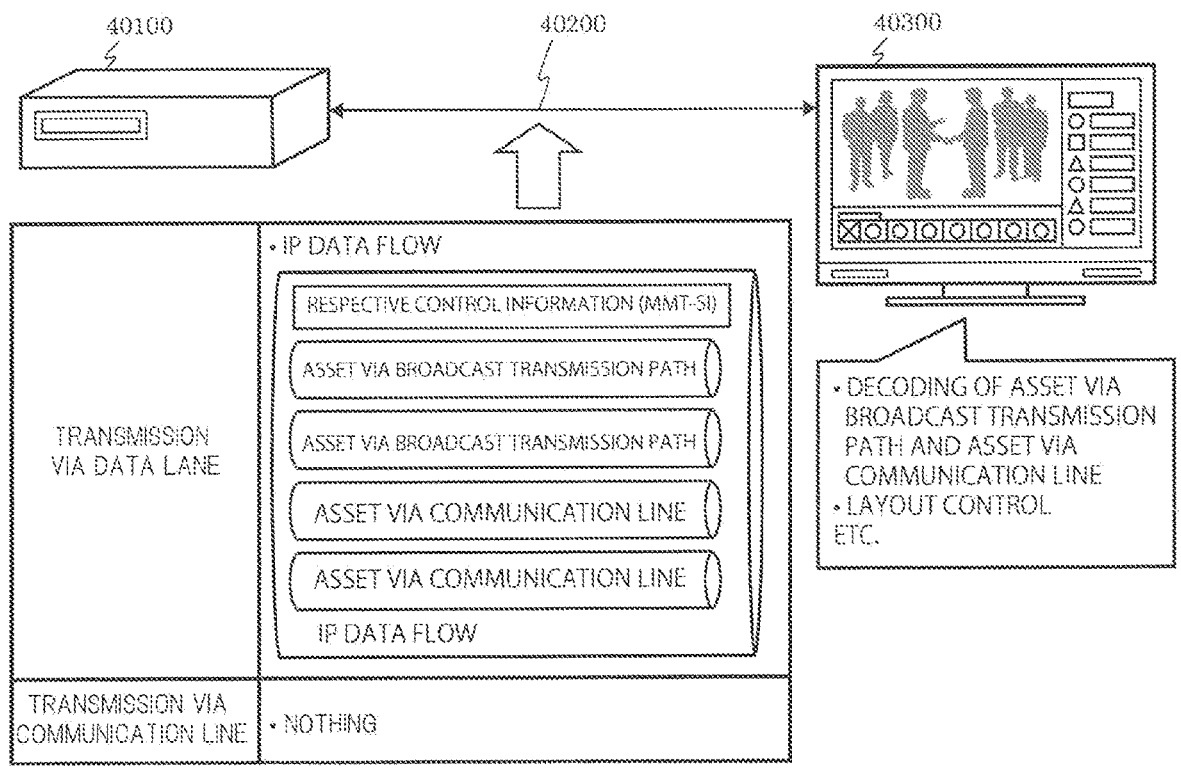
FIG. 35C is an explanatory diagram of an output format of the broadcast receiving apparatus according to the fourth embodiment.

As shown in FIG. 35C as one example, the synthesized IP data flow outputted from the transcode processing unit 40181 may be transmitted to the monitor device 40300 via the data lanes of the connection cable 40200. Alternatively, it may be distributed to the monitor device 40300 via the communication line of the connection cable 40200. In this case, the monitor device 40300 is required to execute the decoding process for each asset on the basis of various types of control information contained in the synthesized IP data flow transmitted from the broadcast receiving apparatus 40100. Namely, it is desirable that the monitor device 40300 has the similar configuration to that of the broadcast receiving apparatus 100 shown in FIG. 7A, and is configured to execute a decoding process for an MMT data string.

Note that, when to output the synthesized IP data flow from the digital interface unit 40125 and transmit it to the monitor device 40300 via the data lanes of the connection cable 40200, it may be executed by storing the synthesized IP data flow in a storage region for the video information and the audio information in a predetermined format compliant with the HDMI (registered trademark) specifications as it is, for example. In this case, it is desirable that information indicating that data stored in the storage region for the video information and the audio information are the synthesized IP data flow, and information, in which the MMT data string and its control information are contained in the synthesized IP data flow, indicating that the decoding process for the MMT data string and the like are required to view the program are transmitted by using the spare region and the like defined in the HDMI specifications, for example.

<B-4: Output 2 of Encoded Video Data and Encoded Audio Data>

Figure 35D:
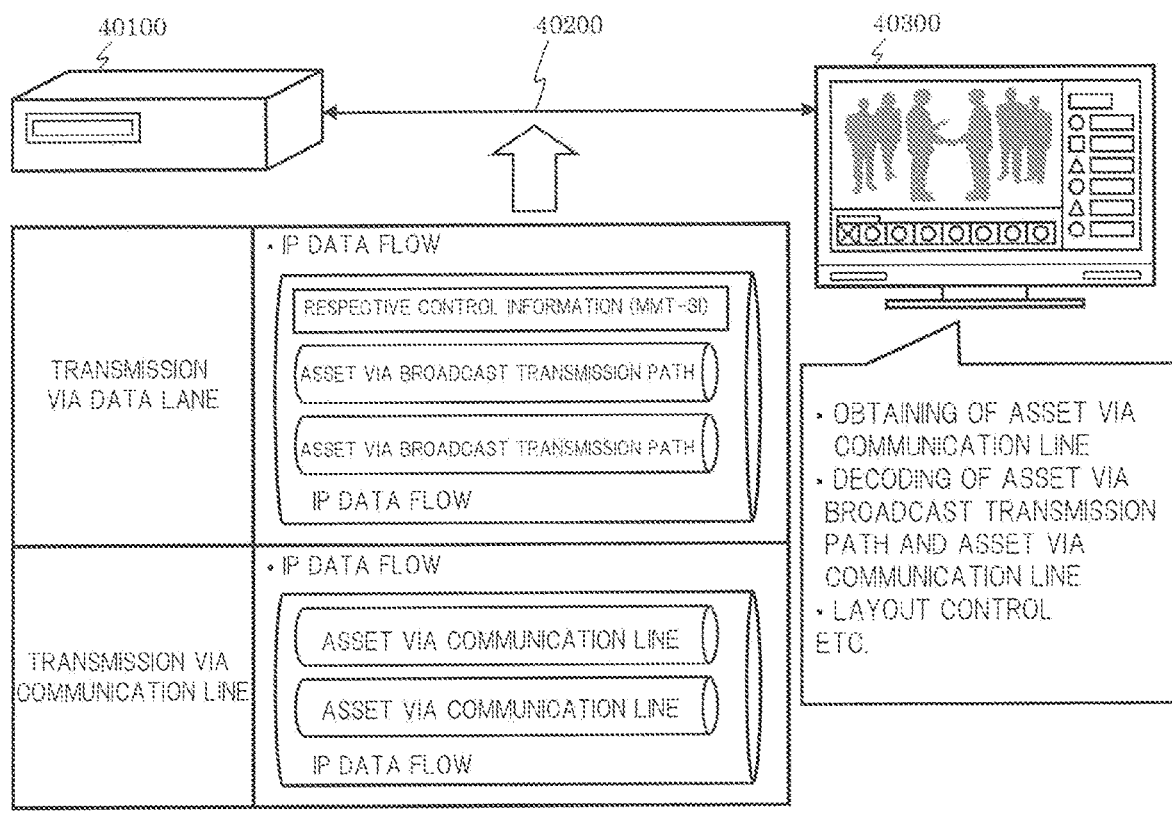
FIG. 35D is an explanatory diagram of an output format of the broadcast receiving apparatus according to the fourth embodiment.

A fourth example of the output format of the video information and the audio information compatible with the broadcast receiving apparatus 40100 is a format to output the IP data flow including the asset via broadcast transmission path and the IP data flow including the asset via communication line from the digital interface unit 40125, and to respectively transmit the IP data flow including the asset via broadcast transmission path and the IP data flow including the asset via communication line to the monitor device 40300 via the data lanes of the connection cable 40200 and the communication line of the connection cable 40200 as shown in FIG. 35D as one example.

In this fourth example, when to view a program while broadcasting, the broadcast receiving apparatus 40100 obtains each of the IP data flow, which is transmitted via the broadcast transmission path and includes the asset via broadcast transmission path, and the IP data flow, which is distributed via the communication line and includes the asset via communication line, and outputs the respective IP data flows from the separating unit 132 as they are. Moreover, it is controlled so as to transmit the IP data flow including the asset via broadcast transmission path from the digital interface unit 40125 to the monitor device 40300 via the data lanes of the connection cable 40200, and to distribute the IP data flow including the asset via communication line from the digital interface unit 40125 to the monitor device 40300 via the communication line of the connection cable 40200. Note that, since the application control code is specified by "PREFETCH", the IP data flow read out from the cache may be distributed from the digital interface unit 40125 to the monitor device 40300 via the communication line of the connection cable 40200 in a case where the IP data flow including the asset via communication line has already been cached.

Further, when to view the recorded program recorded to the storage, the broadcast receiving apparatus 40100 reconstructs each of the asset via broadcast transmission path and the asset via communication line read out from the storage by means of the reproducing process into a format of the IP data flow by means of the transcode processing unit 40181. Moreover, the IP data flow reconstructed from the asset via broadcast transmission path and the IP data flow reconstructed from the asset via communication line may respectively be transmitted to the monitor device 40300 via the data lanes of the connection cable 40200 and the communication line of the connection cable 40200. In a case where the recording process to the storage is executed by package units or IP data flow units, the IP data flow including the asset via broadcast transmission path and the IP data flow including the asset via communication line, which are read out from the storage by means of the reproducing process, may respectively be transmitted to the monitor device 40300 via the data lane and the communication line of the connection cable 40200. Further, the asset via communication line may be obtained from the server device newly, and the IP data flow, which is outputted from the separating unit 132 and includes the asset via communication line, may be distributed to the monitor device 40300 via the communication line of the connection cable 40200.

With respect to whether either the IP data flow, which is read out from the storage and includes the asset via communication line, or the IP data flow, which is newly obtained from the server device and includes the asset via communication line, is to be distributed to the monitor device 40300 when to execute the reproducing process, priority orders may be determined in the similar manner to that of (B-1) described above.

Note that various control signals (MMT-SI and the like) included in the IP data flow transmitted via the broadcast transmission path together with the asset via broadcast transmission path are basically included as they are in the IP data flow that is outputted from the digital interface unit 40125 and includes the asset via broadcast transmission path. However, the rewriting process is appropriately executed for the association information in which the asset via broadcast transmission path and the asset via communication line are associated with each other. Specifically, in the rewriting process, the location information regarding the asset via communication line included in the MPT (corresponding to "MMT_general_location_info( )" shown in FIG. 17) and the like may be rewritten into "location_type=0x05" indicating data that exist on a specified URL from "location_type=0x01" indicating data multiplexed to the IPv4 data flow and/or "location_type=0x02" indicating data multiplexed to the IPv6 data flow. Moreover, the specified URL may be set so as to indicate the server data memory region 41400 managed by the server function executing unit 41103 of the broadcast receiving apparatus 40100.

Note that the rewriting process is executed when to obtain the IP data flow including the asset via communication line, which is distributed from the broadcast receiving apparatus 40100 to the monitor device 40300. In a case where the monitor device 40300 is caused to obtain the IP data flow including the asset via communication line from the server device again, the rewriting process may not be executed.

Further, when to output the IP data flow including the asset via broadcast transmission path from the digital interface unit 40125 and transmit them to the monitor device 40300 via the data lanes of the connection cable 40200, it may be executed by storing the IP data flow including the asset via broadcast transmission path in a storage region for the video information and the audio information in a predetermined format compliant with the HDMI (registered trademark) specifications as it is, for example. In this case, it is desirable that information indicating that data stored in the storage region for the video information and audio information are the IP data flow including the asset via broadcast transmission path, and information, in which the MMT data string and its control information are contained in the IP data flow including the asset via broadcast transmission path, indicating that the decoding process for the MMT data string and the like are required to view the program are transmitted by using the spare region and the like defined in the HDMI specifications, for example.

As explained above, the broadcast receiving apparatus 40100 according to the present embodiment can appropriately select the output format of any of (B-1) to (B-4) described above. Moreover, the output formats of (B-1) to (B-4) described above can be combined with each other appropriately. For example, after executing the decoding process of a part of the asset via communication line according to the output format of (B-2) described above by the broadcast receiving apparatus 40100, the synthesizing process of the video information and the audio information obtained by decoding the asset via broadcast transmission path is executed, and they are transmitted to the monitor device 40300 via the data lanes of the connection cable 40200. It may be controlled so that the other of the asset via communication line is distributed to the monitor device 40300 via the communication line of the connection cable 40200 as it is. Further, for example, it may be controlled so that according to the output format of (B-4) described above, among the assets constituting the asset via broadcast transmission path and the asset via communication line, a video asset, an audio asset and the like are transmitted, as one IP data flow, to the monitor device 40300 via the data lanes of the connection cable 40200, and a data asset, a subtitle asset and the like are distributed, as one IP data flow, to the monitor device 40300 via the communication line of the connection cable 40200.

How the broadcast receiving apparatus 40100 controls the output format may be executed in accordance with display performance of the monitor device 40300, which is obtained via a DDC line of the connection cable 40200. The display performance may be obtained by different means from that described above. Note that, in the present embodiment, the display performance is an item such as decoding performance of the monitor device 40300 for the MMT data string, whether compatible with network communication via the communication line of the connection cable 40200 or not, and presence or absence of a LAN communication function with the Internet 200.

In a case where the output format of the video information and the audio information from the broadcast receiving apparatus 40100 is (B-4) described above, the monitor device 40300 receives the IP data flow, which is transmitted via a data lane for unidirectional transmission of the connection cable 40200 and includes the asset via broadcast transmission path, from the broadcast receiving apparatus 40100 by means of the digital interface unit, and inputs the received IP data flow to an MMT decode processing unit. The MMT decode processing unit refers to the MMT-SI included in the IP data flow, and requests the broadcast receiving apparatus 40100 to transmit the IP data flow including the asset via communication line via the communication line capable of bidirectional transmission of the connection cable 40200 on the basis of the location information and the like contained in the MPT. The broadcast receiving apparatus 40100 transmits the IP data flow including the asset via communication line, which is stored in the server data memory region 41400 of the storage (accumulation) unit 110, to the monitor device 40300 via the communication line capable of bidirectional transmission of the connection cable 40200 on the basis of control of the server function executing unit 41103. The monitor device 40300 appropriately decodes the asset via communication line received via the communication line of the connection cable 40200 and the asset via broadcast transmission path received via the data lanes of the connection cable 40200, and provides the video information and the audio information to the user via the monitor unit and the speaker unit. In a case where the output format of the video information and the audio information from the broadcast receiving apparatus 40100 is (B-2) or (B-3) described above, the similar process is also executed.

In the above explanation, the IP data flow including the asset via communication line is transmitted via the communication line of the connection cable 40200 in a case where the output format of the video information and the audio information from the broadcast receiving apparatus 40100 is (B-2) or (B-4) described above. However, this is merely one example. For example, transmission of the IP data flow including the asset via communication line may be executed by outputting it from a LAN communication unit 121 of the broadcast receiving apparatus 40100 and inputting it into a LAN communication unit (not shown) of the monitor device 40300 via a router device 200*r*. Similarly, as transmission of the synthesized IP data flow by synthesizing the asset via broadcast transmission path and the asset via communication line into one IP data flow in a case where the output format of the video information and the audio information from the broadcast receiving apparatus 40100 is (B-3) described above, it may be executed by outputting it from the LAN communication unit 121 of the broadcast receiving apparatus 40100 and inputting it to the LAN communication unit (not shown) of the monitor device 40300 via the router device 200*r*.

However, in a case of executing the transmitting process described above, equipment that becomes a transmission destination of the IP data flow including the asset via communication line or the synthesized IP data flow is limited to equipment that has an IP address limited by the same subnet mask as that of an IP address of the broadcast receiving apparatus 40100. By providing such limitation, equipment that the user does not manage hardly obtains the IP data flow including the asset via communication line, the synthesized IP data flow, and the like via the Internet 200 without restriction, for example. Therefore, it can be said that it is preferable to manage copy rights of program contents.

Further, when the location information of the asset via communication line included in the MMT data string that is obtained via the broadcast transmission path by the broadcast receiving apparatus 40100 indicates a URL, the URL indicates an IP address of an external network when viewed from the broadcast receiving apparatus 40100. On the other hand, the broadcast receiving apparatus 40100 is directly connected to the monitor device 40300 via the connection cable 40200, that is, it can be said that they are constituted in a region limited by the same subnet mask. Therefore, it can be said that the rewriting process of the reference destination location information, which has been explained for the output format of (B-2) described above, is a process of rewriting location information indicating an IP address that does not exist within the same subnet mask as a subnet mask to which the IP address of the broadcast receiving apparatus 40100 and an IP address of the monitor device 40300 belong into location information indicating an IP address within the same subnet mask as the subnet mask to which the IP address of the broadcast receiving apparatus 40100 and the IP address of the monitor device 40300 belong.

Further, in the output format of (B-2) or (B-4) described above, the broadcast receiving apparatus 40100 respectively outputs data contained in the IP data flow, which are obtained via the broadcast transmission path for unidirectional transmission, and data included in the IP data flow, which are obtained via the communication line capable of bidirectional transmission via different lines each of which is the same wired digital interface. By using the different lines in this manner, it is possible to output them without executing a special multiplexing process of synthesizing two IP data flows into one IP data flow. Namely, in the example of the output format of (B-4), although there are processes of rewriting the location information and the like, the IP data flow obtained via the broadcast transmission path by the broadcast receiving apparatus 40100 and the IP data flow obtained via the communication line by the broadcast receiving apparatus 40100 are respectively outputted as the IP data flow for a first output signal and the IP data flow for a second output signal without being multiplexed with each other. Thus, there is no need to execute a special multiplexing process for the IP data flow of the first output signal and the IP data flow of the second output signal. Therefore, there is also no need to mount a separating process corresponding to the special multiplexing process on the monitor device 40300 side. By rather configuring both the first output signal and the second output signal so as to be outputted as the MMT data strings, it is possible to execute a decoding process of the first output signal and the second output signal without executing a special separating process so long as the monitor device 40300 has the similar MMT decoder to that in the broadcast receiving apparatus 40100. Therefore, general versatility of the output state becomes very high as a system, and this is beneficial.

Further, in the example described above, the broadcast receiving apparatus 40100 outputs data contained in the IP data flow obtained via the broadcast transmission path for unidirectional transmission to the monitor device 40300, which is an external apparatus, via a unidirectional transmission line of the wired digital interface, and outputs data contained in the IP data flow obtained via the communication line for bidirectional transmission to the monitor device 40300, which is the external apparatus, via a bidirectional transmission line of the wired digital interface. The monitor device 40300 obtains the data obtained via the broadcast transmission path for unidirectional transmission by the broadcast receiving apparatus 40100 from the unidirectional transmission line of the wired digital interface, and obtains the data obtained via the communication line for bidirectional transmission by the broadcast receiving apparatus 40100 from the bidirectional transmission line of the wired digital interface. Therefore, compatibility of the process with the broadcast receiving apparatus 40100 according to the present embodiment is high. Namely, it is possible to manufacture the monitor device 40300 by diverting a lot of processing circuits from the broadcast receiving apparatus 40100, and this makes it possible to reduce the number of dedicated processing circuits. Thus, it is possible to manufacture them at low cost. Therefore, it is possible to provide more suitable system to the user inexpensively.

Note that the transmission line capable of unidirectional communication, which has been explained in each of the embodiments described above, may physically be one line, or a group of lines obtained by combining a plurality of lines. Further, the transmission line capable of bidirectional communication, which has been explained in each of the embodiments described above, may physically be one line, or a group of lines that carries out transmission by using a protocol for bidirectional communication, obtained by combining a plurality of lines.

Further, setting and the like of control for the output format according to each of the embodiments described above may have a predetermined initial value at the time of shipment. However, it is desirable that the predetermined initial value is configured so as to be capable of changing to a set value according to usage environment of each user by means of an operation of the user through the operation input unit 170 or the like. This is because they can be configured so as to obtain data output by control and the like of the output format required by the user by means of manual setting even in a case where correct information regarding performance of the monitor device 40300 cannot be obtained due to fault, failure or the like of the broadcast receiving apparatus 40100 itself or that of software for the monitor device 40300, whereby it is possible to prevent disadvantage to the user from occurring.

As described above, the examples of the embodiments according to the present invention have been explained using the first to fourth embodiments. However, the configurations for achieving the technique of the present invention are not limited to those embodiments, and may be modified in various ways. For example, some constituent elements of an embodiment may be replaced with those of another embodiment, and a constituent element of an embodiment may be added to a constituent element of another embodiment. These modifications are all within the scope of the present invention. In addition, numerical values, messages, and others in the specification and drawings are described by way of example, and the effects of the present invention are not impaired even when values, messages, and others different from those are used.

A part or all of the functions and the like of the present invention described above may be achieved by means of hardware, for example, by designing such functions with integrated circuits. Alternatively, it may be achieved by means of software by causing a microprocessor unit or the like to interpret and execute operating programs for achieving respective functions. It is also possible to use hardware and software in combination.

Note that the software that controls the broadcast receiving apparatus 100 may be stored in advance in the ROM 103 and/or the storage (accumulation) unit 110 of the broadcast receiving apparatus 100 at the time of product shipment. The software may be acquired from the other application server 500 or the like on the Internet 200 through the LAN communication unit 121 after the product shipment. Alternatively, the software stored in a memory card, optical disc, or the like may be acquired through the extension interface unit 124.

Further, control lines and data lines considered to be necessary for the description are shown in the drawings, and all the control lines and data lines included in the product are not always shown in the drawings. Actually, it is presumable that almost all constituent elements are connected with each other.

REFERENCE SINGS LIST 100, 800, 40100 broadcast receiving apparatus
100a, 40100a antenna
101, 801 main control unit
102, 802 system bus
103, 803 ROM
104, 804 RAM
110, 810 storage unit
121, 821 LAN communication unit
124, 824 extension interface unit
125, 825, 40125 digital interface unit
131, 831, 832 tuner/demodulating unit 132 separating unit
141 video decoder
142 video color gamut conversion unit
143 audio decoder
144 caption decoder
145 subtitle decoder
146 subtitle synthesizing unit
147 subtitle color gamut conversion unit
151 data decoder
152 cache unit
153 application control unit
154 browser unit
155 application color gamut conversion unit
156 sound source unit
161, 861 video synthesizing unit
162, 862 monitor unit
163, 863 video output unit
164, 864 audio synthesizing unit
165, 865 speaker unit
166, 866 audio output unit
170, 870 operation input unit
40181 transcode processing unit
841 MMT decode processing unit
842 MPEG2-TS decode processing unit
200 Internet
200r router device
200a access point
300t radio tower
300s broadcast satellite (or communication satellite)
300 broadcast station server
400 service provider server
500 other application server
600 mobile phone communication server
600b base station
700 portable information terminal
40200 connection cable
40300 monitor device

The invention claimed is:

1. A broadcast receiving apparatus, comprising:
a broadcast receiver configured to receive broadcasting data of broadcasting program contents and location information from a broadcast transmission path, a reference destination for obtaining data related to the broadcasting data being described in the location information;
a network transceiver configured to receive data related to the broadcasting program contents from the reference destination described in the location information via a network;
a storage configured to store and reproduce the broadcasting data of the broadcasting program contents received by the broadcast receiver; and
an outputting interface configured to output the broadcasting data of the broadcasting program contents reproduced from the storage to external equipment,
wherein as an output state of the outputting interface, there is a state where the outputting interface is configured to output both of the data related to the broadcasting program contents received by the network transceiver and the broadcasting data of the broadcasting program contents received by the broadcast receiver as a multiplexed IP stream and where the location information in which a description of the reference destination is rewritten into a description indicating that the data related to the broadcasting program contents is multiplexed in the same IP stream as the location information is outputted together with the broadcasting data of the broadcasting program contents and the received data related to the broadcasting program contents.

2. The broadcast receiving apparatus according to claim 1, wherein a format of the rewritten location information is the same as a format of the location information received by the broadcast receiver.

3. The broadcast receiving apparatus according to claim 1, wherein both of table information in which the location information is included at the broadcast transmission path and table information in which the rewritten location information is included to be outputted in the multiplexed IP stream from the outputting interface are MMT package table information.

4. A broadcast receiving apparatus, comprising:
a broadcast receiver configured to receive broadcasting data of broadcasting program contents and location information from a broadcast transmission path, a reference destination for obtaining data related to the broadcasting data being described in the location information;
a network transceiver configured to receive data related to the broadcasting program contents from the reference destination described in the location information via a network; and
an outputting interface configured to output the broadcasting data of the broadcasting program contents received by the broadcast receiver to external equipment,
wherein as an output state of the outputting interface, there is a state where the outputting interface is configured to output both of the data related to the broadcasting program contents received by the network transceiver and the broadcasting data of the broadcasting program contents received by the broadcast receiver as a multiplexed IP stream and where the location information in which a description of the reference destination is rewritten into a description indicating that the data related to the broadcasting program contents is multiplexed in the same IP stream as the location information is outputted together with the broadcasting data of the broadcasting program contents and the received data related to the broadcasting program contents.

5. The broadcast receiving apparatus according to claim 4, wherein a format of the rewritten location information is the same as a format of the location information received by the broadcast receiver.

6. The broadcast receiving apparatus according to claim 4, wherein both of table information in which the location information is included at the broadcast transmission path and table information in which the rewritten location information is included to be outputted in the multiplexed IP stream from the outputting interface are MMT package table information.

7. A broadcast receiving apparatus, comprising:
a broadcast receiver configured to receive broadcasting data of broadcasting program contents, location information, and layout control information from a broadcast transmission path, a reference destination for obtaining data related to the broadcasting data being described in the location information, the layout control information relating to a display layout of the broadcasting program contents;

a network transceiver configured to receive data related to the broadcasting program contents from the reference destination described in the location information via a network;

a storage configured to store and reproduce the broadcasting data of the broadcasting program contents received by the broadcast receiver; and an outputting interface configured to output the broadcasting data of the broadcasting program contents reproduced from the storage to external equipment, wherein as an output state of the outputting interface, there is a state where the outputting interface is configured to output both of the data related to the broadcasting program contents received by the network transceiver and the broadcasting data of the broadcasting program contents received by the broadcast receiver as a multiplexed IP stream and where the location information in which a description of the reference destination is rewritten into a description indicating that the data related to the broadcasting program contents is multiplexed in the same IP stream as the location information is outputted together with the broadcasting data of the broadcasting program contents, the layout control information, and the received data related to the broadcasting program contents.

8. The broadcast receiving apparatus according to claim 7, wherein a format of the rewritten location information is the same as a format of the location information received by the broadcast receiver.

9. The broadcast receiving apparatus according to claim 7, wherein both of table information in which the location information is included at the broadcast transmission path and table information in which the rewritten location information is included to be outputted in the multiplexed IP stream from the outputting interface are MMT package table information.

10. A broadcast receiving apparatus, comprising:

a broadcast receiver configured to receive broadcasting data of broadcasting program contents, location information, and layout control information from a broadcast transmission path, a reference destination for obtaining data related to the broadcasting data being described in the location information, the layout control information relating to a display layout of the broadcasting program contents;

a network transceiver configured to receive data related to the broadcasting program contents from the reference destination described in the location information via a network; and an outputting interface configured to output the broadcasting data of the broadcasting program contents received by the broadcast receiver to external equipment, wherein as an output state of the outputting interface, there is a state where the outputting interface is configured to output both of the data related to the broadcasting program contents received by the network transceiver and the broadcasting data of the broadcasting program contents received by the broadcast receiver as a multiplexed IP stream and where the location information in which a description of the reference destination is rewritten into a description indicating that the data related to the broadcasting program contents is multiplexed in the same IP stream as the location information is outputted together with the broadcasting data of the broadcasting program contents, the layout control information, and the received data related to the broadcasting program contents.

11. The broadcast receiving apparatus according to claim 10, wherein a format of the rewritten location information is the same as a format of the location information received by the broadcast receiver.

12. The broadcast receiving apparatus according to claim 10, wherein both of table information in which the location information is included at the broadcast transmission path and a table information in which the rewritten location information is included to be outputted in the multiplexed IP stream from the outputting interface are MMT package table information.

* * * * *